(12) United States Patent
Furman et al.

(10) Patent No.: US 10,013,663 B2
(45) Date of Patent: Jul. 3, 2018

(54) METHOD FOR DEVELOPING A LONG-TERM STRATEGY FOR ALLOCATING A SUPPLY OF LIQUEFIED NATURAL GAS

(71) Applicant: EXXON-MOBIL UPSTREAM RESEARCH COMPANY, Houston, TX (US)

(72) Inventors: Kevin C. Furman, Morristown, NJ (US); Vikas Goel, Houston, TX (US); Samid A. Hoda, Thornton, CO (US); Nicolas Sawaya, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 535 days.

(21) Appl. No.: 14/358,668

(22) PCT Filed: Nov. 15, 2012

(86) PCT No.: PCT/US2012/065305
§ 371 (c)(1),
(2) Date: May 15, 2014

(87) PCT Pub. No.: WO2013/085689
PCT Pub. Date: Jun. 13, 2013

(65) Prior Publication Data
US 2015/0012326 A1    Jan. 8, 2015

Related U.S. Application Data

(60) Provisional application No. 61/568,908, filed on Dec. 9, 2011.

(51) Int. Cl.
*G06Q 10/00* (2012.01)
*G06Q 10/06* (2012.01)
*G06Q 50/06* (2012.01)

(52) U.S. Cl.
CPC ..... *G06Q 10/06315* (2013.01); *G06Q 10/067* (2013.01); *G06Q 10/0637* (2013.01); *G06Q 10/06313* (2013.01); *G06Q 50/06* (2013.01)

(58) Field of Classification Search
CPC ....... G06Q 10/06315; G06Q 10/06313; G06Q 10/0637; G06Q 10/067; G06Q 10/06; G06Q 10/04; G06F 17/5009
See application file for complete search history.

(56) References Cited

U.S. PATENT DOCUMENTS

| 6,298,671 B1 | 10/2001 | Kennelley et al. |
| 6,335,733 B1 | 1/2002 | Keren et al. |

(Continued)

FOREIGN PATENT DOCUMENTS

| WO | 2010/042073 | 4/2010 |
| WO | 2013/085688 | 6/2013 |

(Continued)

OTHER PUBLICATIONS

Agarwal, R., et al., (2009), "Collaboration in Cargo Transportation", In W. Chaovalitwongse, K.C. Furman and P. Pardalos (Eds.), *Optimization and Logistics Challenges in the Enterprise*, Springer, p. 373-409.

(Continued)

*Primary Examiner* — Matthew S Gart
*Assistant Examiner* — Stephen S Swartz
(74) *Attorney, Agent, or Firm* — ExxonMobil Upstream Research Company—Law Department

(57) ABSTRACT

A method is disclosed for developing a long-term strategy for allocating a supply of liquefied natural gas (LNG) while adhering to limitations of available shipping capacity An LNG market is modeled using one or more optimization models. The LNG market includes at least one buyer of LNG, at least one seller of LNG, and at least one means of (Continued)

transporting LNG. A plurality of inputs relevant to the LNG market are accepted. The inputs are configured to be input into the optimization models. One or more solution algorithms are interfaced with the optimization models. The optimization models are run using the interfaced solution algorithms to identify potential options in the LNG market. Uncertainty is accounted for in the identified potential options. The identified potential options are outputted.

18 Claims, 18 Drawing Sheets

(56) References Cited

U.S. PATENT DOCUMENTS

| | | | |
|---|---|---|---|
| 6,456,982 B1 | 9/2002 | Pilipovic | |
| 6,631,615 B2 | 10/2003 | Drube et al. | |
| 6,785,662 B1 | 8/2004 | Guy et al. | |
| 6,983,186 B2 | 1/2006 | Navani et al. | |
| 7,050,056 B2 | 5/2006 | Meyringer | |
| 7,099,341 B2 | 8/2006 | Lingafelt et al. | |
| 7,162,444 B1 | 1/2007 | Machado, Jr. et al. | |
| 7,264,025 B2 | 9/2007 | Farese et al. | |
| 7,406,475 B2 | 7/2008 | Dorne et al. | |
| 7,448,046 B2 | 11/2008 | Navani et al. | |
| 7,587,328 B2 | 9/2009 | Kawahara et al. | |
| 7,606,776 B1 | 10/2009 | Havens et al. | |
| 7,634,449 B2 | 12/2009 | Alvarado et al. | |
| 7,657,480 B2 | 2/2010 | Harper | |
| 7,676,420 B1 | 3/2010 | Agnew et al. | |
| 7,730,046 B2 | 6/2010 | Barth et al. | |
| 7,797,205 B2 | 9/2010 | Song et al. | |
| 7,873,429 B2 | 1/2011 | Boutemy et al. | |
| 7,925,581 B2 | 4/2011 | Mordecai | |
| 8,019,617 B2 | 9/2011 | Kocis et al. | |
| 8,032,451 B2 | 10/2011 | Mordecai | |
| 8,275,719 B1 | 9/2012 | Agnew et al. | |
| 8,321,354 B2 | 11/2012 | Ye et al. | |
| 8,374,898 B2 | 2/2013 | El-Bakry et al. | |
| 8,402,983 B2 | 3/2013 | Harland et al. | |
| 8,494,976 B2 | 7/2013 | Furman et al. | |
| 8,504,335 B2 | 8/2013 | Furman et al. | |
| 8,577,778 B2 | 11/2013 | Lange et al. | |
| 8,600,911 B2 | 12/2013 | Kocis et al. | |
| 8,626,565 B2 | 1/2014 | Petroff | |
| 8,775,347 B2 | 7/2014 | Goel et al. | |
| 8,775,361 B2 | 7/2014 | Goel et al. | |
| 8,788,068 B2 | 7/2014 | Kocis et al. | |
| 8,812,397 B2 | 8/2014 | Mordecai | |
| 8,849,623 B2 | 9/2014 | Carvallo et al. | |
| 8,972,304 B2 | 3/2015 | Ye et al. | |
| 9,129,449 B2 | 9/2015 | Davidson | |
| 9,135,826 B2 | 9/2015 | Malhotra | |
| 2002/0049667 A1* | 4/2002 | Navani | G06Q 10/06 705/37 |
| 2002/0069210 A1 | 6/2002 | Navani et al. | |
| 2002/0138293 A1 | 9/2002 | Kawahara et al. | |
| 2002/0156663 A1 | 10/2002 | Weber et al. | |
| 2002/0157402 A1 | 10/2002 | Drube et al. | |
| 2004/0133458 A1 | 7/2004 | Hanrahan | |
| 2004/0236714 A1 | 11/2004 | Eisenberger et al. | |
| 2005/0144033 A1 | 6/2005 | Vreeke et al. | |
| 2006/0089787 A1 | 4/2006 | Burr et al. | |
| 2006/0180231 A1 | 8/2006 | Harland et al. | |
| 2008/0010357 A1 | 1/2008 | Ye et al. | |
| 2008/0154564 A1* | 6/2008 | Rashid | E21B 43/122 703/10 |
| 2008/0215480 A1* | 9/2008 | Mordecai | G06Q 20/10 705/38 |
| 2008/0294484 A1* | 11/2008 | Furman | G06Q 10/06316 705/7.26 |
| 2009/0094141 A1 | 4/2009 | Regnery et al. | |
| 2009/0177505 A1 | 7/2009 | Dietrich et al. | |
| 2009/0187450 A1 | 7/2009 | Kocis et al. | |
| 2010/0000252 A1 | 1/2010 | Morris et al. | |
| 2010/0088142 A1* | 4/2010 | El-Bakry | G06Q 10/06312 705/7.22 |
| 2010/0257015 A1 | 10/2010 | Molander | |
| 2010/0287073 A1* | 11/2010 | Kocis | G06Q 10/047 705/28 |
| 2010/0299177 A1* | 11/2010 | Buczkowski | G06Q 10/06 705/7.13 |
| 2010/0332273 A1 | 12/2010 | Balasubramanian et al. | |
| 2011/0182698 A1 | 7/2011 | Foo et al. | |
| 2011/0231335 A1* | 9/2011 | Kocis | G06Q 10/0831 705/338 |
| 2011/0307230 A1 | 12/2011 | Lee et al. | |
| 2012/0023038 A1 | 1/2012 | Mordecai | |
| 2012/0053975 A1 | 3/2012 | Lohn, Jr. | |
| 2012/0083914 A1 | 4/2012 | Kocis et al. | |
| 2012/0084110 A1 | 4/2012 | Wu et al. | |
| 2012/0123578 A1 | 5/2012 | Ransbarger et al. | |
| 2013/0030873 A1 | 1/2013 | Davidson | |
| 2014/0058775 A1 | 2/2014 | Siig et al. | |
| 2014/0180566 A1 | 6/2014 | Malhotra | |
| 2014/0183120 A1 | 7/2014 | Schmitz et al. | |
| 2014/0310049 A1 | 10/2014 | Goel et al. | |
| 2014/0310156 A1 | 10/2014 | Mordecai | |
| 2014/0316839 A1 | 10/2014 | Furman et al. | |
| 2014/0324727 A1 | 10/2014 | Hoda et al. | |
| 2014/0344000 A1 | 11/2014 | Furman et al. | |
| 2015/0012326 A1 | 1/2015 | Furman et al. | |
| 2015/0170094 A1 | 1/2015 | Ye et al. | |
| 2015/0178649 A1 | 6/2015 | Furman et al. | |
| 2015/0324714 A1 | 11/2015 | Shao et al. | |
| 2015/0324740 A1 | 11/2015 | Shao et al. | |

FOREIGN PATENT DOCUMENTS

| | | |
|---|---|---|
| WO | 2013/085689 | 6/2013 |
| WO | 2013/085690 | 6/2013 |
| WO | 2013/085691 | 6/2013 |
| WO | 2013/085692 | 6/2013 |

OTHER PUBLICATIONS

Andersson, H, et al., (2010), "Transportation Planning and Inventory Management in the LNG Supply Chain", *Energy Systems*, v. 3, p. 427-439.

Black, F., et al., (1973), "The Pricing of Options and Corporate Liabilities," *Journal of Political Economy*, v. 81, p. 637-654.

Christiansen, M., et al., (2004), "Ship Routing and Scheduling: Status and Perspectives". *Transportation Science*, v. 38 n. 1, p. 1-18.

Clewlow, L., et al., (2000), "Chapters 6, 7 and 8," *Energy Derivatives: Pricing and Risk Management*, Lacima Group, p. 89-162.

Contesse, L., et al., (2005), "A Mixed-Integer Programming Model for Gas Purchase and Transportation", *Engineering School, Catholic University of Chile*, p. 1-19.

Ergun, O., et al., (2007), "Shipper Collaboration", *Computers & Operations Research*, v. 34, p. 1551-1560.

Fagerholt, K. et al., (2002), "Design of a sea-borne system for fresh water transport—A simulation analysis", *Belgian Journal of Operations Research, Statistics and Computer Science*. v. 40 n. 3-4, p. 137-146.

Felix, B.J., et al., (2008), "Gas Storage Valuation: Comparison of Recombining Trees and Least Squares Monte-Carlo Simulation", Engineering Management Conference, IEMC Europe 2008, p. 1-4.

Fodstad, M., et al., (2011), "LNG Scheduler: a rich model for coordinating vessel routing, inventories and trade in the liquefied natural gas supply chain", *Journal of Energy Markets*, v. 3, n. 4, Winter 2010/2011, p. 31-64.

Gabriel, S.A., et al., (2005), "A Mixed Complementarity-Based Equilibrium Model of Natural Gas Markets", Operations Research v. 53(5) p. 799-818.

Grønhaug, R., et al., (2010), "A Branch-and-Price Method for a Liquefied Natural Gas Inventory Routing Problem", *Transportation Science*, v. 44 n. 3, p. 400-415.

Grønhaug, R., et al., (2009), "Supply Chain Optimization for the Liquefied Natural Gas Business", In L. Bertazzi, J. van Nunen, &

(56) References Cited

OTHER PUBLICATIONS

M.G. Speranza (Eds.), Innovation in distribution logistics, Springer, Lecture Notes in Economics and Mathematical Systems, vol. 619, p. 195-218.
Guigues, V., et al., (2010), "Robust management and pricing of LNG contracts with cancellation options", *Optimization Online*, Dec. 2010, p. 1-27.
Halvorsen-Weare, E.E., et al., (2010), "Routing and scheduling in a liquefied natural gas shipping problem with inventory and berth constraints", *Annals of Operations Research, DOI* 10.1007/s10479-010-0794-y, p. 167-186.
Hartley, P., et al. (2006), The Baker Institute world gas trade model. In A. Jaffe, D. Victor & M. Hayes (Eds.), *Natural Gas and Geopolitics: From 1970 to 2040*, Cambridge University Press, p. 357-406.
Haubrich, J.G., et al., (2004), "Oil Prices: Backward to the Future?", Federal Reserve Bank of Cleveland, *Economic Commentary*, Dec. 2004, p. 1-4.
Lai, G., et al., (2010), "An Approximate Dynamic Programming Approach to Benchmark Practice-Based Heuristics for Natural Gas Storage Valuation", *Operations Research*, v. 58, p. 564-582.
Lai, G., et al., (2011), "Valuation of Storage at a Liquefied Natural Gas Terminal", *Operations Research*, forthcoming, pp. 602-616.
The Lanner Group, (2011), "Case Study: Lanner and Shell Develop ADGENT Simulation Tool", http://www.lanner.com, downloaded Feb. 2011, p. 1-2.
The Lanner Group (2011), "Case Study: Improving Shipping Distribution at Exxon", http://www.lanner.com, downloaded Feb. 2011, p. 1-2.
Lustig, I., et al., (2010), "The Analytics Journey", *Analytics*, Nov./Dec. 2010, p. 11-18.
Muller, L., et al. (2010), "Evaluation of Optional Cancellation Contracts using Quantitative Finance Techniques", Technical Paper, IMPA, p. 1-10.
Özelkan, E.C., (2008), "Optimizing liquefied natural gas terminal design for effective supply-chain operations", *International Journal of Production Economics*. V. 111, p. 529-542.
Pattison, G., (2010), "GNL Chile—Managing a New LNG Value Chain", *Proceedings of the Operational Research Society Simulation Workshop 2010*, p. 1-4.
Pattison, G., (2003), "Maximizing LNG Supply Chain Efficiency with Simulation Modeling", *Offshore Technology Conference*, Houston, [The Lanner Group], p. 1-9.
Quelhas, A., et al. (2007), "A Multiperiod Generalized Network Flow Model of the U.S. Integrated Energy System Part I—Model Description", *The National Science Foundation*, 9 pages.
Rakke, J.G., et al., (2010), "A rolling horizon heuristic for creating a liquefied natural gas annual delivery program", To appear in *Transportation Research Part C, Emerging Technologies*, V19, 5, p. 896-911.
Rodríguez, R.Y., (2008), "Real option valuation of free destination in long-term liquefied natural gas supplies", *Energy Economics*, v. 30, p. 1909-1932.
Rzevski, G., et al., (2004), "Magenta Multi-Agent Technology: Mageneta Platform Version 2" Whitepaper, pp. 1-37.
Saker Solutions (2004), "Simulation in the oil & gas sector", Whitepaper, p. 1-4.
Stchedroff, N., et al., (2003), "Modeling a Continuous Process with Discrete Simulation Techniques and Its Application to LNG Supply Chains", *Proceedings of the 2003 Winter Simulation Conference*, [Shell Information Technology International], p. 1607-1611.
Tomasgard, A., et al., (2007), "Optimization Models for the Natural Gas Value Chain", *Norwegian University of Science and Technology, SINTEF*, p. 1-39.
Uggen, K.T., et al., (2008), "Profit Maximization in the LNG-Value Chain by Combining Market Prices and Ship Routing", Conference Proceedings, *APIEMS 2008—The 9th Asia Pacific Ind. Eng. & Management Systems Conference*, p. 1-12.
Van de Broecke, A., et al., (2007), "Optimising the LNG Supply Chain", Petroleum Review, v. 61, n. 725, [Honeywell], p. 30-32, 48.
You, F., et al., (2008), "Risk Management for a Global Supply Chain Planning Under Uncertainty: Models and Algorithms", *Dept. of Chemical Engineering, Carnegie Mellon University*, p. 1-40.

* cited by examiner

METHOD FOR DEVELOPING A LONG-TERM STRATEGY FOR ALLOCATING A SUPPLY OF LIQUEFIED NATURAL GAS

CROSS-REFERENCE TO RELATED APPLICATIONS

This application is the National Stage of International Application No. PCT/US2012/065305, that published as Intl. Patent Application Pub. No. WO 2013/085689, filed 15 Nov. 2012, which claims the benefit of U.S. Provisional Application No. 61/568,908, filed 9 Dec. 2011, entitled METHOD FOR DEVELOPING A LONG-TERM STRATEGY FOR ALLOCATING A SUPPLY OF LIQUEFIED NATURAL GAS, each of which is incorporated herein by reference, in its entirety, for all purposes.

FIELD OF THE INVENTION

Disclosed aspects and methodologies relate to Liquefied Natural Gas (LNG) operations, and more particularly, to systems and methods relating to planning and operations of an LNG project or projects.

BACKGROUND

This section is intended to introduce various aspects of the art, which may be associated with aspects of the disclosed techniques and methodologies. References discussed in this section may be referred to hereinafter. This discussion, including the references, is believed to assist in providing a framework to facilitate a better understanding of particular aspects of the disclosure. Accordingly, this section should be read in this light and not necessarily as admissions of prior art.

The current liquefied natural gas (LNG) business is driven by long-term contracts and planning Currently, annual delivery schedules for each LNG project are planned and agreed upon by various parties before the beginning of each contractual time period. In addition, an updated 90-day delivery schedule is developed by the LNG producer and provided to customers every month to account for deviations from the annual schedule. Agreement on these delivery plans can involve significant negotiation and coordination of operations by several parties. Consequently, developing a portfolio of LNG projects and operating LNG liquefaction terminals involves significant long-term planning which can greatly benefit from robust planning and optimization tools.

Increasing liquidity in the LNG market may cause the global LNG business to evolve from a long-term contracts based business to one with significantly more flexibility and short-term sales. This will complicate the management of projects since operations will have to be optimized not only to satisfy contractual obligations but also to maximize profitability by exploiting contractual flexibility and market opportunities. Known attempts to manage LNG projects via computational technology have fallen short because of substantially reduced scope, reduced capabilities of the proposed solutions, and/or a lack of the technology utilized. The following paragraphs discuss known attempts as they relate to various aspects of the disclosed methodologies and techniques.

Ship Scheduling. Many LNG projects currently tend to use simple spreadsheets for scheduling ships. The schedule has to be populated manually and does not provide any optimization functionality. Even in the more detailed systems, there are no known integrated models for lifting schedule generation combined with ship schedule optimization. This can lead to sub-optimal plans manifested in over-utilization of spot vessels for satisfying contractual demands. Further, generating a feasible shipping schedule could require a great number of iterations between the capacity planning and the ship scheduling components. Additionally, the ship scheduling components of the more sophisticated models do not seek to optimize schedules for selling spot cargoes, and do not account for transportation losses in cargo (e.g. boil-off, fuel) and consequently the generated ship schedules have discrepancies when attempting to satisfy contractual obligations related to annual volume delivered.

Rakke et al (2010) seems to be a first attempt to address problems of developing Annual Development Plans (ADPs) for larger LNG projects. While Rakke reports results for problems with multiple ships and a one year planning horizon, the optimization model and solution methods are fairly simplified. For example, the model is built for a case with only one producing terminal, boil-off and heel calculations are not integrated with ship schedules, partial loads and discharges are not allowed, time windows are not specified for deliveries, etc. From a practical perspective, known ship schedule methodologies address a much simplified and a small subset of the LNG ship schedule optimization problem. What is needed is a method and system that presents a complete solution to the LNG ship scheduling problem.

Optionality Planning. Optionality is the value of additional optional investment opportunities available only after having made an initial investment. Basic principles or concepts of optionality planning may be derived from well known problems such as the Chinese Postman Problem, cycle covering, and capacity planning. A concept of shipper collaboration is described by Ergun et al. (2007) and Agarwal et al. (2009). However, such examples do not allow for fungible products (i.e. LNG), they do not assume ships can be assigned fractionally, and they fix in advance the shipping lanes for routing a product from supplier to buyer. What is needed is a system and method for LNG optionality planning that includes concepts such as those mentioned above.

Shipping Simulation. Known tools may be combined to determine "best case" and typical schedules possible under various LNG supply chain design scenarios as part of a planning process for designing new LNG projects. Although certain aspects of existing simulation systems are quite detailed, there are other components of these simulation systems that can be improved. For example, known systems have limited options and functionality related to the economics (e.g., modern asset pricing models), operations scheduling, optimization and decision-making. Although many simulation application developers all use the term "optimize" in their documentation, their use of the term usually refers to manual scenario exploration and not mathematical optimization.

LNG Supply Chain Design. A combination of currently available computational applications could be used to determine the "best case" and typical schedules possible under various LNG supply chain design scenarios as part of a planning process for designing new LNG projects. The drawback of this approach is that the computational expense for evaluating a single supply chain design case is quite high with such a set of applications. Thus evaluating a large number of design scenarios is computationally prohibitive. Further, the computational complexity becomes quite substantial if one wants to consider large supply chains (more than average number of LNG terminals and regasification ports) or more complicated scenarios allowing for the pooling of ships along multiple routes—a characteristic currently possible to evaluate only in limited scenarios with current systems, but strategically considered to be highly desirable for future designs and operations. While problems relating to the LNG ship routing problem have been addressed, there is no known public domain literature that address the full-scale LNG supply chain design problem.

Valuation Analysis. Various studies have explored the cancellation options in LNG contracts, the valuation of destination flexibility in long-term LNG supplies, valuation of storage at an LNG terminal and for a more general setting, and valuation of natural gas storage. However, no known studies describe the kinds of analyses made available by the inventions described here for various LNG options. What is needed is a method and system to improve the overall profitability of a liquefied natural gas (LNG) portfolio.

SUMMARY

In one aspect, a method is provided for developing a long-term strategy for allocating a supply of liquefied natural gas (LNG) while adhering to limitations of available shipping capacity. An LNG market is modeled using one or more optimization models. The LNG market includes at least one buyer of LNG, at least one seller of LNG, and at least one means of transporting LNG. A plurality of inputs relevant to the LNG market are accepted. The plurality of inputs are configured to be input into the one or more optimization models. One or more solution algorithms are interfaced with the one or more optimization models. The one or more optimization models are run using the interfaced one or more solution algorithms to identify potential options in the LNG market. Uncertainty is accounted for in the identified potential options. The identified potential options are outputted.

In another aspect, a method is provided for delivering liquefied natural gas (LNG) using a long-term strategy for allocating an LNG supply that adheres to limitations of available shipping capacity. An LNG market is modeled using one or more optimization models. The LNG market includes at least one buyer of LNG, at least one seller of LNG, and at least one means of transporting LNG. A plurality of inputs relevant to the LNG market are accepted. The plurality of inputs are configured to be input into the one or more optimization models. One or more solution algorithms are interfaced with the one or more optimization models. The one or more optimization models are run using the interfaced one or more solution algorithms to identify potential options in the LNG market. Uncertainty is accounted for in the identified potential options. The identified potential options are outputted. LNG is delivered according to the identified potential options.

In another aspect, a computer program product is provided having computer executable logic recorded on a tangible, machine-readable medium. Code is provided for developing a long-term strategy for allocating a supply of liquefied natural gas (LNG) while adhering to limitations of available shipping capacity, the code for developing including: code for modeling an LNG market using one or more optimization models, wherein the LNG market includes at least one buyer of LNG, at least one seller of LNG, and at least one means of transporting LNG; code for accepting a plurality of inputs relevant to the LNG market, the plurality of inputs configured to be input into the one or more optimization models; code for interfacing one or more solution algorithms with the one or more optimization models; and code for running the one or more optimization models using the interfaced one or more solution algorithms to identify potential options in the LNG market, wherein uncertainty is accounted for in the identified potential options. Code is provided for outputting the identified potential options.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

Figure 1:
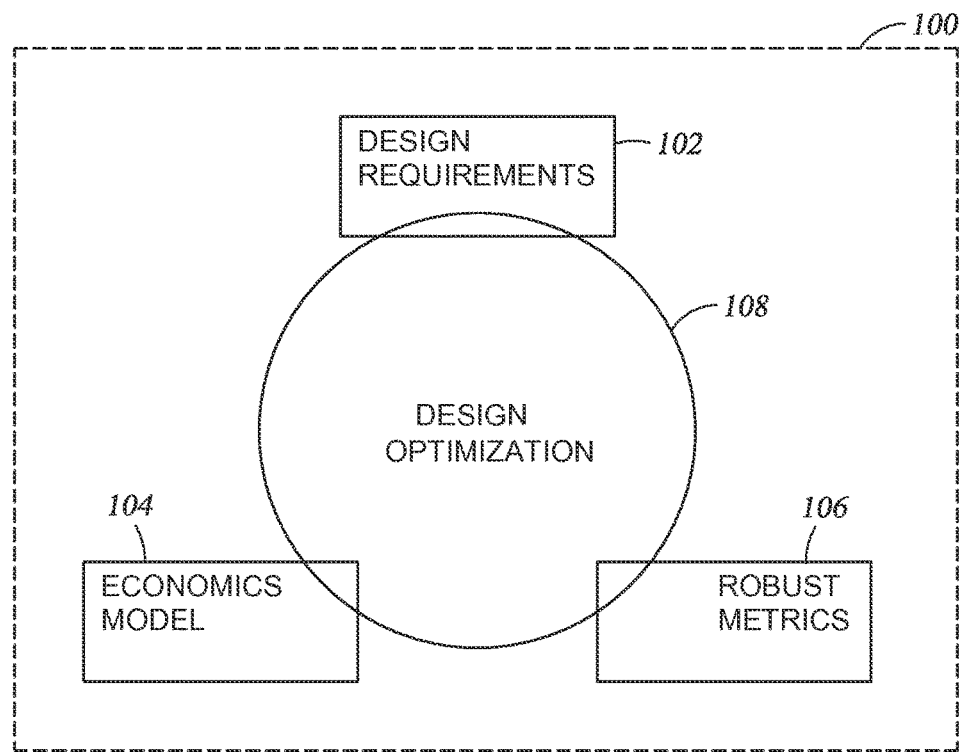
FIG. 1 is a block diagram of a LNG supply chain design optimization model according to disclosed aspects and methodologies.

To the extent the following description is specific to a particular embodiment or a particular use, this is intended to be illustrative only and is not to be construed as limiting the scope of the invention. On the contrary, it is intended to cover all alternatives, modifications, and equivalents that may be included within the spirit and scope of the invention.

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as generating, modeling, accepting, interfacing, running, outputting, evaluating, optimizing, performing, minimizing, maximizing, developing, determining, analyzing, identifying, representing, incorporating, entering, employing, displaying, using, integrating, simulating, valuating, valuing, validating, comparing, accounting for, prescribing, or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.)).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "exemplary" is used exclusively herein to mean "serving as an example, instance, or illustration." Any aspect described herein as "exemplary" is not necessarily to be construed as preferred or advantageous over other aspects.

As used herein, "hydrocarbon" includes any of the following: oil (often referred to as petroleum), natural gas in any form including liquefied natural gas (LNG), gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, EEPROM, or other memory chip or card, a memory stick, and other media from which a computer, a processor or other electronic device can read.

The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; or 6) seeking to maximize one or more factors in light of competing and/or cooperative interests in maximizing, minimizing, or otherwise controlling one or more other factors, etc.

As used herein, the term "production entity" or "production entities" refer to entities involved in a liquefaction project or regasification project.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Disclosed aspects and methodologies provide the capability to perform a number of valuation and validation analyses for the LNG supply chain incorporating options and opportunities. Examples of the kinds of analyses include identification and valuation of short-term and long-term options, portfolio planning analysis, management of shipping operations, validation of supply chain operability, and new LNG project design and evaluation. To enable some of these analyses and to substantially improve the existing capabilities to perform others, a suite of fit-for-purpose optimization and analytics applications are used in combination within various workflows and methodologies. Five specific optimization and analytical models have been identified as components of such a software suite. These models form the combined suite of applications to be used in operations, analysis and decision-making within the LNG value chain. These models include: (1) ship scheduling, which has a capability for combined LNG ship scheduling, logistics and inventory optimization to develop annual delivery programs, rolling 90-day schedules, or schedules of any other useful scheduling time horizon; (2) optionality planning, which is used to identify the benefits, value or advantages in potential options and investments in long-term global LNG market analysis and for portfolio planning; (3) price model, which provides advanced price scenario generation capabilities enabling the valuation and statistical analysis of short-term optionality; (4) supply chain design, which provides optimization under uncertainty for robust LNG supply chain designs of new LNG projects including appropriate operational details; and (5) shipping simulation, which is a high-fidelity simulator to study, probabilistically analyze and visualize the behavior of LNG supply chain operations. The models encompass a variety of analytical tasks and levels of fidelity.

Using the terminology defined by Lustig, et al. (2010), there are three general categories of analytics: descriptive, predictive and prescriptive. Descriptive analytics involve the consolidation and classification of data (e.g. database) as well as methods for visualizing it. Predictive analytics use data and mathematical techniques to uncover relationships between data inputs and outcomes (e.g. data mining, forecasting). Prescriptive analytics use advanced mathematical techniques to determine alternatives or decisions given a set of objectives, requirements and constraints (e.g. optimization). The price model and shipping simulation model are of a predictive nature, and the ship scheduling, supply chain design and optionality planning models are of a more advanced prescriptive nature. A descriptive analytics layer is included to provide a data backbone to any or all of the above models.

FIG. 1 depicts an optimization model 100 according to disclosed aspects and methodologies. In contrast to known optimization models that recursively adjust model design parameters when an output of an optimization does not meet acceptable guidelines, optimization model 100 incorporates design requirements 102, an economics model 104, and robust metrics 106, all of which may be used in design optimization 108. Optimization model 100 may be based on one or more of constraint programming, mathematical programming, dynamic programming, or other optimization modeling frameworks.

Figure 2:
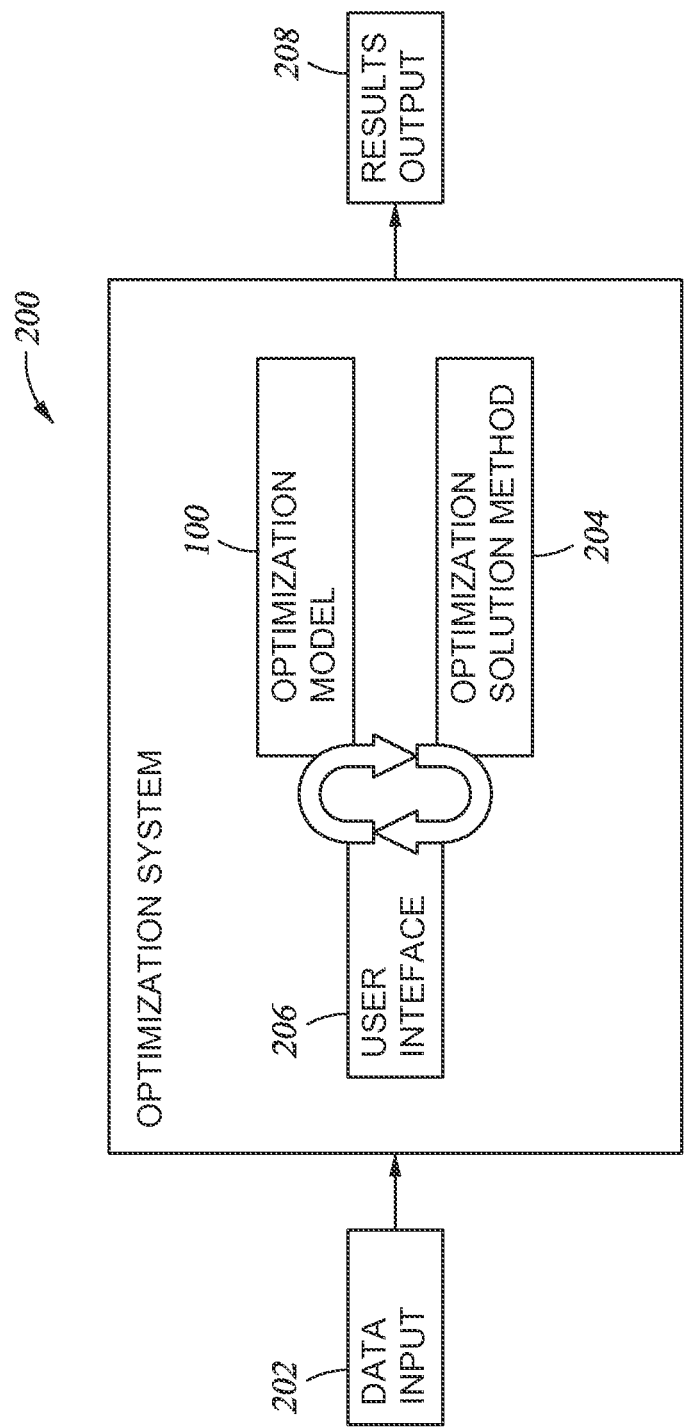
FIG. 2 is a block diagram of an optimization system according to disclosed aspects and methodologies.

According to disclosed aspects and methodologies, optimization model 100 may be used in an optimization system 200 as shown in FIG. 2. Block 202 represents data that is input into the optimization system. The data may be manually input or may be input from a spreadsheet, database, or other data organization device or system. Optimization system 200 employs one or more optimization models 100 in conjunction with an optimization solution method or algorithm 204, which may include one or a combination of commercial solvers, heuristic methods, or exact solution methods. A user interface 206 is used to provide a means for a user to input data, modify variables and parameters, and monitor intermediate and final results of runs of the optimization model. Results of the optimization system are output at 208. The results may be output in the form of spreadsheets, data in a database, charts, figures, graphical displays, or the like.

Figure 3:
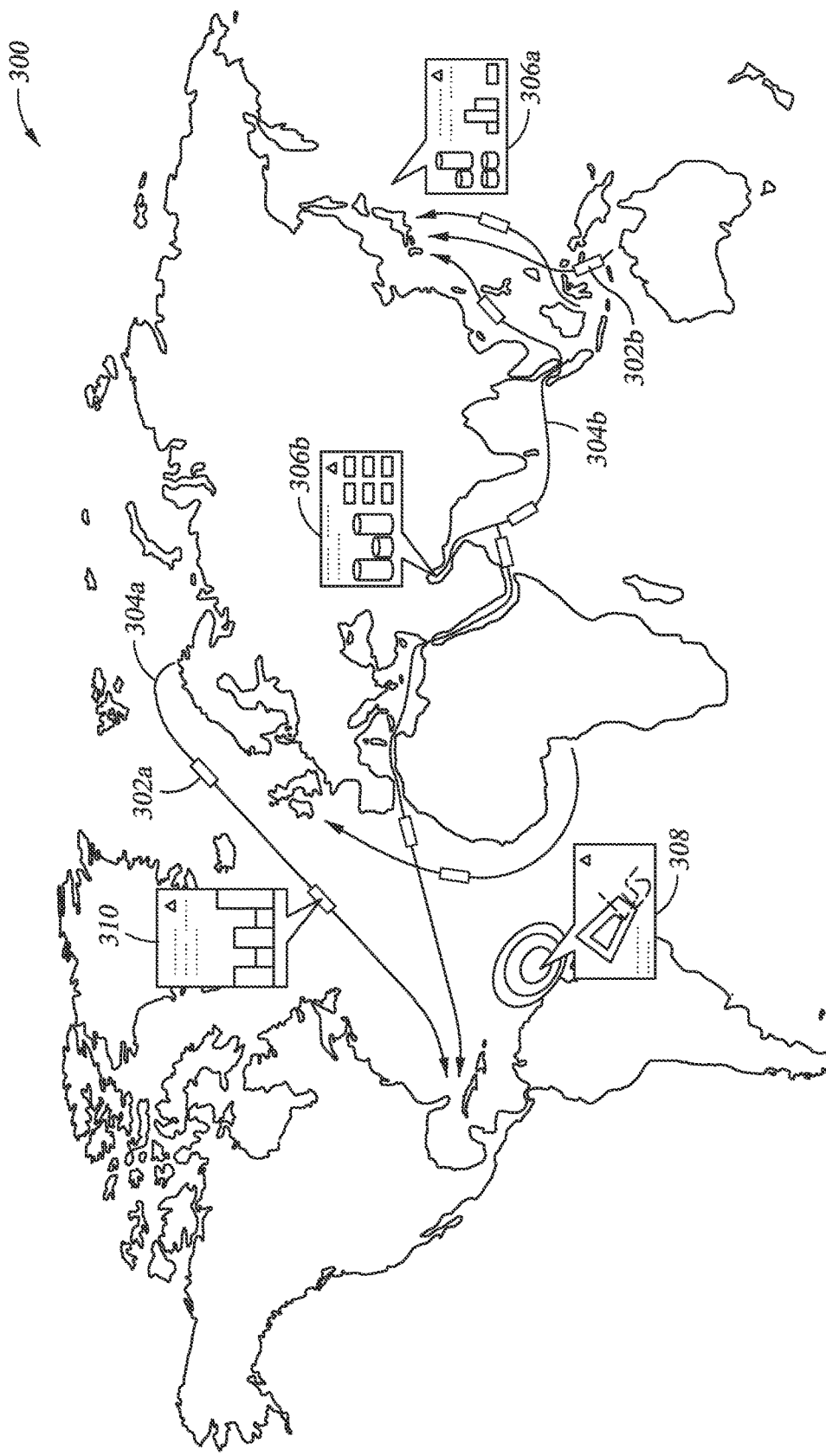
FIG. 3 is an output of a graphical user interface on a display according to disclosed aspects and methodologies.

FIG. 3 depicts an analysis screen 300 displayed using a graphical user interface (GUI) on a computer display. Analysis screen 300 includes a display of positions of ships 302a, 302b, active shipping routes 304a, 304b, inventory details at various terminals and storage facilities 306a, 306b, weather patterns 308, and information on ship status 310. Analysis screen 300 provides an intuitive and informative summary of the "state of the world" at any moment in time during a simulation run, and may also display outputs of the simulation run. Animating analysis screen 300 may help with identifying subtle interactions between different key decisions over time.

Each of the optimization models disclosed herein may advantageously use the structure of optimization model 100, optimization system 200, and/or analysis screen 300. The optimization models according to disclosed aspects and methodologies will now be discussed.

Ship Scheduling Model

A typical LNG project includes an LNG production or liquefaction terminal that supplies LNG to multiple regasification terminals using a fleet of ships. As part of an annual planning process, an Annual Delivery Plan (ADP) that specifies the LNG delivery schedule for the forthcoming planning year is typically developed and agreed upon by the supplier and the various customers. In addition, an updated 90 day delivery schedule (that accounts for deviations in the existing business conditions from the forecasts used during the ADP development) is typically provided by the LNG producer to its customers on a monthly basis through the year.

According to an aspect of the disclosed methodologies and techniques, a system is provided that enables development of optimal delivery schedules for the annual and 90 day planning process. Further, this system can be used for schedules for any other scheduling time horizon. Specifically, the system enables optimization of ship schedules, terminal inventory management, LNG production schedules, and maintenance schedules while accounting for tradeoffs related to various options in available shipping, customer requirements, price uncertainty, contract flexibility, market conditions, and the like. The system may provide the ability to optimize these decisions from several perspectives including minimizing costs, satisfying contractual obligations, maximizing throughput, maximizing profit, and the like.

The system includes a suite of optimization models that aim to achieve the above objectives, interfaced with a collection of solution algorithms tailored to solve these models. An implementation of the system includes implementations of the above models and algorithms, input and output databases, and a graphical user interface. These optimization models are used not only for planning operations and delivery schedules for individual projects, but also serve as a tool for operations planning at the LNG portfolio level, for optionality valuation, contract design and strategic decision-making related to new business development. Having a unified suite of optimization models that is used in analysis for all levels of decision-making (strategic, tactical and operational) enables profit maximization for an overall LNG business.

Specifically, the optimization model or models encapsulates detailed sub-models for all relevant elements of the LNG supply chain, such as liquefaction terminal and regasification terminal constraints, shipping specific constraints, contractual obligations and flexibilities, market constraints, customer requests, and the like. The disclosed system develops an optimized shipping schedule based on evaluating the trade-offs simultaneously across all of these constraints. In addition, the disclosed system accounts for the effect of various types of uncertainty (e.g., inter-port travel time, weather conditions, market conditions) in developing the ship schedule. The disclosed system may also assist in evaluating the effect of these uncertainties on the LNG ship schedule. Further, the disclosed system may enable development and re-evaluation of optimized ship schedules at various stages of LNG planning process, including (a) at the annual delivery plan development stage and the associated negotiation process; (b) at the 90 day planning process and the associated negotiation process; and/or (c) at the monthly or shorter term analysis level as more real-time information is obtained. The disclosed system also enables re-optimizing the model at each of the above stages to account for updated information regarding market conditions, customer requests, and other updates while trying to generate a schedule that does not overly depart from the existing schedule.

Figure 4:
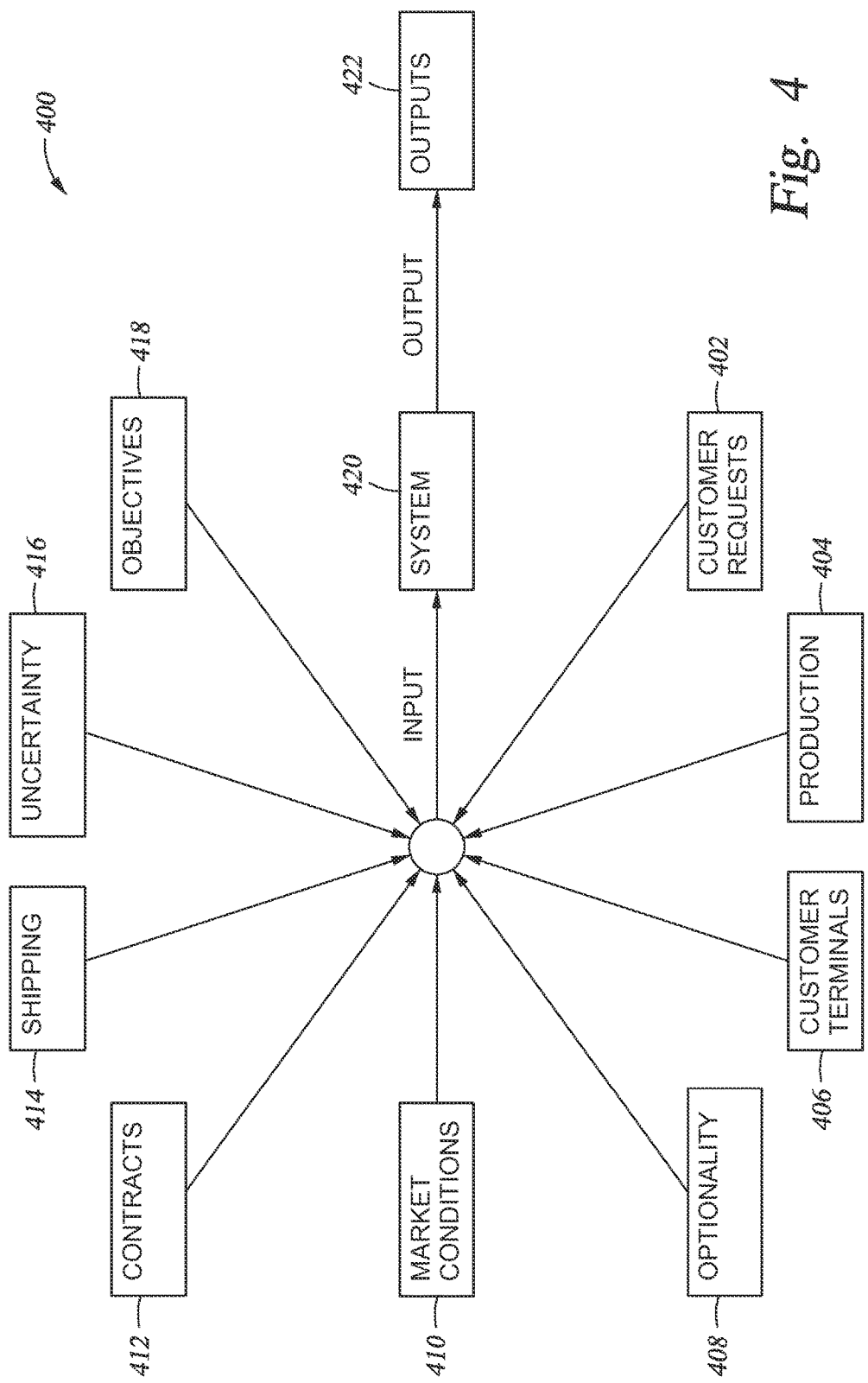
FIG. 4 is a block diagram of a ship scheduling model according to disclosed aspects and methodologies.

FIG. 4 is a block diagram of how a ship scheduling model 400 may be implemented by an optimization system such as optimization system 200 according to aspects of disclosed methodologies and techniques. A ship scheduling model 400 uses a plurality of inputs that may be categorized as customer requests 402, production data at one or more liquefaction terminals 404, customer terminals 406, optionality 408, market conditions 410, contracts 412, shipping 414, uncertainty 416, and objectives 418. Customer requests 402 may include input data relating to one or more of: creating or modifying time windows during which deliveries are requested; and requested cargo sizes for specific deliveries. Production data 404 may include data relating one or more of: the types or grades of LNG produced and their heat content; production rates of one or more types or grades of LNG; maintenance schedules and associated flexibility in scheduling the maintenance; the number of berths available for loading; and storage capacity for each type or grade of LNG. Customer terminals 406 may include input data relating to one or more of: storage capacities for each type or grade of LNG; the number of berths available for unloading; regasification rate schedules; and distances from each liquefaction terminal. Optionality 408 may include input data relating to one or more of: outchartering opportunities and corresponding prices; inchartering opportunities and corresponding prices; backhaul opportunities and corresponding prices; spot cargo delivery opportunities and corresponding prices; and spot ship availability and corresponding prices. Market conditions 410 may include input data relating to one or more of: the outlook for index prices to be used in pricing formula; the outlook for future market opportunities such as spot sales; and futures and forward contract prices. Contracts 412 may include input data relating to one or more of: terminals where LNG can be delivered; annual delivery targets for each customer terminal; ratability of delivery, which is the timing and spacing of delivery of portions of an agreed-upon amount of LNG; gas quality, type, or grade to be delivered; pricing formulas; diversion flexibility; and other types of flexibility such as downflex (an option whereby the buyer may request a decreased quantity of LNG). Contracts 412 may also include input data relating to the length of contract to which one or more LNG customers are bound. For example, an LNG customer may be bound by a long-term contract, such as a Sales and Purchase Agreement or a Production Sharing Contract. Shipping 414 may include input data relating to one or more of: a list of leased DES (delivered ex ship), CIF (cost, insurance and freight), CFR (cost and freight) and available spot ships; a list of FOB (freight on board) ships for each customer, said ships typically being owned or leased by the customer; ship capacities; restrictions on what ship can load/unload at what terminal; maintenance schedules for ships; cost structures for ships; boil-off and heel calculations for each ship, including an optimal heel amount upon discharge at a regasification terminal; and ship speed and associated cost profile. Uncertainty scenarios 416 may include input data relating to the uncertainties affecting one or more of: weather conditions on travel routes; shipping operations such as breakdowns; market opportunities such as future spot sales opportunities; and future LNG prices or fuel prices. Objectives 418 may include user-defined model objectives such as maximizing LNG throughput, minimizing costs, maximum profits, optimizing optionality, and/or maximizing robustness in face of uncertainty related to weather conditions, travel times, or market conditions. Such examples of input data are examples only and are not exhaustive. Block 420 schematically represents the system that builds an optimized ship schedule that accounts for the inputs and constraints represented by blocks 402-418. The results of system 420 are output at block 422. The outputs of the system may be used not only for ship scheduling, but also for inventory management, optionality utilization, and/or maintenance schedules.

The ship scheduling model may be used in various ways during project-specific operations planning, such as: to develop an initial ADP; during an ADP negotiation process; to evaluate the effect of customer requests for modifying the initial ADP; to develop an initial 90 day delivery plan; during a 90 day delivery plan negotiation process; and/or to evaluate the effect of customer requests for modifying the initial 90 day delivery plan. Further, it may be used in a similar many for other scheduling time horizons other than annual and 90 days. The ship schedule optimizer may be integrated with maintenance and production planning, as well as looking at maximizing profits by utilizing flexibility within contracts. For example, the ship schedule may be optimized simultaneously with any of the following: LNG inventory levels at one or more LNG liquefaction terminals; LNG inventory levels at one or more LNG regasification terminal; fuel selection for at least one voyage; ship speed for at least one voyage; a maritime route for at least one voyage; berth assignment at any of the LNG liquefaction terminals and/or LNG regasification terminals; ship maintenance schedules; and LNG liquefaction or production schedules. Further, aspects disclosed herein may be used for developing delivery plans for an individual LNG producer to one or more customers, or for a company that owns equity gas in one or more LNG liquefaction terminals and delivers LNG to one or more customers. Disclosed aspects may also be used to evaluate the performance of an optimized schedule under various future scenarios associated with uncertainties identified herein.

From the LNG portfolio perspective, ship scheduling models can be used for some interesting analytical explorations. For example, one may address the question of whether the slack capacity in one's global shipping fleet is sufficient to deliver spot LNG cargos or to create a new market in some region. Determining the feasibility of long-term out-chartering of ships without affecting other obligations may also be explored. The ship scheduling models may be used to consider whether entering into a long-term swap contract would affect costs and the ability to satisfy contractual obligations.

The valuation and validation of contract flexibility in individual projects or an LNG portfolio are possible with a ship scheduling model. In these cases, valuing diversion flexibility given a limited shipping capacity may be considered. Several types of scenarios such as ship out-chartering, spot cargo delivery or backhauls may be explored by analyzing the effects on shipping and whether contractual obligations can be met.

The set of individual ship scheduling models are based on a foundational shipping optimization model. Appropriate constraints and specifications are layered onto this model for conducting various analyses that are specific to the use case at hand. The core optimization model provides the ability to model a supply chain that includes multiple LNG liquefaction terminals, multiple customers with long and short-term purchase contracts, and spot LNG markets/buyers. The supply chain also has the capability to include multiple fleets of heterogeneous time-chartered ships together with opportunities to in-charter or out-charter ships. The model also provides functionality to model contractual flexibilities and market opportunities such as opportunities to divert cargo or backhaul third party cargo on a return voyage. The model develops a ship schedule that optimizes economic criteria such as profitability or other operational metrics such as schedule robustness while ensuring contractual obligations are satisfied. Detailed operational constraints related to liquefaction terminals and shipping, contractual obligations and market conditions are included in the model.

Variants of the foundational model address issues and goals related to the individual modes of use described earlier. For example, the generation of the ADP may require specialized features to ensure that the ship schedule developed by the model is robust enough to overcome unplanned disruption events. In 90-day schedule generation, optimizing economic criteria listed above may be sought as well as maintaining an operational schedule that closely follows the original schedule laid out in the ADP.

The input for contracts 412 may consider the possibility of multiple operating entities or owners involved in a liquefaction project, and each operating entity or owner may have a joint-venture agreement or other arrangement with the natural gas producer (e.g., national oil company or government) including fiscal agreements that cover royalties and taxes. Another type of contract covered by contracts 412 arise in liquefaction projects with shared facilities and infrastructure (such as storage facilities, loading facilities, and ships), in which there exist facility sharing agreements and fleet sharing agreements between the different production entities (e.g., joint-ventures). These agreements may include terms outlining volume storage entitlements, lifting entitlements and cost-sharing terms among others. Further, sales and deliveries typically are negotiated between a production entity and a buying entity, such as a joint venture and a customer. These contracts can be long-term or short-term and include SPAs (Gas Sales and Purchase Agreements) and PSCs (Production Sharing Contracts). These agreements typically include terms related to annual volumes, ratable delivery requirements, ships required for transport, price and penalties. In any of these multiple entity—type contracts or agreements, it is possible that various parties are operating under different fiscal conditions. For example, two companies may be working with a national oil company on a liquefaction project under different joint venture agreements. For various reasons those joint venture agreements may have different terms governing the above types of subjects. These different terms, including uncertainty of unknown terms, may be factored into the ship scheduling optimization model as disclosed herein.

LNG Ship Scheduling Example

Figure 5:
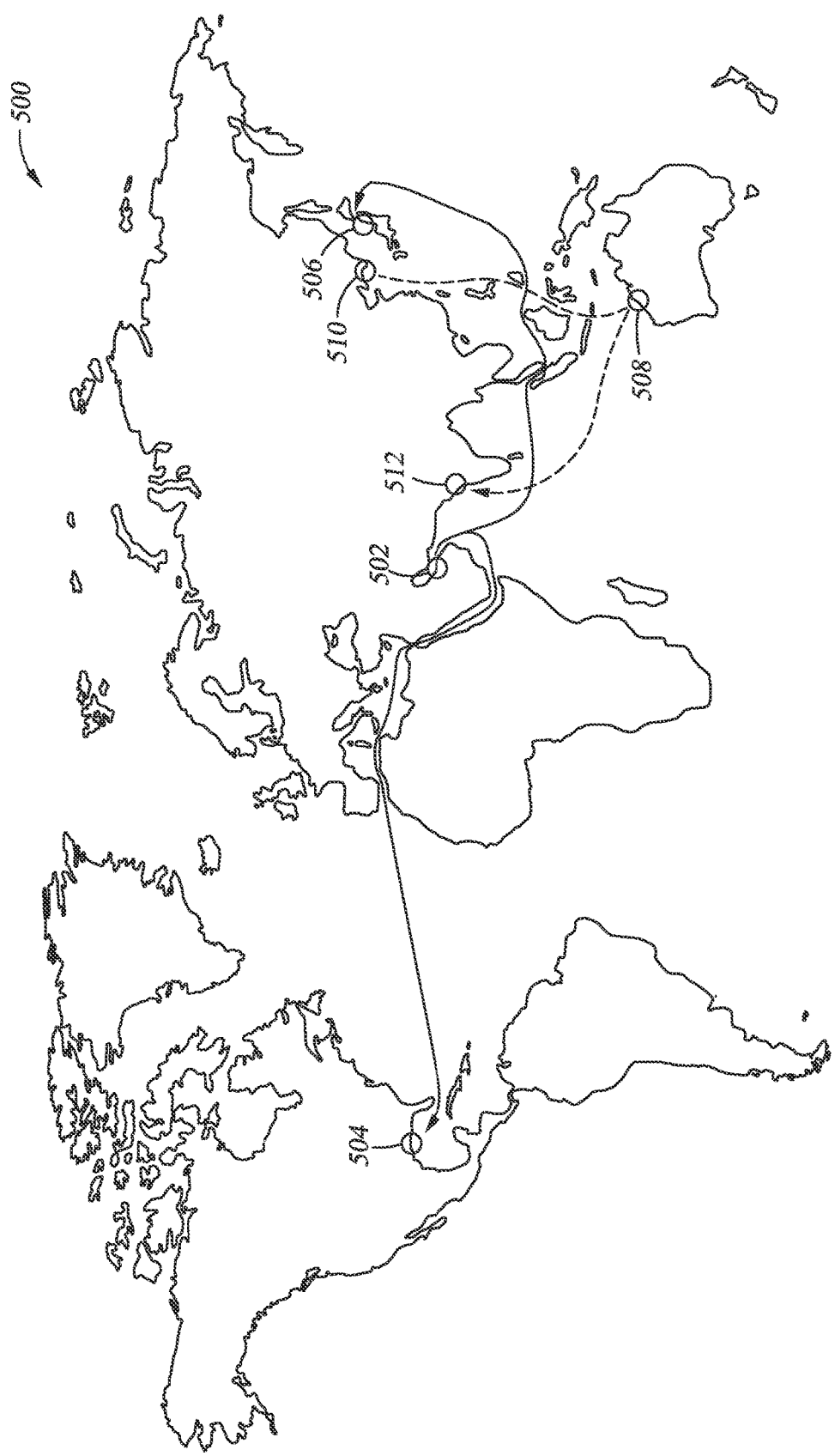
FIG. 5 is a display output of a ship scheduling example according to disclosed aspects and methodologies.

A ship scheduling optimization model can assist in capturing additional monetary value. Specifically, value can be captured through better utilization of assets such that new market opportunities are exploited while existing LNG delivery commitments are also met. The following example, depicted in the output display 500 of a ship scheduling model in FIG. 5, illustrates an aspect of the disclosed methodologies and techniques.

As part of a sales contract, an LNG producer is committed to deliver 0.5 Million Tonnes (MT) of LNG from production or liquefaction site 502 to a customer 504 over a 90 day horizon at a sales price of $4/MMBTU. The contract provides six cargo delivery opportunities. The producer's transfer price is $2/MMBTU. Three chartered LNG transport ships are available for delivery. The contract allows for 50% of the volume to be divertible. The diverted volume can be sold to a spot buyer 506. In addition, a third party producer 508 needs shipping capacity to ship 2 cargoes from their LNG production or liquefaction site to their customers 510 and 512, respectively. The ship hire rate is $80,000 per day. There are four cargoes available in the Far East, with a sales price of $5/MMBTU. The ship schedule optimization model can be used by the LNG producer to develop a 90-day shipping schedule that maximizes profitability for the producer while exploiting market options and satisfying contractual obligations.

Types of data to be used in this example include the following: liquefaction terminal data, including production schedule, production seasonality, terminal storage, number of loading berths, and the transfer price for LNG; shipping, including ship loading capacities, boil-off rates, capital costs, operation costs, voyage insurance costs, port visit costs, fuel price, fuel consumption rate during voyage and at port, and duration of loading and unloading; contractual customer data, including contracted demand, sales price, time windows in which cargoes can be delivered, and divertible volume and diversion penalties; and backhaul, including time windows in which cargoes can be picked up for delivery, and hire rate.

Figure 6:
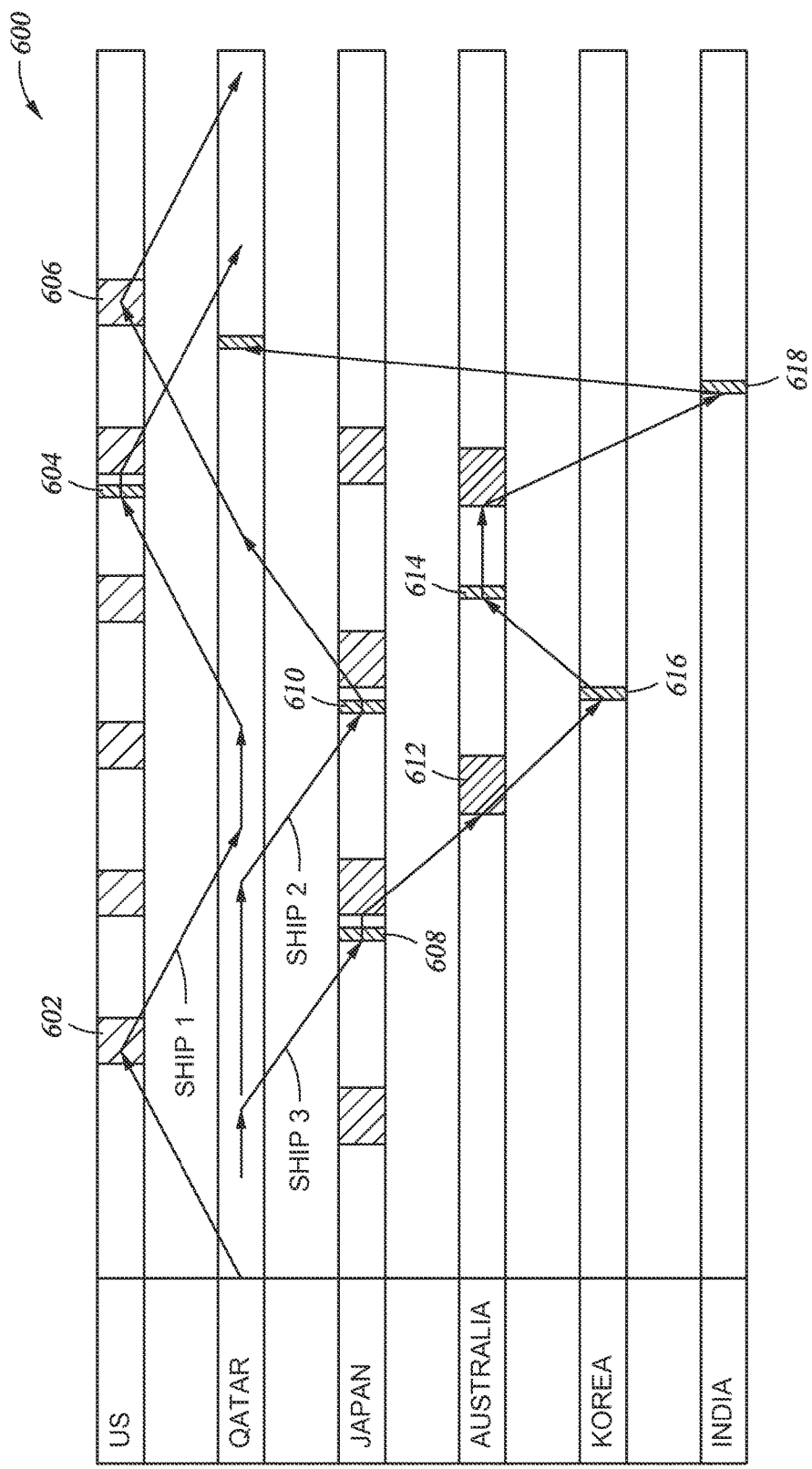
FIG. 6 is a chart showing a ship schedule corresponding to the ship scheduling example of FIG. 5.

A mixed integer linear programming model and solution algorithm is used to optimize the ship schedule. Alternatively, other mathematical programming, constraint programming, dynamic programming, approximate dynamic programming, or other discrete optimization methods can be used to optimize the ship schedule. The model develops a schedule with a 1 day time discretization. For the case presented, the model has approximately 1800 binary variables which leads to a worst-case scenario of $2^{1800}$ discrete choices. In this model, it is assumed that the ship owner pays for travel to the loading port of backhaul and that the third party producer pays daily hire rate times round trip travel time, insurance, port visit costs, and fuel for the backhaul loaded journey. FIG. 6 shows the ship schedule 600 that maximizes the LNG producer's profitability. Three cargoes 602, 604, 606 (two by Ship 1 and one by Ship 2) are delivered to the customer 504. In addition, two cargoes 608, 610 are diverted to the spot buyer 506. These are delivered by Ships 2 and 3. Finally, while returning from delivering cargo to 506, Ship 3 picks up cargoes 612, 614 from the third party producer 508 and delivers them to customers 510 and 512, respectively.

Figure 7:
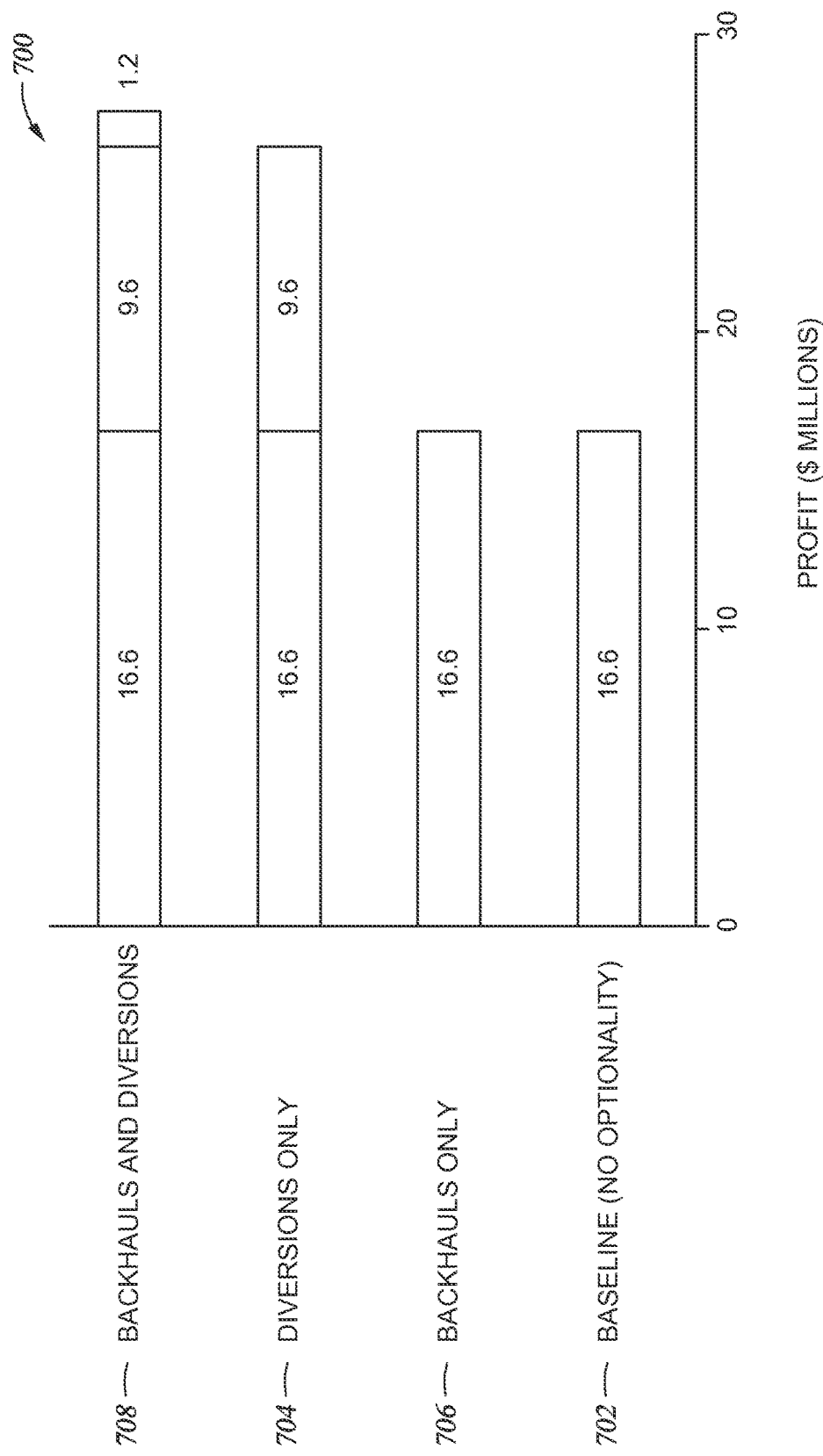
FIG. 7 is a chart showing profit earned by different ship scheduling scenarios, including the ship schedule of FIG. 6.

FIG. 7 is a graph 700 that compares total profit from various shipping options. The baseline option 702, where only contractual deliveries are considered, provides a profit of $16.6 million. The option permitting diversions 704 in the schedule leads to an incremental profit of $9.6 million above the baseline case. Interestingly, the option for doing backhauls 706 is not profitable when considered in the absence of diversions. However, the option 708 that permits diversions and backhauls leads to an additional $1.2 M in profit beyond the enhanced profit of diversions in option 704. Hence, in this case the value combining diversion and backhaul options is greater that the sum of the individual options. While this example considers a small fleet of ships over a relatively short planning horizon, including optionality considerations can make optimization of ship schedules extremely complex especially when asset size (e.g. number of ships) or the planning horizon increases. This example demonstrates that a ship schedule optimization model can provide a consistent method for developing LNG delivery schedules that not only satisfy contractual obligations and account for operational constraints but also maximize profitability by exploiting market opportunities and contractual flexibility. The model benefits individual projects or project portfolios. Further, as demonstrated by this example, the model can be a powerful tool for valuing individual options or complex baskets of options that rely on shipping capacity.

Figure 8:
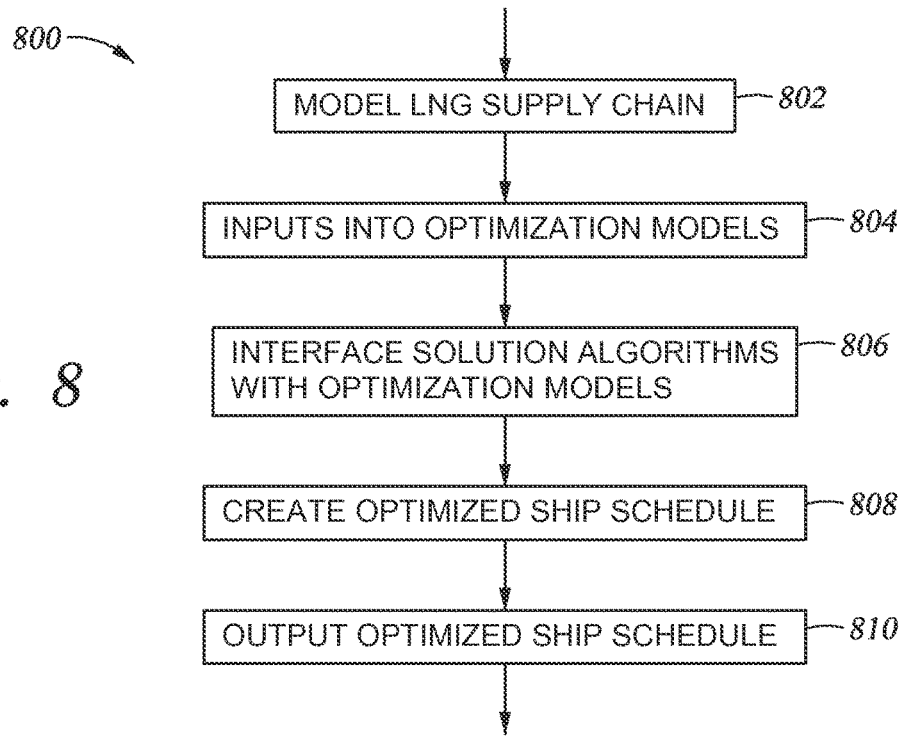
FIG. 8 is a flowchart showing a method of generating an optimized ship schedule and terminal inventory profile according to disclosed aspects and methodologies.

FIG. 8 is a flowchart showing a method 800 of generating an optimized ship schedule and terminal inventory profile according to aspects and methodologies disclosed herein. The ship schedule and terminal inventory profile is configured to deliver LNG from one or more LNG liquefaction terminals to one or more LNG regasification terminals using a fleet of ships. According to method 800, at block 802 an LNG supply chain is modeled using a plurality of optimization models. The LNG supply chain includes at least one LNG liquefaction terminal, at least one LNG regasification terminal, and a fleet of one or more ships. The fleet of ships may include ships that are leased, owned, in-chartered, and/or are available for spot LNG transport. The LNG supply chain may also include at least one customer having a purchase contract, which may be a long term contract. The LNG supply chain may also include at least one spot LNG buyer. At block 804 a plurality of inputs relevant to the LNG supply chain are accepted and input into the optimization models. The inputs are data, such as data regarding liquefaction terminals, regasification terminals, contractual obligations, spot market opportunities, optionality opportunities, shipping fleet, and/or customer requests. The plurality of inputs may include constraints, such as a heel amount upon discharge at a regasification terminal. At block 806 one or more solution algorithms are applied to the optimization models. The solution algorithms may include aspects of constraint programming, mathematical programming, dynamic programming, approximate dynamic programming, heuristic methods, genetic algorithms, evolutionary algorithms, combinatorial algorithms, or any combination thereof. At block 808 the plurality of optimization models are run using the interfaced solution algorithms to create an optimized ship schedule. The optimized ship schedule may be a schedule for at least one ship that is owned or leased by a customer or supplier. Optimizing the ship schedule may include optimizing any optionality that is part of the LNG supply chain. Uncertainty is accounted for in the optimized ship schedule. The solution algorithms used to solve the optimization models may be run using a processor in a computer system. At block 810 the optimized ship schedule is output to an output device, such as a display having a graphical user interface. Other aspects and methodologies as disclosed herein may be included in method 800.

Price Model

As previously stated, optionality is the value of additional optional investment opportunities available only after having made an initial investment. LNG contracts contain several potentially different options that can be exercised at different times. For example, the LNG supplier may have the right to divert some percentage of the contracted volume away from the original destination market to another region or customer. Thus it is helpful to be able to value these options and decide when to exercise them. According to disclosed methodologies and techniques, optionality is valued from two different perspectives: i) the market perspective and ii) the internal company perspective. Valuing an option from the market perspective determines its fair market price, which can often be useful in contract negotiations, while valuing an option from the internal perspective determines the value of the option to the company. These two option valuation frameworks are distinctly different. The internal perspective, in juxtaposition to the market perspective, often takes into account the proprietary assets (physical assets, fiscal terms etc.) of the company in question, which may increase the value of any option relative to its fair market price.

For both internal and market perspective analyses, a model for future natural gas (and potentially crude oil as well) spot prices is useful. From the market perspective, deriving the forward curve for any commodity often requires an underlying spot model (in addition to a convenience yield model). From the internal perspective, the odds of some future spot price realizations can be useful, since a supplier may be paid a price indexed to the spot price of natural gas or crude oil at the time of the delivery of a cargo. An objective of the disclosed methodologies and techniques relating to price modeling is to develop a suite of tools to model the probabilistic evolution of natural gas prices over time. The suite of tools provides a set of probabilistic price scenario generation for natural gas (and crude oil) using historical information for natural gas and/or crude oil spot and futures prices. This is not a point forecast of prices but instead a method of providing the odds of certain future price realizations.

The price modeling suite according to disclosed methodologies and techniques include the following:

Formulation of Stochastic Models: Natural gas and crude spot prices are modeled using stochastic processes. There are numerous models from which one can choose depending on the desired market to be modeled.

Calibration of Models: To produce an accurate model of the underlying physical phenomena, calibration methods to tune parameters to historical data are useful. A variety of different calibration techniques are provided for use with the disclosed methodologies and techniques.

Solution of Models: Stochastic models are solved to obtain generated price scenarios. The corresponding stochastic differential equations can be analytically solved to obtain probability distribution of generated price scenarios. Alternatively, Monte Carlo simulation may be used to generate price scenarios.

Validation of Models: Models are validated against the empirical data. The suite of tools according to disclosed methodologies and techniques contains a variety of statistical tests to validate the models, such as the Chi square test for goodness of fit.

Optionality Planning Model

According to disclosed methodologies and techniques, the optionality planning model takes a long-term perspective in identifying the possible benefits, value or advantages in potential options and investments in part or all of the global LNG market given the data necessary to describe the current state of the network considered for analysis. The optionality planning model may be used to determine alternatives available to parties on either side of a negotiating table. One interesting use is for project-by-project or portfolio analysis in negotiation of flexibility and optionality in LNG routing.

The kinds of analytical questions addressed by the disclosed optionality planning model include: the value and potential savings of negotiating an option such as a swap, backhaul, or co-load with another party or multiple parties; the potential values of the next best alternatives to oneself and to other parties; and the sensitivity to uncertainty in price or cost of service to these benefits, values or opportunities.

The optimization model may be solved for improved or optimized profitability from one or multiple perspectives such as oneself or another party. The optimization model can ignore solutions and find next best alternatives (i.e. solving for the K-best solutions). A solution to the optimization model provides the value of an option from some party's perspective or may be used to calculate an objective from a global perspective. Calculating the ideal efficiency from a global perspective may include allowing all possible optionality in the data set to represent the best interests from a global perspective. Further, to incorporate uncertainty in the data, the model may be posed in the form of a stochastic programming model, a robust optimization model, or some other model for optimization under uncertainty. The optimization model may incorporate a network flow model and may use discrete variables to represent fixed penalties, costs or incentives on various options, batch cargo movements (e.g. due to ship or cargo sizes), limits on options (e.g. IF-THEN logic on option constraints). A single time period snapshot or multi-period time horizon could be considered.

Various types of options or optionality are considered, such as diversions, swaps, backhauls, ship outcharter, ship incharter, co-loading of ships. Also considered are limits on potential opportunities or deals, such as the maximum number among the same set of parties, the maximum number of parties per deal, maximum number of sets of parties dealing, disallowed deals, and the like. The solution method may include a sensitivity analysis to some particular data set or it may include algorithms to solve an optimization under uncertainty model to handle uncertainty analysis.

Data used as input includes the current state of "the world", i.e. the assumed data for the parts of the global LNG business to consider in the analysis. This could include one or more of the following: the set of projects and parties to consider, such as projects with and without a company's interest, competitors, etc.); the percent ownership of each party in each LNG project; the fraction of the supply committed at some location; projected production or liquefaction rates of LNG at each terminal for each supplier; local or regional pipeline natural gas supply and demand; shipping capacity and constraints of each project based on number, class, size, fuel type, speed range, etc. of ships, whether the ships are dedicated or pooled, and whether the ships are owned/long-term charter or spot/short-term charter; contractual demand at each regas terminal for each consumer required from each particular LNG supplier; known and/or assumed fiscal terms for each LNG project's contract; sale price structure—ideally fitting some limited functional format; flexibility of the contracts with regard to diversions and other options (ability to incharter or outcharter ships, divert cargos, buy or sell to spot); time horizon to consider; ship routes between all LNG terminals and regas terminals, even if not currently used (distance); cost of service estimates for each shipping route which may be calculated based on factors such as ship class, size, fuel type and distance; and price range projections for natural gas at each market locale (i.e. average annual spot prices) over the time horizon (as well as fuel prices). Uncertainty in the data may be represented in the form of scenarios, value ranges/sets, or probability distribution functions. Uncertain data may include natural gas prices, shipping cost of service, fuel cost, shipping capacity on particular routes, and the number, size and speed of ships traveling on a particular route.

The following example shows how the optionality planning model operates. The example model has some qualities similar to set covering models. For the purposes of this example, only swap options are considered, and only a single snapshot in time is considered instead of multiple time periods. An extension to a multi-period model should be straightforward. It is also assumed there are no partial loadings or partial discharges, and all travel is from an LNG terminal to a regasification terminal or from a regasification terminal to an LNG terminal. An intuitive path-based model is posed to illustrate some of the planning model ideas.

Consider a graph G(I,E) where I is the set of nodes including LNG terminals (L) and regasification terminals (R) and E is the set of directed arcs between nodes. Additional and artificial locations (U) may be added for removing ships from use. Flows in the model represent the movement of ships. It can be thought of as the assignment of shipping capacity along arcs or paths of travel. The model is posed as a "path-flow" formulation such that shipping capacity originates at some node, follows a path of directed arcs with no repeated arcs, and ultimately returns to its point of origin to complete a cycle. The amount of shipping capacity flowing through an LNG or regas terminal determines the amount of LNG that is loaded or discharged on an annual basis.

Sets
L set of LNG terminals
R set of regasification terminals
I set of all nodes in the network, I=L∪R
E set of directed arcs
P set of all cycles in the network
$P_i$ set of all cycles originating at node i
$P_i^L$ set of all cycles with an arc leaving some node i∈L
$P_i^R$ set of all cycles with an arc entering some node i∈R
$F_i$ set of all shipping fleets originating at node i Indices
i nodes
p cycles
f fleets Parameters
$C_{fp}$ objective target metric (e.g. shipping costs) for fleet f on cycle p
$N_f$ number of ships in fleet f
$S_f$ size/capacity of ships in fleet f
$D_{fp}$ distance (in travel days) on cycle p for ships of class f
$B_i^{LB}$ minimum LNG to load or deliver at location i
$B_i^{UB}$ maximum LNG to load or deliver at location i Variables
$x_{fp}$ amount of shipping from fleet f assigned to cycle p
$z_{fp}$ binary variable equals 1 if any shipping from fleet f is assigned to cycle p Constraints Equation 1 is a constraint that ensures that the total shipping capacity of some fleet available at some node of origin is conserved and assigned across cycles. Ships originating at LNG terminals are considered freight-on-board (FOB) and ships originating at regasification terminals are considered deliver ex-ship (DES). An inequality or a slack could be added to allow for less than all of the shipping capacity to be used. Further, the constraint may be adjusted to allow for in-charter and out-charter of shipping capacity from one node to another to add an extra level of complexity.

$$\sum_{p \in P_i} x_{fp} = N_f S_f \forall\ i \in I, f \in F_i \quad \text{(Equation 1)}$$

Equations 2 and 3 are constraints that ensure contractual and other requirements for LNG supply and demand at various nodes are met by the shipping capacity assigned to cycles passing through the node. The value 365 is used to represent the number of days in a year. The number of cycles per year is estimated by dividing 365 by the travel distance for a shipping fleet on a cycle. This estimate may be adjusted by some assumption of shipping efficiency.

$$B_i^{LB} \le \sum_{f \in F_i} \sum_{p \in P_i^L} \left(\frac{365}{D_{fp}}\right) x_{fp} \le B_i^{UB} \forall\ i \in L \quad \text{(Equations 2, 3)}$$

$$B_i^{LB} \le \sum_{f \in F_i} \sum_{p \in P_i^R} \left(\frac{365}{D_{fp}}\right) x_{fp} \le B_i^{UB} \forall\ i \in R$$

Equation 4 is a constraint containing a binary variable $z_{fp}$ that is forced to 1 if any shipping capacity from fleet f is assigned to cycle p. This constraint need not be applied for all fleets and all cycles in order to reduce the size of problem instance. The binary variable is useful for adding side constraints but may be omitted if side constraints are not used. Examples of side constraints may include a maximum number of options considered among the same set of parties, or a maximum number of parties per deal (e.g. 2).

$$x_{fp} \le N_f S_f z_{fp} \forall i \in I, f \in F_i, p \in P_i \quad \text{(Equation 4)}$$

Equation 5 is a constraint that assures non-negativity and bounds the shipping capacity variable.

$$0 \le x_{fp} \le N_f S_f \forall i \in I, f \in F_i, p \in P_i \quad \text{(Equation 5)}$$

Equation 6 is an objective function that minimizes the total transportation costs for the entire system considered.

$$\min \sum_{i \in I} \sum_{f \in F_i} \sum_{p \in P_i} C_{fp} x_{fp} \quad \text{(Equation 6)}$$

As mentioned above, many other side constraints may be added to such a model. The model as described could be used to find the lowest global general interest efficiency in LNG shipping considering swaps only. Without the "optional" binary variables, this is a linear programming (LP) formulation.

Discussion

Depending on the number of nodes in the network, the number of cycles in a problem instance may become large. The common practice of direct point-to-point shipping would only consider cycles of length 2 between pairs of LNG and regasification terminals. To consider more complex options, one may consider longer cycles, however for practical purposes there is probably a limit to cycle lengths to no more than 6 or so arcs, and the length (in days) also probably has some practical limit below the theoretical maximum of 365 days.

Table 1 shows some basic calculations for the maximum number of potential cycles that originate at an LNG terminal, i.e.

$$\left| \bigcup_{i \in L} P_i \right|.$$

TABLE 1

| | |
|---|---|
| Cycles of length 2 | L * R |
| Cycles of length 4 | L * R * (L-1) * R |
| Cycles of length 6 | L * R * (L-1) * [R * (L-2) * R + (R-1) * (L-1) * (R-1)] |

Analogous relations can be developed for the number of cycles originating at regasification terminals. This formulation is meant as an illustrative model that incorporates some but not all of the practical considerations that should be included in a detailed long-term planning application. This example model does not consider the difference between regasification rates at terminals and market demand. There are also many complexities that could be added for the purposes of the objective function related to prices, costs and investments. The following section provides a detailed list of specifications that may need to ultimately be included in the planning model.

Figure 9:
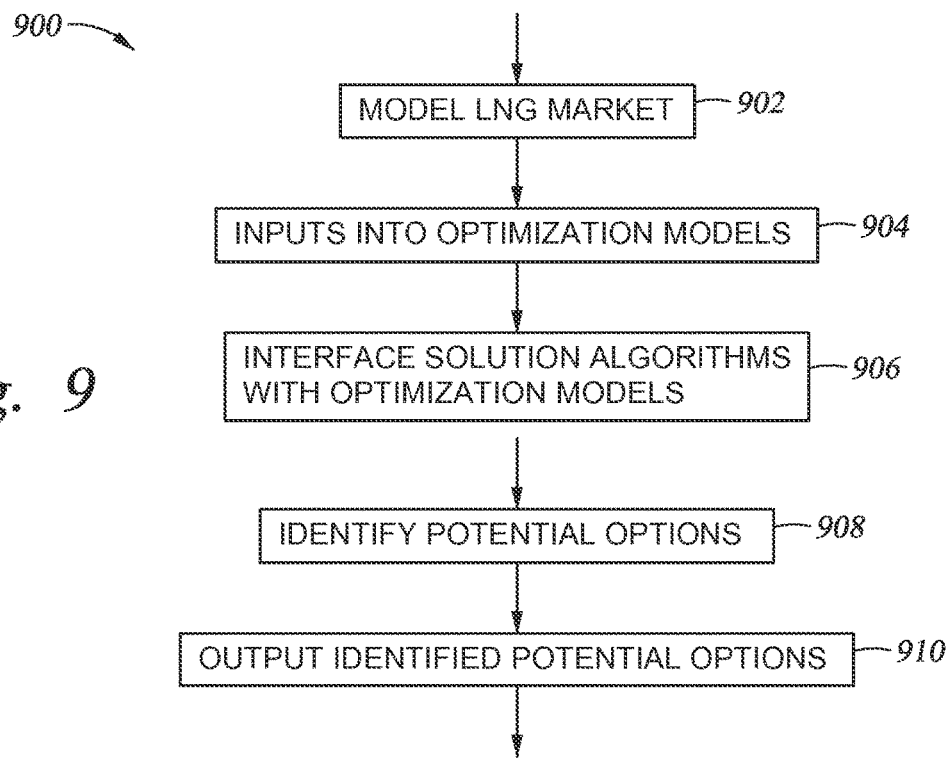
FIG. 9 is a flowchart showing a method of optionality planning according to disclosed aspects and methodologies.

FIG. 9 depicts a method 900 that implements the optionality planning model. Specifically, method 900 develops a long-term strategy for allocating an LNG supply while adhering to limitations of available shipping capacity. At block 902 an LNG market is modeled using one or more optimization models. The optimization models may be a stochastic programming model, a stochastic dynamic program, a robust optimization model, a mixed integer linear programming model, a dynamic programming model, an approximate dynamic programming model, a constraint programming model, or any combination thereof. The LNG market includes at least LNG buyer, at least one LNG seller, and at least one means of transporting LNG, such as a ship or ships. The LNG market may also include an LNG terminal. At block 904 a plurality of inputs relevant to the LNG market are accepted. The inputs may include: projects and parties to consider; percent ownership of each party in each project; the fraction of the supply committed at a location; projected production or liquefaction rates at each LNG terminal for each supplier; local and regional gas supply and demand; shipping capacity constraints; constraints of each project based on number, class, size, fuel type, and speed range of ships; whether ships are dedicated or pooled; whether ships are owned, long-term chartered, spot, or short-term chartered; markets for LNG ship outchartering; markets for LNG ship inchartering; contractual demand at each destination terminal for each consumer required from each particular supplier; known and assumed fiscal terms for each project's contract; sale price structure; flexibility of the contracts with regard to options such as the ability to incharter or outcharter ships, divert cargos, or buy or sell to spot markets; time horizon; ship routes between all supply and destination terminals; cost of service estimates for each shipping route; types or grades of available LNG; and/or LNG price range projections at each market locale over a time horizon.

At block 906 one or more solution algorithms are applied to the optimization models. At block 908 the optimization models are run, using the interfaced solution algorithms, to identify potential options in the LNG market. The identified potential options may include limits on potential deals, such as the maximum number of parties on one side of a deal, the maximum number of parties per deal, the maximum number of sets of parties dealing, and/or disallowed deals. Identifying potential options may include a sensitivity analysis to a data set. Uncertainty is accounted for in the identified potential options. Uncertainty in the inputs may be represented in scenarios, value ranges, value sets, and/or probability distribution functions. Uncertainty in the inputs may also include natural gas prices, shipping cost of service, fuel cost, shipping capacity on particular routes, the number, size and speed of ships traveling on a particular route, and/or market supply and demand scenarios. At block 910 the identified potential options are outputted. This may be accomplished using a storage device and/or a display having a graphical user interface. Other aspects and methodologies may be included in method 900 as disclosed herein.

LNG Shipping Simulation Model

LNG producers face large scale logistics problems. They need to consider the entire supply chain including production, storage, loading of cargo, transport and unloading of cargo together over time in order to maximize throughput and value where performing even a single extra shipment can result in revenues in the tens of millions of dollars. It is not enough to manage each component of the supply chain well. A holistic view of the supply chain is desired to maximize value. These types of problems involve decisions that have complex interactions (especially through time) and evaluating trade-offs can be difficult without some type of decision support system.

Simulation is the imitation of a real-world system over time. Simulation and optimization are both quantitative methods for analyzing complex systems. However, simulation and optimization take a fundamentally different approach. An optimization model intelligently searches for best choices while simulations imitate behavior programmed into the system.

There are several benefits to using a simulation model to study a complex real-world system. Simulation is extremely versatile in what can be modeled, and as such, users are able to include many details that must be abstracted away to formulate a useable optimization model. Simulation models for complex (logistics) systems also tend to be easier to implement and faster to solve than optimization models describing the same system. Simulation models also naturally incorporate uncertainty of data and parameters in the model, whereas incorporating uncertainty in optimization models adds an extra layer of modeling and algorithmic complexity. Potential solutions to optimization models can be stress-tested to validate whether the solution is robust for deployment. Simulation models are easy to explain to people. A well-designed graphical user interface (GUI) can help identify subtle interactions between decisions over time. Manual scenario exploration (asking and evaluating what-ifs) and sensitivity analysis makes sense to most users. The incremental construction of a final solution provides a natural framework for building a story that explains the solution.

Despite these advantages, simulation has its challenges. Simulations imitate behavior programmed into a system. There are several modeling obstacles encountered in simulations. One obstacle is choosing the correct level of abstraction. Various stakeholders exhibit a form of cognitive anchoring, where every operational detail is considered in their small part of the supply chain to be vital. Often this leads to unnecessary complexity in the model. It is desirable to ensure the model is detailed enough to be accurate but simple enough to understand and validate. Another challenge is that traditional simulation models tend to be reactive and local with respect to their decision-making whereas optimization models work with a holistic/global view of decision-making over time. Although a user can explore the effects of modifying decisions in a simulation, the user is not able to evaluate all potential decisions and choose the best course of action—which is precisely what an optimization system does. It is not uncommon for the output of an optimization model to be unintuitive at first glance. This is because an optimization system is able to fully leverage complex interactions between decisions that a manual analysis would be less likely to identify.

There is a subtlety with the outputs of simulation systems that is often glossed over: the outputs of a simulation are random variables and not values. This is analogous to the difference between the idea of price scenario generation and "point" forecasting, i.e., distributions and point estimates. Thus, when studying the interaction between variables in a simulation, one should understand the interactions between the distributions of the various outputs. This can sometimes be challenging especially in complex systems.

According to disclosed methodologies and techniques, shipping simulation is used mainly for validation of proposed designs, operating schedules and optionality valuations. Simulation provides more detailed modeling of the supply chain at a finer time granularity than an optimization model, which in turn evaluates whether a proposed optimal solution is indeed operational and accurate. Local and global performance of designs and schedules may be analyzed under many realizations of the uncertainties in the supply chain. This may be especially useful in those cases where an optimization model accounts for uncertainty in a limited manner. Another use for simulation may be to analyze the value of unexpected and short-lived opportunities where running a full optimization would be too time-consuming.

Other uses of simulation may be in a hybrid simulation-optimization model for design or operations planning Another use of simulation may be in providing advanced decision making capabilities (e.g., using mixed-integer programming, dynamic programming, etc.) to the simulation modules responsible for scheduling, planning maintenance and reacting to disruptions. In other words, optimization would be embedded within simulation. Alternatively, a simulator may be used as a component of optimization algorithms that consider uncertainty, e.g., stochastic or approximate dynamic programming.

The shipping simulator includes a simulation model, a simulation engine and a user interface to facilitate the construction, modification and interpretation of the simulation. The simulation model itself includes several decision-making modules to capture the behavior of the various actors in the supply chain. The modules may include: the operation of various ships and fleets, including determining ship speed, cost-of-service, fuel-mode operation, and maintenance; port operations including production, consumption and storage elements, scheduled and unscheduled maintenance, berth scheduling, and loading/unloading operations; a module for scheduling ships dealing with disruptions and price fluctuations, including the option of using sophisticated algorithms based on linear or mixed-integer programming, approximate dynamic programming or stochastic programming; a pricing module for each market with the ability to use different stochastic models for price evolution, e.g., "fundamentals" models or multi-factor mean-reverting models using historic or implied volatilities. Input to the model would include the current state of "the world", which are the parts of the global LNG business relevant for the simulation. Uncertainty in the data may be represented in the form of scenarios, value ranges/sets, and/or probability distribution functions. Uncertain data may include natural gas prices, shipping cost of service, fuel costs, travel and weather conditions, shipping traffic, availability of spot ships and contracts, unplanned maintenance and other disruptions, changes to rates of production and consumption, and the like. The user interface is used to enter/load input data into the simulation system from various sources including a spreadsheet, database, or manually entered data. The user interface provides various reports to evaluate the model along several dimensions and provides functionality to modify and compare scenarios, including manual and guided sensitivity analyses.

Figure 10:
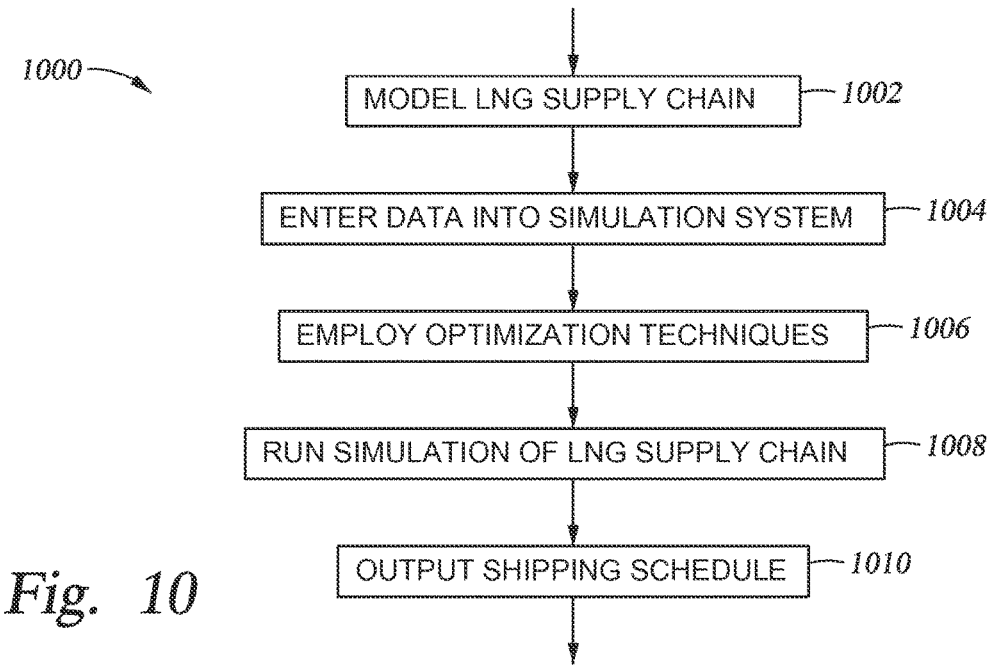
FIG. 10 is a flowchart showing a method of LNG shipping simulation according to disclosed aspects and methodologies.

FIG. 10 is a flowchart showing a method 1000 of LNG shipping simulation according to disclosed aspects and methodologies. At block 1002 an LNG supply chain with a plurality of decision-making modules is modeled. The decision-making modules capture behavior of various elements of an LNG supply chain, which may include one or more LNG customers bound by a long term contract, at least one spot LNG buyer, a fleet of ships where at least one of the ships is leased, owned, in-chartered, and/or available for transport of a spot LNG cargo. The decision-making modules are configured to capture behavior over a time period ranging from 30 days to 800 days. The decision-making modules may include: a module representing operation of various ships and fleets, including determining ship speed, cost of service, fuel-mode operation, and ship maintenance; a module representing port operations, including production, consumption and storage elements, scheduled and unscheduled maintenance, berth scheduling, and loading/unloading operations; a module representing ship scheduling, including dealing with disruptions, price fluctuations and variation in market conditions such as appearance or disappearance of LNG sales or purchase opportunities, or appearance or disappearance of ship out-chartering and in-chartering opportunities (this module may include an option to use algorithms based on linear or mixed-integer programming, constraint programming, approximate dynamic programming, and/or stochastic programming); and/or a module representing pricing for each market. At block 1004 data representing a current state of at least part of the LNG supply chain is entered into a computer-based simulation system. The data may include natural gas prices, shipping cost of service, fuel costs, travel and weather conditions, shipping traffic, availability of spot ships and contracts, unplanned maintenance, shipping disruptions, changes to a rate of natural gas production, types or grades of available LNG, changes to rates of natural gas consumption, production and delivery of multiple grades of LNG, and ratability requirements for at least one contract. Data may also include constraints such as: a constraint that a ship in the fleet of ships is fully loaded at a liquefaction terminal in the LNG supply chain; a constraint that a ship in the fleet of ships is fully discharged at a regasification terminal in the LNG supply chain; a constraint that a ship in the fleet of ships is only partially loaded at a liquefaction terminal in the LNG supply chain; a constraint that a ship in the fleet of ships is only partially unloaded at a regasification terminal in the LNG supply chain; and a constraint that specifies an optimal heel amount upon discharge at a regasification terminal in the LNG supply chain. At block 1006 optimization techniques are employed with the decision-making modules to prescribe operations decisions for scheduling LNG shipping. The optimization techniques may include linear programming, mixed-integer programming, dynamic programming, constraint programming, and/or approximate dynamic programming. At block 1008 a simulation of an LNG supply chain is run using the decision-making modules, the data, and the optimization techniques, to understand the behavior of the LNG supply chain under uncertainty. The simulation of the LNG shipping schedule may also be run to determine an optimal or near-optimal LNG shipping schedule. An initial ship schedule may be used as a starting point for the simulation. Optionality in the supply chain may be optimized as described herein when the supply chain is optimized. The objective of each decision-making module may be one or more of the following: minimizing costs, maximizing profitability, satisfying contractual obligations, maximizing performance robustness, and minimizing deviation from another shipping schedule. At block 1010 an output of the simulation is sent to an output device, such as a storage device and/or a display having a graphical user interface. The output provides an understanding of the behavior of the LNG supply chain under uncertainty, and may include the average behavior of the LNG supply chain when controlled by the decision-making modules. The graphical user interface may be used to control inputs and scenarios relating to the LNG supply chain. Alternatively, the output may include an LNG shipping schedule. The shipping schedule may be an LNG shipping schedule for at least one ship owned or leased by an LNG supplier or customer.

LNG may be delivered based on the outputted LNG shipping schedule. Other aspects and methodologies may be included in method 1000 as disclosed herein. For example, the LNG operations decisions may be optimized simultaneously with one or more of the following: LNG inventory levels at a LNG liquefaction terminal in the LNG supply chain; LNG inventory levels at a LNG regasification terminal in the LNG supply chain; fuel selection for at least one voyage; a ship speed for at least one voyage; a maritime route for at least one voyage; berth assignment at a liquefaction or regasification terminal in the LNG supply chain; a ship maintenance schedule; and an LNG liquefaction schedule. As another example, a plurality of operating entities may operate at a liquefaction terminal in the LNG supply chain. The multiple operating entities may share infrastructure or may be bound by different fiscal rules. The LNG supply chain may be evaluated over one or more future scenarios.

Supply Chain Design Model

In current practice, known tools are combined to determine the "best case" and typical schedules possible under various LNG supply chain design scenarios as part of a planning process for new LNG projects. The model for LNG supply chain design according to disclosed methodologies and techniques greatly enhances the analytical capabilities possible with the current applications and work process, and further allow new analyses to be performed that would be very difficult otherwise.

An aspect of the supply chain design model is a decision support optimization application for LNG supply chain design in which the uncertainty in the system data is taken into account in the model as input data. The number, size and design of ships, terminal berths, and storage facilities, and any other design decisions are treated as optimization variables rather than fixed input data. Additional design and operations ideas may be implemented within such a system including moving storage of LNG on ships with excess capacity, partial loads and discharges, and the like. The disclosed methodologies and techniques may also be used to design projects to be integrated within a wider portfolio of LNG projects while considering the associated tradeoffs and benefits. The optimization model may look at a single time period snapshot or multi-period time development horizon. A solution to the optimization model may give a complete LNG supply chain design. The target advantages of the supply chain design model are to improve reductions of capital costs due to increased exploration of design scenarios. The integration of uncertainty within the optimization model also enables it to produces robust designs that can lead to more profitable performance under efficient operational conditions.

The supply chain design model has a base capability to determine the optimal cost-based design considering the expected cost. Further, it may be used to determine the optimal profit-based design considering the expected costs and revenues. The model allows the evaluation of the tradeoffs between a robust schedule and a design for the determination of which designs are appropriate under different assumptions of ship utilization, operational efficiency, etc. The design effects of unconventional operations such as floating storage and partial discharges may also be explored. From a portfolio perspective, the supply chain design model may be used as an integrated optimization tool for the design of robust LNG supply chains for future LNG markets where fleets of ships service a portfolio of LNG projects.

Data used as input for the analysis of the LNG project supply chain design include a wide variety of information regarding the planned production rates, ship design options, contractual requirements and fiscal terms, contract flexibility, ship routing data, as well as price and cost projections. Uncertainties in the data may include the capital and operating costs, disruptions and delays for ships, berths and terminals, maintenance and repairs, and short-to-long term opportunities and options.

Many optimization under uncertainty techniques require solving a sub-problem (in this case the schedule optimization problem) and simulating a forward problem many times under different scenarios as part of a decomposition-based solution approach. The disclosed methodologies and techniques relating to the supply chain design model may have a technical dependency on the ship scheduling model and may require the LNG shipping simulation model to be integrated therein.

Figure 11:
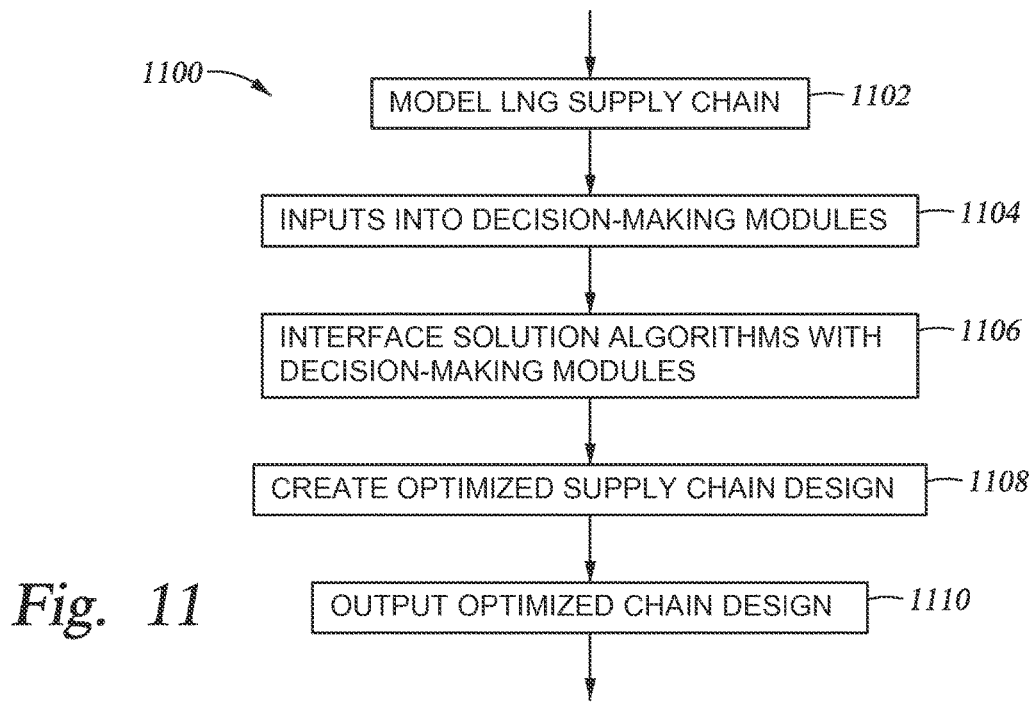
FIG. 11 is a flowchart showing a method of modeling a LNG supply chain according to disclosed aspects and methodologies.

FIG. 11 is a method 1100 for generating a LNG supply chain design. At block 1102 an LNG supply chain is modeled using one or more optimization models. The LNG supply chain may include a fleet of ships, at least one LNG regasification terminal, at least one LNG liquefaction terminal, multiple customers having purchase contracts of varying terms, and at least one LNG storage facility. The optimization models may be based on constraint programming, mathematical programming, dynamic programming, approximate dynamic programming, stochastic programming, and/or robust optimization. At block 1104 a plurality of inputs relevant to the modeled LNG supply chain are input into the optimization models. The inputs may include data regarding planned production rates, ship design options, contractual requirements, fiscal terms, contract flexibility, ship routing data, price projections, and/or cost projections. At block 1106 one or more solution algorithms are applied to the optimization models. The solution algorithms may include commercial solvers, heuristics, and/or exact solution methods. At block 1108 the optimization models are solved using the interfaced solution algorithms to create an optimized supply chain design. Uncertainty in the supply chain model is accounted for as input data. The uncertain input data can take the form of delays in travel time for ships, unavailability of terminals, tanks, ships or berths, reductions in storage capacity, etc. The uncertainty of data can be represented through probability distribution functions, ranges of values or discrete sets of values and multiple scenarios. The size, number, and design of the at least one ship, at least one terminal berth, and at least one storage facility, and the specifications of other design decisions are treated as variables in the plurality of optimization models. At block 1110 the optimized supply chain design is outputted. Based on the outputted supply chain design, a supply chain may be developed and LNG may be delivered.

Other aspects and methodologies may be included in method 1100 as disclosed herein. For example, a ship scheduling model and/or a shipping simulation model may be integrated with the supply chain design. The input data may include data regarding one or more of planned production rates, ship design options, contractual requirements, fiscal terms, contract flexibility, ship routing data, price projections, and cost projections. Uncertainty in the input data may include comprise data regarding one or more of capital costs, operating costs, disruptions and delays for ships, berths and terminals, maintenance and repairs, and short-to-long term opportunities and options. Uncertainty may be further accounted for by solving a subproblem and simulating a forward problem many times under different scenarios as part of a decomposition-based solution approach. The customers in the LNG supply chain may include at least one LNG customer that is bound by a long term contract, or may include at least one spot LNG buyer. The fleet of ships includes a ship that is one of leased, owned, in-chartered, and available for transport of a spot LNG cargo. The input data may include one or more of: production and delivery of multiple grades of LNG; ratability requirements for at least one contract; a constraint that a ship in the fleet of ships is fully loaded at one of the one or more LNG liquefaction terminals; a constraint that a ship in the fleet of ships is fully discharged at one of the one or more LNG regasification terminals; a constraint that a ship in the fleet of ships is only partially loaded at one of the one or more LNG liquefaction terminals; and a constraint that a ship in the fleet of ships is only partially unloaded at one of the one or more LNG regasification terminals. The supply chain design may be optimized simultaneously with one or more of the following: LNG inventory levels at one of the at least one LNG liquefaction terminals; LNG inventory levels at one of the at least one LNG regasification terminals; a maritime route for at least one voyage; berth assignment at one of the at least one LNG liquefaction or LNG regasification terminals; a ship maintenance schedule; and an LNG liquefaction schedule. Multiple operating entities may operate at one of the one or more LNG liquefaction terminals. The multiple operating entities may share infrastructure or may be bound by different fiscal rules. The input data may include data regarding one or more of liquefaction terminals, regasification terminals, contractual obligations, spot market demand, shipping fleet, and customer requests, weather and maritime transportation, market and contract prices. An objective of the optimization may be to minimize costs, maximize profitability, satisfy contractual obligations, maximize performance robustness, exploit optionality, and/or minimize deviation from another schedule. The optimized supply chain design may be outputted to a display having a graphical user interface. The optimization models may perform optimization over a time period ranging from one to thirty years. An initial ship schedule is used as a starting point for the supply chain design optimization. Performance of an optimized supply chain design is evaluated over one or more future scenarios.

Valuation and Validation Analyses

Using all of the above models, a wide array of opportunities for advanced analysis is enabled. These analyses can be categorized primarily as valuation of options and opportunities or validation of an analysis at higher levels of fidelity. Several envisioned valuation and validation analyses can be performed with the above described models. The following non-exhaustive list of examples of valuation and validation analyses include: (a) the valuation of short-term options, or optionality, such as diversions, ship in-chartering, ship out-chartering, backhaul opportunities, etc. from the market perspective and internal perspective; (b) validation of long-term options and opportunities; (c) validation of shipping schedules; and (d) validation of supply chain design profitability and operability. These examples are now described in more detail.

Valuation of Short-Term Optionality from Market Perspective

The valuation of short-term (i.e., less than 90 days) optionality from the "market perspective" involves using the statistics of natural gas future spot prices and then determining the value of an option from the perspective of a risk neutral market observer. This method involves the use of a price model along with general estimates for revenues and costs based on market data. In traditional quantitative finance, a derivative contract (put, call, forward, etc.) is valued from the market perspective through risk neutral valuation. This gives the no-arbitrage value of the option, that is, the value that should prevail in the market under the perfect conditions that underlie a competitive model. For example, the Black Scholes formula for European option pricing assumes that the underlying asset's price is modeled by Geometric Brownian Motion. Black and Scholes (1973)

showed that any derivative whose payoff satisfies the assumption must satisfy a partial differential equation that can be solved analytically. Similarly, models of forward curves for natural gas have been suggested. These models assume some underlying spot price model for natural gas and some convenience yield model to represent the cost of storage, carry, etc. Partial differential equations can be derived from these models and can be solved analytically or numerically to obtain forward curves.

The options embedded in typical LNG delivery contracts are classified in quantitative finance as "exotic options." It is much more difficult to value these options and closed-form solutions thereof might not be obtained. Advanced computational solution techniques may be needed to solve the underlying mathematical equations for these options.

Valuation of Short-Term Optionality from Internal Company Perspective

The valuation of optionality from the "internal perspective" involves using the statistics of natural gas price scenario generation in the future and determining the value of an option considering internal operational complexities. This method involves combining probability distribution of prices from the price model and class-specific optimization models such as ship scheduling or shipping simulation to make operational and valuation decisions. The ship scheduling model provides a basis for value assuming operations are executed in an optimized fashion while the shipping simulation model provides a basis assuming average or suboptimal operations.

The valuation from the market perspective assumes a no-arbitrage environment and ignores the proprietary assets and information that a specific company has at its disposal. Valuation of an option may significantly differ when these proprietary assets are considered. As an example, consider the diversion of a specific LNG cargo, where the delivery price for the diverted cargo is based on some index value in the future. One approach to determine the value of the diversion from one party's internal perspective uses the price model to obtain probabilistic paths for divertible and contractual destination markets, and the generated price scenarios, diversion penalties and cost of service data to value the diversion opportunity. Then, if the opportunity is likely to be profitable, the ship scheduling model is used to ensure that contractual delivery obligations can still be met. However, determining the value of the diversion can be examined from a holistic perspective, where instead of first deciding whether the opportunity is profitable, only the price scenarios are generated, and the ship scheduling model is run with the generated price scenarios as inputs to optimize the entire circuit such that some objective function (e.g. expected profitability) is maximized and contractual obligations are still satisfied. This ship scheduling model is run twice with and without diverting the specific cargo. Next the statistics of the difference between both models are analyzed to determine the value of the option. Thinking of value from a holistic perspective may uncover synergies that may affect the decision ultimately taken.

Valuation and Validation of Long-Term Optionality

Validation of long-term (i.e., 90 days or more) options and opportunities is achieved by using the optionality planning model to identify and estimate the value of potential long-term options and then using the ship scheduling model to validate the feasibility of the opportunity and more accurately determine the value thereof. Identifying and valuing options to be arranged over a long period of time (e.g. swap potential) is another capability. However, macro-scale estimates of opportunities identified in the global LNG market do not account for operational logistics.

In an aspect of disclosed methodologies and techniques, a method is provided for high-level planning analysis to identify optionality opportunities such as swaps over the long term. According to the method, it is determined whether the identified value can be realized when considering operational details. The optionality planning model is used to identify opportunities using high-level estimates, averages and aggregations of a set of LNG supply chain and market information. As noted above, there may be complexities in the detailed logistics and shipping schedules that are ignored at this high-level. To validate value estimates, various optionality planning scenarios under consideration are then used as input into the ship scheduling model to determine optimized operations and examine whether the estimated value can be achieved while considering the complexities of real-world operations. If there is a discrepancy, then it may not be possible to capture the full value of the option as estimated.

Validation of Shipping Schedules

The ship scheduling optimization models enable the planning of efficient operations and optimized delivery schedules for both individual projects and portfolios. The suite of proposed scheduling models is used in analyses at several levels of decision-making (strategic, tactical and operational). To manage the complexity of the optimization models there are some operational aspects that are either ignored in the models or modeled in a limited fashion (e.g., some aspects of operational uncertainty). The simulation model enables a more detailed analysis of the supply chain operations at a finer time granularity than the optimization models. The simulator could therefore be used to validate whether an optimized schedule is indeed operational and accurate. Furthermore, it is possible to analyze the performance of proposed schedules under many realizations of the uncertainties in the supply chain.

Validation of Supply Chain Design

Validation of supply chain design profitability and operability is achieved by using the supply chain design model to generate a design for an LNG supply chain and then using the ship scheduling model to validate the feasibility of the supply chain operations along with more accurately refining or determining profitability estimates. In the design of an LNG supply chain, many of the efficiencies that are possible in operations may be overlooked, thereby leading to redundancy. Robust shipping schedules can have an identical performance metric to a schedule sensitive to disruptions. Thus assumptions regarding operations made during the design phase of an LNG supply chain can have a large impact on the level of conservatism.

As an example, once a basic design of a new LNG project is generated using the proposed supply chain design model, its best-case operational feasibility can be validated by using the basic design within the ship scheduling model. The scenario may be used within the shipping simulation model to evaluate suboptimal operations. These kinds of validations serve to provide confidence that more aggressive designs may still be operated efficiently without the need for "over-design," that is, using more ships or storage tanks than necessary. This impacts positively on project profitability by reducing capital costs and improving returns on investment. This idea extends even further when considering adding a new project to an existing portfolio and trying to leverage existing assets (ships, storage at terminals) to reduce capital investment.

Common Optimization Platform

Historically, supply chain optimization applications have been deployed as individual applications that perform a single task. Typically these applications simply take data populated from a spreadsheet or database and allow the user to run an optimization system to produce results with an indication on making some commercial decision.

According to disclosed methodologies and techniques, all models are deployed within a single platform to best enable all the analyses previously described. This common optimization platform may be developed as a plug-in architecture. With such an approach, several efficiencies are gained including the ability to capitalize on existing development skills, coordination for maintenance, support and updates of models through a single team, and the capability to seamlessly integrate future optimization models into the platform.

The common optimization platform may use a common data system. This platform would allow input from multiple formats such as spreadsheets, local or remote/server databases (SQL, MS Access) as well as Internet-based formats. Models and solution methods may be developed using various languages, libraries and platforms including C++ and other native languages, AIMMS, GAMS, AMPL or other modeling libraries. The graphical user interface (GUI) may be designed such that each model or component has a similar look and feel. Such a common platform would make it easy to add new models developed over time, and even existing legacy applications may be integrated into the common application environment. It is possible for such a platform to serve as a basis for the commercialization of other optimization models than those described here.

Figure 12:
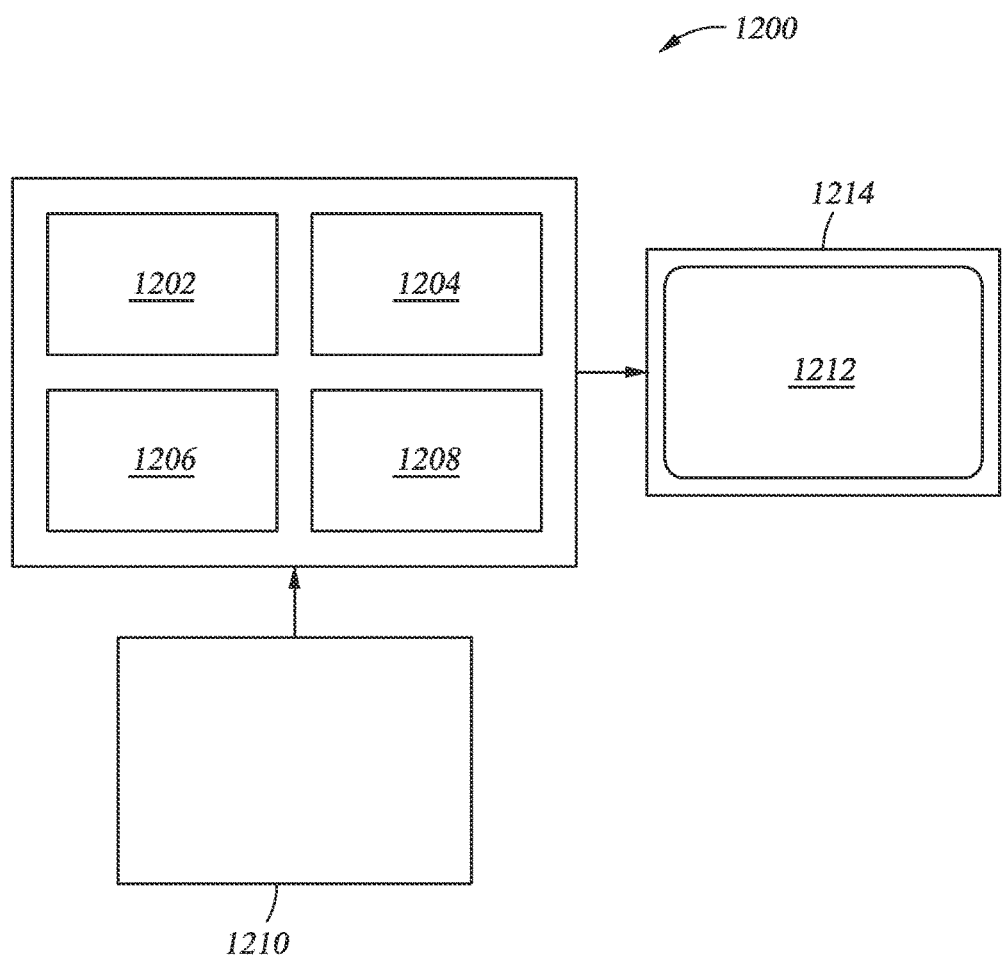
FIG. 12 is a block diagram depicting an LNG supply chain optimization platform according to aspects and methodologies.

FIG. 12 is a block diagram depicting a computer-based common LNG supply chain optimization platform 1200 according to disclosed methodologies and techniques. Platform 1200 includes the following: a computer-based supply chain design model 1202 configured to generate an LNG supply chain design as previously described herein; a computer-based shipping simulation model 1204 configured to simulate shipping of LNG as previously described herein; a computer-based ship scheduling model 1206 configured to generate an optimized ship schedule to deliver LNG from one or more LNG liquefaction terminals to one or more LNG regasification terminals using a fleet of ships as previously described herein; and a computer-based optionality planning model 1208 configured to develop a long-term strategy for allocating a supply of LNG while adhering to limitations of available shipping capacity as previously described herein. Two or more of the models 1202, 1204, 1206, and 1208 are used to valuate or validate an LNG management decision, which may be one or more of the following: valuating short-term optionality, validating long-term options and opportunities, validating shipping schedules, and validating supply chain design profitability and operability. Each of these LNG management decisions are described previously herein.

Platform 1200 includes a common data system 1210 that is used with the models 1202-1208. Platform 1200 also includes a graphical user interface 1212 designed so that each of the supply chain design model, the shipping simulation model, the ship scheduling model, and the optionality planning model have a common look and feel as displayed to a user on a display 1214. Platform 1200 may include other features as described herein.

Figure 13:
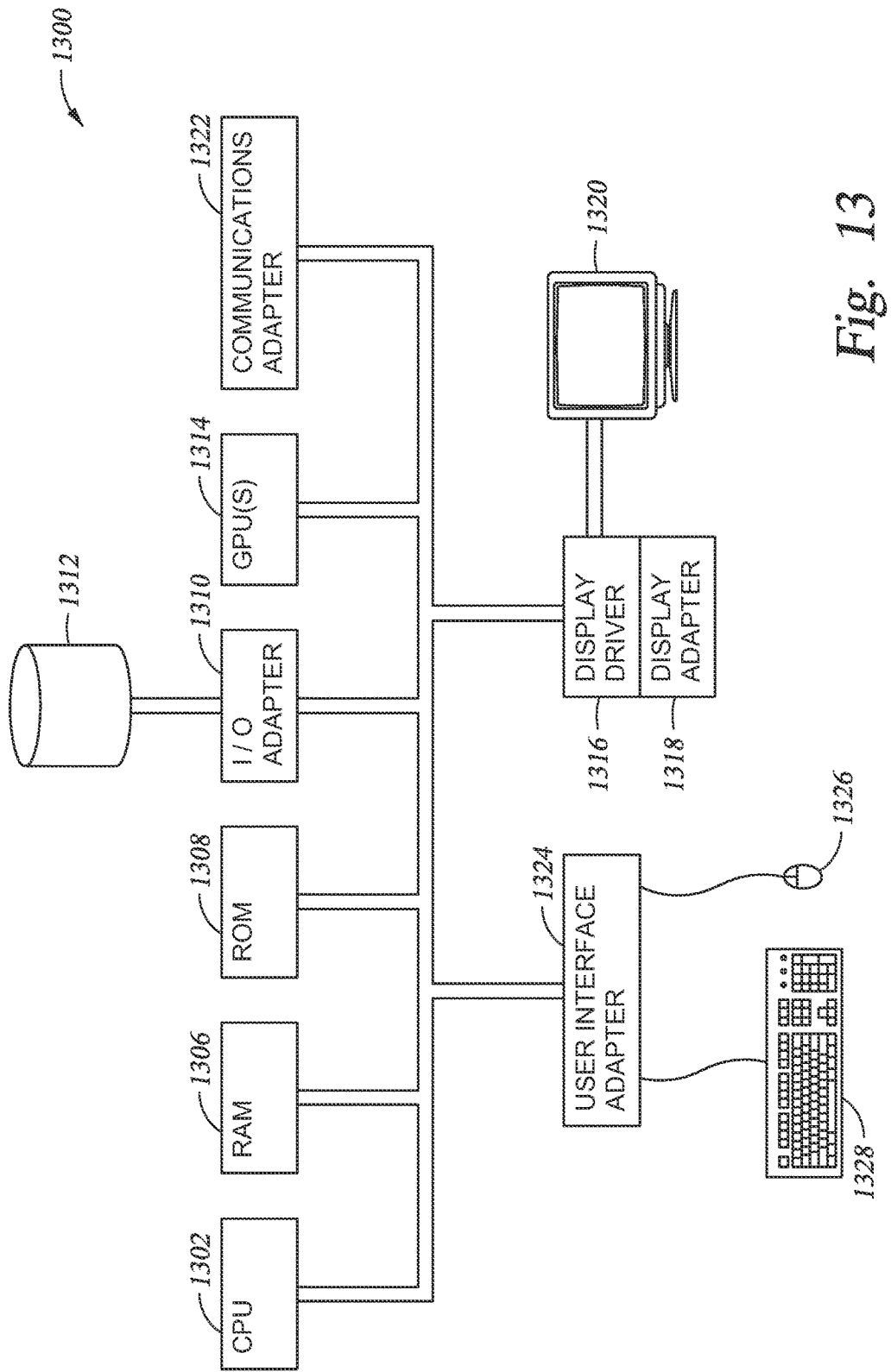
FIG. 13 is a block diagram of a computing system according to disclosed aspects and methodologies.

FIG. 13 is a block diagram of a computer network 1300 that may be used to perform any of the methods disclosed herein. A central processing unit (CPU) 1302 is coupled to system bus 1304. The CPU 1302 may be any general-purpose CPU, although other types of architectures of CPU 1302 (or other components of exemplary system 1300) may be used as long as CPU 1302 (and other components of system 1300) supports the inventive operations as described herein. The CPU 1302 may execute the various logical instructions according to various exemplary embodiments. For example, the CPU 1302 may execute machine-level instructions for performing processing according to the operational flow described above in conjunction with FIGS. 7-12.

The computer system 1300 may also include computer components such as a random access memory (RAM) 1306, which may be SRAM, DRAM, SDRAM, or the like. The computer system 1300 may also include read-only memory (ROM) 1308, which may be PROM, EPROM, EEPROM, or the like. RAM 1306 and ROM 1308 hold user and system data and programs, as is known in the art. The computer system 1300 may also include an input/output (I/O) adapter 1310, a communications adapter 1322, a user interface adapter 1324, and a display adapter 1318. The I/O adapter 1310, the user interface adapter 1324, and/or communications adapter 1322 may, in certain embodiments, enable a user to interact with computer system 1300 in order to input information.

The I/O adapter 1310 preferably connects a storage device(s) 1312, such as one or more of hard drive, compact disc (CD) drive, floppy disk drive, tape drive, etc. to computer system 1300. The storage device(s) may be used when RAM 1306 is insufficient for the memory requirements associated with storing data for operations of embodiments of the present techniques. The data storage of the computer system 1300 may be used for storing information and/or other data used or generated as disclosed herein. The communications adapter 1322 may couple the computer system 1300 to a network (not shown), which may enable information to be input to and/or output from system 1300 via the network (for example, the Internet or other wide-area network, a local-area network, a public or private switched telephony network, a wireless network, any combination of the foregoing). User interface adapter 1324 couples user input devices, such as a keyboard 1328, a pointing device 1326, and the like, to computer system 1300. The display adapter 1318 is driven by the CPU 1302 to control, through a display driver 1316, the display on a display device 1320. Information and/or representations pertaining to a portion of a supply chain design or a shipping simulation, such as displaying data corresponding to a physical or financial property of interest, may thereby be displayed, according to certain exemplary embodiments.

The architecture of system 1300 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

Figure 14:
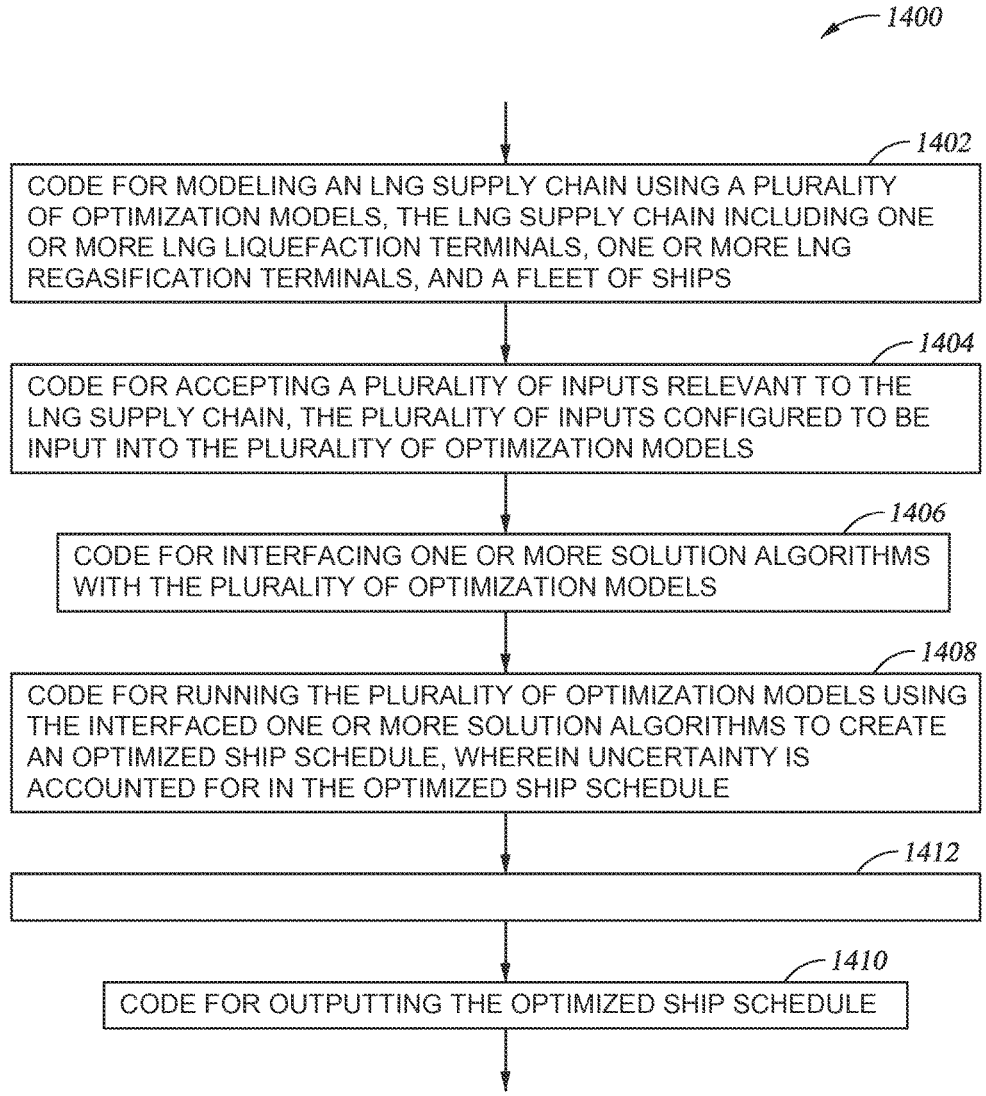
FIG. 14 is a block diagram representing computer code according to disclosed aspects and methodologies.
Figure 15:
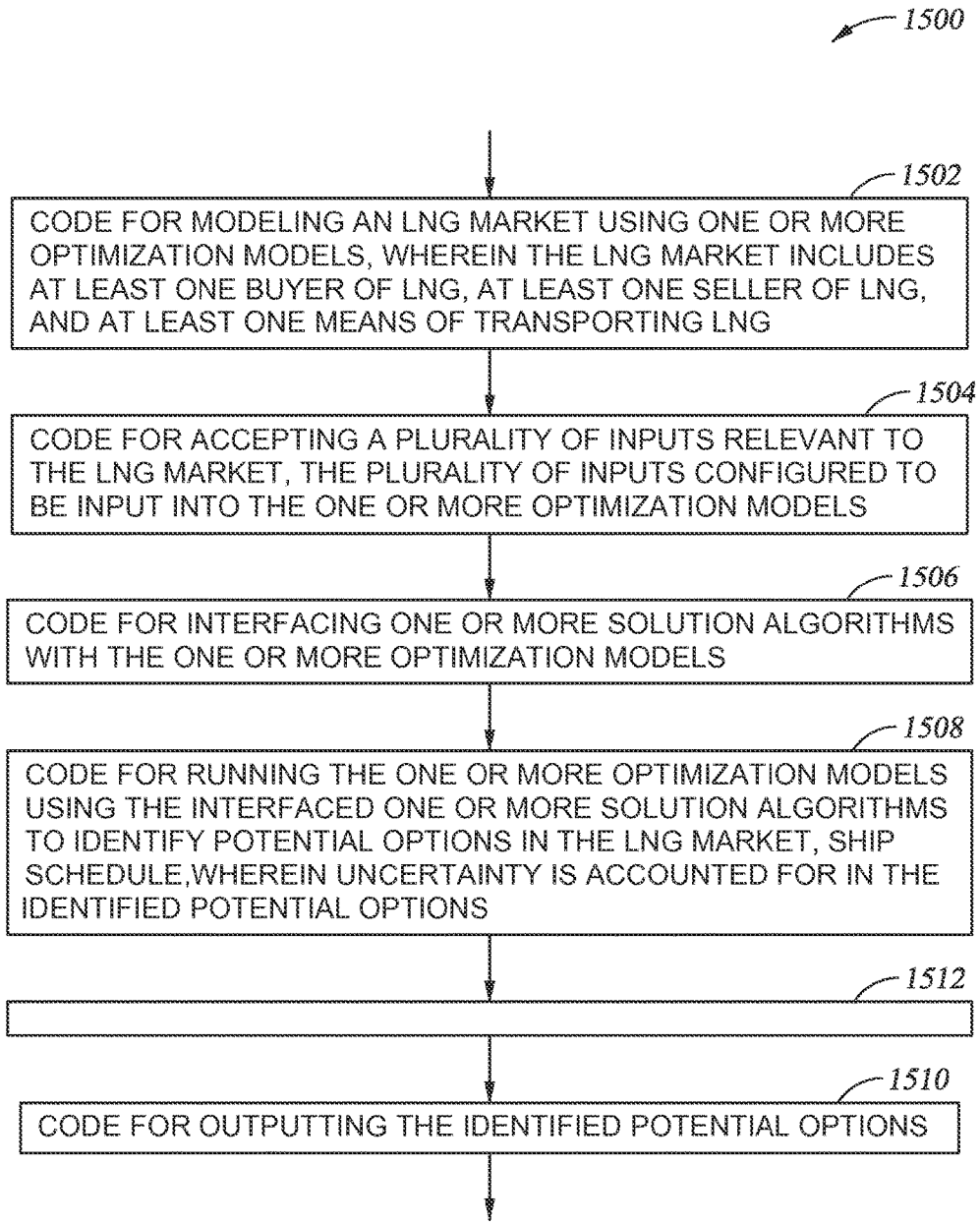
FIG. 15 is a block diagram representing computer code according to disclosed aspects and methodologies.
Figure 16:
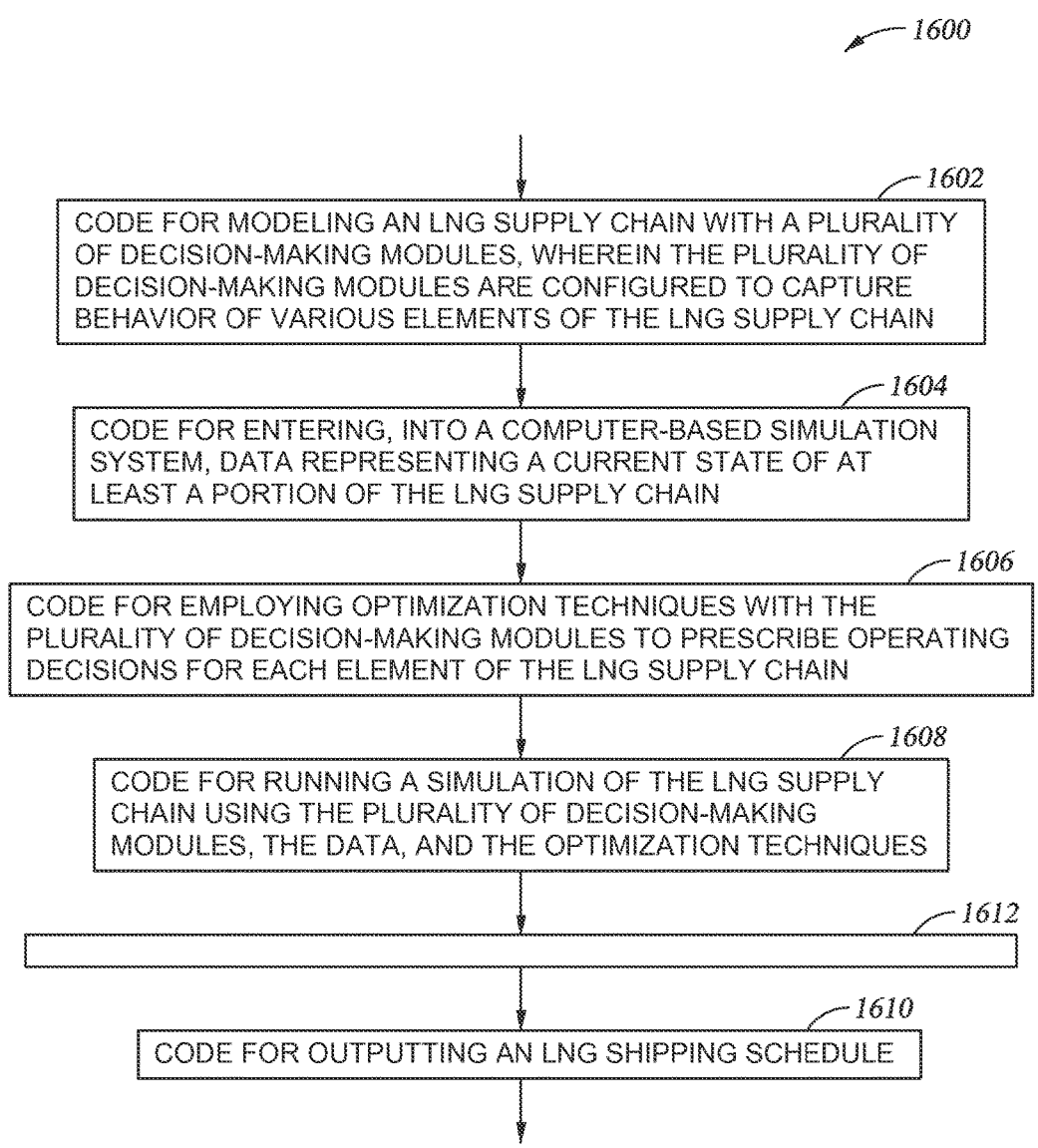
FIG. 16 is a block diagram representing computer code according to disclosed aspects and methodologies.
Figure 17:
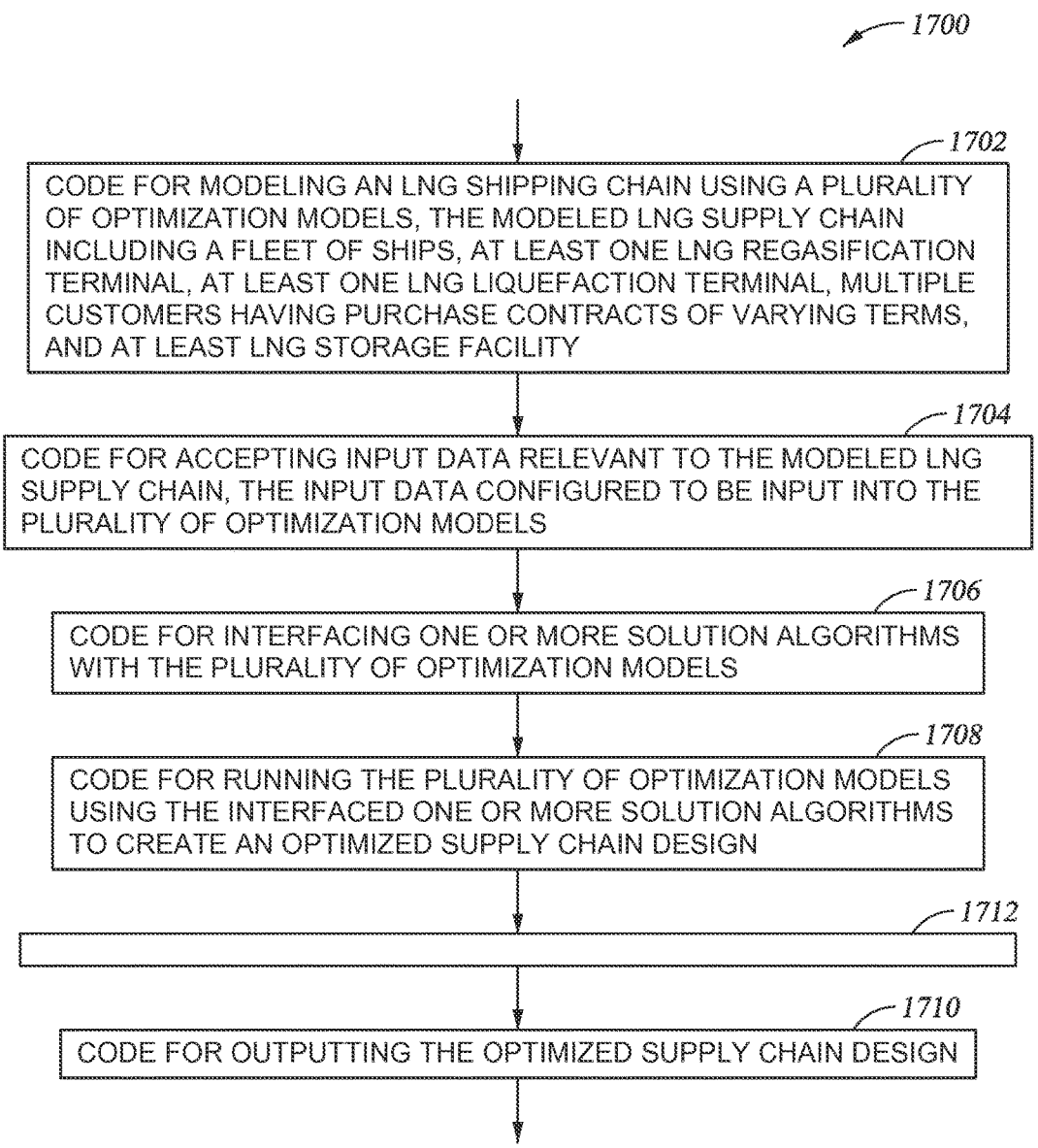
FIG. 17 is a block diagram representing computer code according to disclosed aspects and methodologies.
Figure 18:
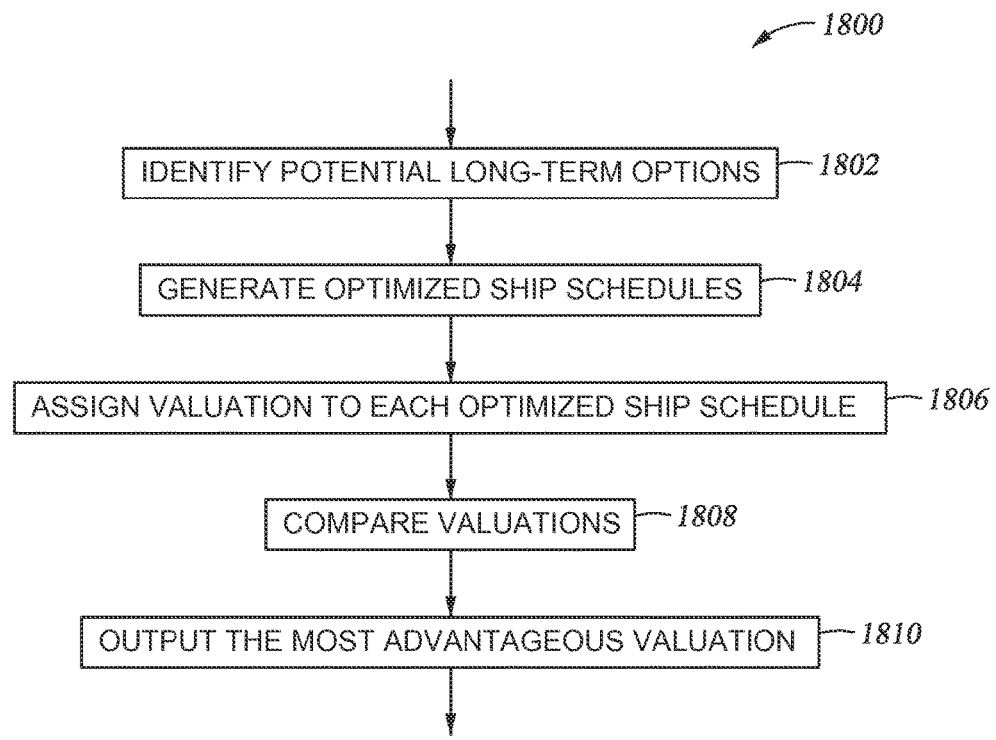
FIG. 18 is a flowchart showing a method of valuating and validating potential long-term options in an LNG market according to disclosed aspects and methodologies.

FIG. 14 shows a representation of machine-readable logic or code 1400 for generating an optimized ship schedule and terminal inventory profile to deliver LNG from one or more LNG liquefaction terminals to one or more LNG regasification terminals using a fleet of ships. Code 1400 may be used or executed with a computing system such as computing system 1300. At block 1402 code is provided for modeling an LNG supply chain using a plurality of optimization models, the LNG supply chain including the one or more LNG liquefaction terminals, the one or more LNG regasification terminals, and the fleet of ships. At block 1404 code is provided for accepting a plurality of inputs relevant to the LNG supply chain, the plurality of inputs configured to be input into the plurality of optimization models. At block 1406 code is provided for interfacing one or more solution algorithms with the plurality of optimization models. At block 1408 code is provided for running the plurality of optimization models using the interfaced one or more solution algorithms to create an optimized ship schedule, wherein uncertainty is accounted for in the optimized ship schedule. At block 1410 code is provided for outputting the optimized ship schedule. Code effectuating or executing other features of the disclosed aspects and methodologies may be provided as well. This additional code is represented in FIG. 14 as block 1412, and may be placed at any location within code 1400 according to computer code programming techniques. Code 1400 deals principally with ship scheduling, but one of ordinary skill could create code combining ship scheduling, optionality planning, LNG shipping simulation, LNG supply chain design, or any combination thereof FIG. 15 shows a representation of machine-readable logic or code 1500 used to develop a long-term strategy for allocating a supply of LNG while adhering to limitations of available shipping capacity. Code 1500 may be used or executed with a computing system such as computing system 1300. At block 1502 code is provided for modeling an LNG market using one or more optimization models, wherein the LNG market includes at least one buyer of LNG, at least one seller of LNG, and at least one means of transporting LNG. At block 1504 code is provided for accepting a plurality of inputs relevant to the LNG market, the plurality of inputs configured to be input into the one or more optimization models. At block 1506 code is provided for interfacing one or more solution algorithms with the one or more optimization models. At block 1508 code is provided for running the one or more optimization models using the interfaced one or more solution algorithms to identify potential options in the LNG market, wherein uncertainty is accounted for in the identified potential options. At block 1510 code is provided for outputting the identified potential options. Code effectuating or executing other features of the disclosed aspects and methodologies may be provided as well. This additional code is represented in FIG. 15 as block 1512, and may be placed at any location within code 1500 according to computer code programming techniques. Code 1500 deals principally with optionality planning, but one of ordinary skill could create code combining ship scheduling, optionality planning, LNG shipping simulation, LNG supply chain design, or any combination thereof FIG. 16 shows a representation of machine-readable logic or code 1600 simulating shipping of LNG. Code 1600 may be used or executed with a computing system such as computing system 1300. At block 1602 code is provided for modeling an LNG supply chain with a plurality of decision-making modules, wherein the plurality of decision-making modules are configured to capture behavior of various elements of the LNG supply chain. At block 1604 code is provided for entering, into a computer-based simulation system, data representing a current state of at least a portion of the LNG supply chain. At block 1606 code is provided for employing optimization techniques with the plurality of decision-making modules to prescribe operating decisions for each element of the LNG supply chain. At block 1608 code is provided for running a simulation of the LNG supply chain using the plurality of decision-making modules, the data, and the optimization techniques. At block 1610 code is provided for outputting an LNG shipping schedule. Code effectuating or executing other features of the disclosed aspects and methodologies may be provided as well. This additional code is represented in FIG. 16 as block 1612, and may be placed at any location within code 1600 according to computer code programming techniques. Code 1600 deals principally with LNG shipping simulation, but one of ordinary skill could create code combining ship scheduling, optionality planning, LNG shipping simulation, LNG supply chain design, or any combination thereof FIG. 17 shows a representation of machine-readable logic or code 1700 for generating an LNG supply chain design. Code 1700 may be used or executed with a computing system such as computing system 1300. At block 1702 code is provided for modeling an LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility. At block 1704 code is provided for accepting input data relevant to the modeled LNG supply chain, the input data configured to be input into the plurality of optimization models. At block 1706 code is provided for interfacing one or more solution algorithms with the plurality of optimization models. At block 1708 code is provided for running the plurality of optimization models using the interfaced one or more solution algorithms to create an optimized supply chain design. At block 1710 code is provided for outputting the optimized supply chain design. Code effectuating or executing other features of the disclosed aspects and methodologies may be provided as well. This additional code is represented in FIG. 17 as block 1712, and may be placed at any location within code 1700 according to computer code programming techniques. Code 1700 deals principally with LNG supply chain design, but one of ordinary skill could create code combining ship scheduling, optionality planning, LNG shipping simulation, LNG supply chain design, or any combination thereof FIG. 18 depicts a method 1800, in flowchart format, of valuating and validating potential long-term options in an LNG market according to disclosed aspects and methodologies. Details of each part of method 1800 are contained herein. At block 1802 potential long-term options in the LNG market are identified. At block 1804 an optimized ship schedule for each of the identified potential long-term options is generated. At block 1806 a valuation is assigned to each of the optimized ship schedules. At block 1808 the valuations are compared to determine which valuation is most advantageous. At block 1810 the most advantageous valuation is outputted.

Figure 19:
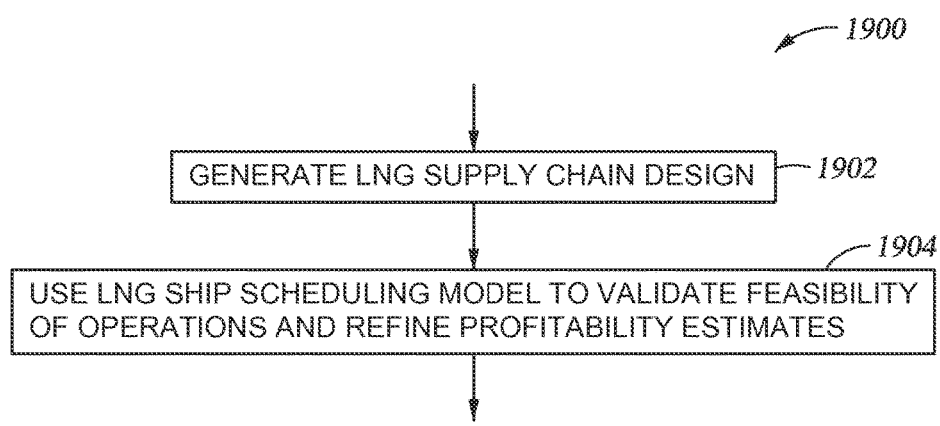
FIG. 19 is a flowchart showing a method of validating an LNG supply chain design according to disclosed aspects and methodologies.

FIG. 19 is a flowchart showing a method of validating an LNG supply chain design according to disclosed aspects and methodologies. Details of each part of method 1900 are disclosed herein. At block 1902 an LNG supply chain design is generated. At block 1904 an LNG ship scheduling model is used to validate a feasibility of operations within the LNG supply chain design and to refine profitability estimates.

Figure 20:
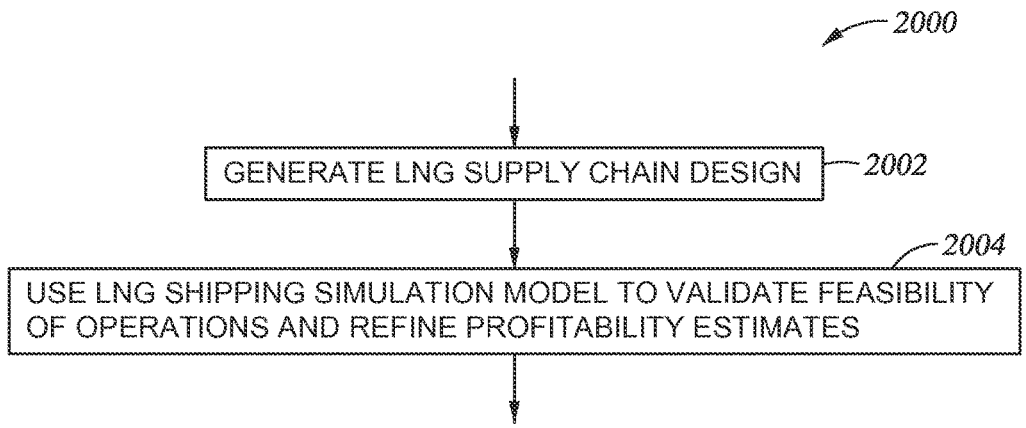
FIG. 20 is a flowchart showing another method of validating an LNG supply chain design according to disclosed aspects and methodologies.

FIG. 20 is a flowchart showing another method 2000 of validating an LNG supply chain design according to disclosed aspects and methodologies. Details of each part of method 2000 are disclosed herein. At block 2002 an LNG supply chain design is generated. At block 2004 an LNG shipping simulation model is used to validate a feasibility of operations within the LNG supply chain design and to refine profitability estimates.

Figure 21:
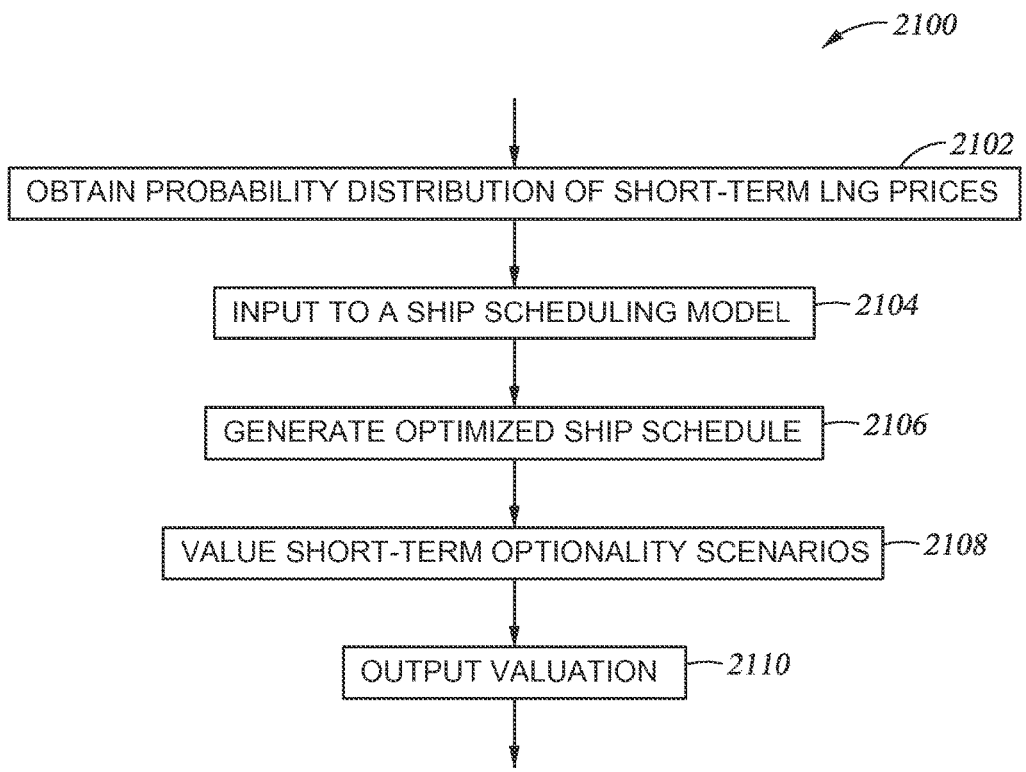
FIG. 21 is a flowchart showing a method of valuating a short-term optionality in an LNG market according to disclosed aspects and methodologies.

FIG. 21 is a flowchart showing a method 2100 of valuating a short-term optionality in an LNG market according to disclosed aspects and methodologies. Details of each part of method 2100 are disclosed herein. At block 2102 a probability distribution of short-term LNG prices is obtained. At block 2104 the probability distribution of short-term LNG prices is used as an input to a ship scheduling model. At block 2106 the ship scheduling model is run to generate an optimized ship schedule. At block 2108 outputs of the ship scheduling model are used to value short-term optionality scenarios. At block 2110 a valuation of the short-term optionality scenarios is outputted.

Figure 22:
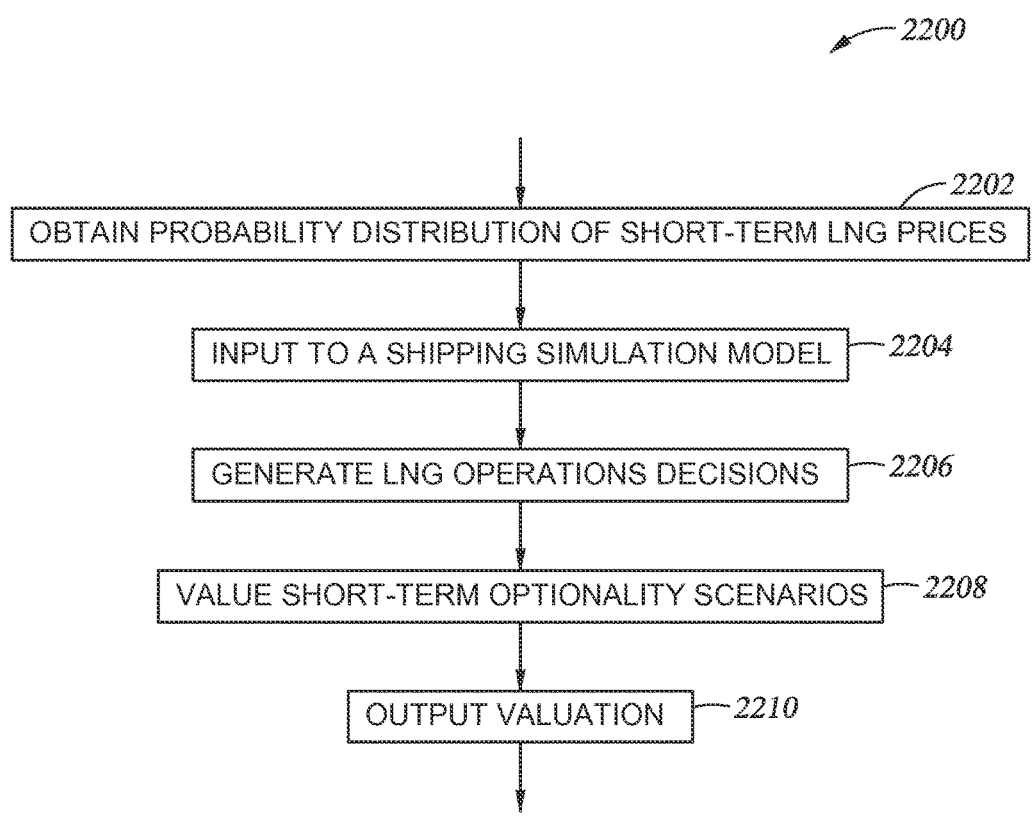
FIG. 22 is a flowchart showing another method of valuating a short-term optionality in an LNG market according to disclosed aspects and methodologies.

FIG. 22 is a flowchart showing another method 2200 of valuating a short-term optionality in a liquefied natural gas (LNG) market. Details of each part of method 2200 are disclosed herein. At block 2202 a probability distribution of short-term LNG prices is obtained. At block 2204 the probability distribution of short-term LNG prices is used as an input to a shipping simulation model that simulates shipping of LNG. At block 2206 the shipping simulation model is run to generate LNG operations decisions. At block 2208 outputs of the shipping simulation model are used to value short-term optionality scenarios. At block 2210 a valuation of the short-term optionality scenarios is outputted.

Illustrative, non-exclusive examples of methods and products according to the present disclosure are presented in the following non-enumerated paragraphs. It is within the scope of the present disclosure that an individual step of a method recited herein, including in the following enumerated paragraphs, may additionally or alternatively be referred to as a "step for" performing the recited action.

A. A system for generating an optimized ship schedule to deliver liquefied natural gas (LNG) from one or more LNG liquefaction terminals to one or more LNG regasification terminals using a fleet of ships, comprising:
  a plurality of optimization models that model an LNG supply chain, the LNG supply chain including the one or more LNG liquefaction terminals, the one or more LNG regasification terminals, and the fleet of ships;
  an input device that accepts a plurality of inputs relevant to the LNG supply chain, the plurality of inputs configured to be input into the plurality of optimization models; one or more solution algorithms interfaced with the plurality of optimization models;
  a processor that runs the plurality of optimization models using the interfaced one or more solution algorithms to create an optimized ship schedule, wherein uncertainty is accounted for in the optimized ship schedule; and
  an output device that outputs the optimized ship schedule.

A1. The system as recited in paragraph A, wherein the LNG supply chain includes at least one LNG customer that is bound by a long term contract.

A2. The system as recited in any of paragraphs A-A1, wherein the LNG supply chain includes at least one spot LNG buyer.

A3. The system as recited in any of paragraphs A-A2, wherein the fleet of ships includes at least one ship that is one of leased, owned, in-chartered, and available for transport of a spot LNG cargo.

A4. The system as recited in any of paragraphs A-A3, wherein the ship schedule is an optimized ship schedule for at least one ship owned or leased by an LNG customer.

A5. The system as recited in any of paragraphs A-A4, wherein creating an optimized ship schedule includes optimizing optionality in the LNG supply chain.

A6. The system as recited in any of paragraphs A-A5, wherein the plurality of inputs include at least one of
  production and delivery of multiple grades of LNG, and
  ratability requirements for at least one contract.

A7. The system as recited in any of paragraphs A-A6, wherein the plurality of inputs include one or more of
  a constraint that a ship in the fleet of ships is fully loaded at one of the one or more liquefaction terminals, and
  a constraint that a ship in the fleet of ships is fully discharged at one of the one or more regasification terminals.

A8. The system as recited in any of paragraphs A-A7, wherein the plurality of inputs include one or more of
  a constraint that a ship in the fleet of ships is only partially loaded at one of the one or more liquefaction terminals, and
  a constraint that a ship in the fleet of ships is only partially unloaded at one of the one or more regasification terminals.

A9. The system as recited in any of paragraphs A-A8, wherein the plurality of inputs include a constraint that specifies a heel amount upon discharge at a regasification terminal.

A10. The system of claim 1, wherein a heel amount upon discharge at a regasification terminal is optimized.

A11. The system as recited in any of paragraphs A-A10, wherein the ship schedule is optimized simultaneously with one of
  LNG inventory levels at one of the at least one LNG liquefaction terminals, and
  LNG inventory levels at one of the at least one LNG regasification terminals.

A12. The system as recited in any of paragraphs A-A11, wherein the ship schedule is optimized simultaneously with one of
  fuel selection for at least one voyage,
  a ship speed for at least one voyage.
  a maritime route for at least one voyage, and
  berth assignment at one of the at least one liquefaction or regasification terminals.

A13. The system as recited in any of paragraphs A-A12, wherein a plurality of operating entities operate at one of the one or more liquefaction terminals.

A14. The system as recited in any of paragraphs A-A13, wherein the multiple operating entities share infrastructure.

A15. The system as recited in any of paragraphs A-A14, where the multiple operating entities operating at the one of the one or more liquefaction terminals are bound by different fiscal rules.

A16. The system as recited in any of paragraphs A-A15, wherein the solution algorithms comprise one or more of commercial solvers, heuristics, and exact solution methods.

A17. The system as recited in any of paragraphs A-A16, wherein the plurality of optimization models are based on one or more of constraint programming, mathematical programming, dynamic programming, and approximate dynamic programming.

A18. The system as recited in any of paragraphs A-A17, wherein the plurality of inputs comprise data regarding one or more of liquefaction terminals, regasification terminals, contractual obligations, spot market demand, shipping fleet, and customer requests, weather and maritime transportation, market and contract prices.

A19. The system as recited in any of paragraphs A-A18, wherein an objective of the optimization is one or more of minimizing costs, maximizing profitability, satisfying contractual obligations, maximizing performance robustness, and minimizing deviation from another schedule.

A20. The system as recited in any of paragraphs A-A19, wherein the output device is a display having a graphical user interface.

A21. The system as recited in any of paragraphs A-A20, wherein the optimization models are configured to perform optimization over a time period ranging from 30 days to 800 days.

A22. The system as recited in any of paragraphs A-A21, wherein the ship schedule is optimized simultaneously with one of a ship maintenance schedule, and
an LNG liquefaction schedule.

A23. The system as recited in any of paragraphs A-A22, wherein an initial ship schedule is used as a starting point for the ship schedule optimization.

A24. The system as recited in any of paragraphs A-A23, wherein performance of an optimized ship schedule is evaluated over one or more future scenarios.

B. A method for generating an optimized ship schedule to deliver liquefied natural gas (LNG) from one or more LNG liquefaction terminals to one or more LNG regasification terminals using a fleet of ships, comprising:
using a computer, modeling an LNG supply chain using a plurality of optimization models, the LNG supply chain including the one or more LNG liquefaction terminals, the one or more LNG regasification terminals, and the fleet of ships;
accepting a plurality of inputs relevant to the LNG supply chain, the plurality of inputs configured to be input into the plurality of optimization models;
interfacing one or more solution algorithms with the plurality of optimization models;
using a computer, running the plurality of optimization models using the interfaced one or more solution algorithms to create an optimized ship schedule, wherein uncertainty is accounted for in the optimized ship schedule; and
outputting the optimized ship schedule.

B1. The method as recited in paragraph B, further comprising delivering LNG based on the optimized ship schedule.

C. A method of delivering Liquified Natural Gas, (LNG), comprising:
generating an optimized ship schedule and terminal inventory profile to deliver LNG from one or more LNG liquefaction terminals to one or more LNG regasification terminals using a fleet of ships, wherein generating the optimized ship schedule and terminal inventory profile includes
modeling an LNG supply chain using a plurality of optimization models, the LNG supply chain including the one or more LNG liquefaction terminals, the one or more LNG regasification terminals, and the fleet of ships;
accepting a plurality of inputs relevant to the LNG supply chain, the plurality of inputs configured to be input into the plurality of optimization models,
interfacing one or more solution algorithms with the plurality of optimization models,
running the plurality of optimization models using the interfaced one or more solution algorithms to create an optimized ship schedule, wherein uncertainty is accounted for in the optimized ship schedule, and
outputting the optimized ship schedule; and
delivering LNG according to the optimized ship schedule.

D. A computer program product having computer executable logic recorded on a tangible, machine-readable medium, comprising:
code for generating an optimized ship schedule and terminal inventory profile to deliver LNG from one or more LNG liquefaction terminals to one or more LNG regasification terminals using a fleet of ships, said code for generating including
code for modeling an LNG supply chain using a plurality of optimization models, the LNG supply chain including the one or more LNG liquefaction terminals, the one or more LNG regasification terminals, and the fleet of ships,
code for accepting a plurality of inputs relevant to the LNG supply chain, the plurality of inputs configured to be input into the plurality of optimization models,
code for interfacing one or more solution algorithms with the plurality of optimization models, and
code for running the plurality of optimization models using the interfaced one or more solution algorithms to create an optimized ship schedule, wherein uncertainty is accounted for in the optimized ship schedule; and
code for outputting the optimized ship schedule.

E. A method for developing a long-term strategy for allocating a supply of liquefied natural gas (LNG) while adhering to limitations of available shipping capacity, the method comprising:
modeling an LNG market using one or more optimization models, wherein the LNG market includes at least one buyer of LNG, at least one seller of LNG, and at least one means of transporting LNG;
accepting a plurality of inputs relevant to the LNG market, the plurality of inputs configured to be input into the one or more optimization models;
interfacing one or more solution algorithms with the one or more optimization models;
running the one or more optimization models using the interfaced one or more solution algorithms to identify potential options in the LNG market, wherein uncertainty is accounted for in the identified potential options; and
outputting the identified potential options.

E1. The method as recited in paragraph E, wherein the plurality of inputs comprise at least one of projects and parties to consider,
percent ownership of each party in each project,
a fraction of the supply committed at a location,
projected production rates at each LNG terminal for each supplier, and
local and regional gas supply and demand.

E2. The method as recited in any of paragraphs E-E1, wherein the plurality of inputs comprise at least one of shipping capacity constraints, constraints of
each project based on number, class, size, fuel type, and speed range of ships,
whether ships are dedicated or pooled, and
whether ships are owned, long-term chartered, spot, or short-term chartered.

E3. The method as recited in any of paragraphs E-E2, wherein the plurality of inputs comprise at least one market for LNG ship outchartering.

E4. The method as recited in any of paragraphs E-E3, wherein the plurality of inputs comprise at least one market for LNG ship inchartering.

E5. The method as recited in any of paragraphs E-E4, wherein the plurality of inputs comprise at least one of contractual demand at each destination terminal for each consumer required from each particular supplier, known and assumed fiscal terms for each project's contract, sale price structure, flexibility of the contracts with regard to options such as the ability to incharter or outcharter ships, divert cargos, or buy or sell to spot markets, and time horizon.

E6. The method as recited in any of paragraphs E-E5, wherein the plurality of inputs comprise at least one of
ship routes between all supply and destination terminals,
cost of service estimates for each shipping route,
types or grades of available LNG, and
LNG price range projections at each market locale over a time horizon.

E7. The method as recited in any of paragraphs E-E6, wherein the means of transporting LNG is one or more ships.

E8. The method as recited in any of paragraphs E-E7, wherein the LNG market further includes an LNG terminal.

E9. The method as recited in any of paragraphs E-E8, further comprising determining a next best alternative strategy available to at least one side of an LNG purchase negotiation.

E10. The method as recited in any of paragraphs E-E9, further comprising analyzing flexibility and optionality in product routing.

E11. The method as recited in any of paragraphs E-E10, wherein the one or more optimization models are run to determine improved or optimized profitability from a perspective of one or more parties in a transaction.

E12. The method as recited in any of paragraphs E-E11, further comprising identifying sub-optimal potential options in the LNG market.

E13. The method as recited in any of paragraphs E-E12, wherein uncertainty in the one or more inputs is represented as one or more of multiple scenarios, probability distribution functions, ranges of values, and a discrete set of values.

E14. The method as recited in any of paragraphs E-E14, wherein the one or more optimization models is one of a stochastic programming model and a robust optimization model.

E15. The method as recited in any of paragraphs E-E14, wherein one or more optimization models incorporate a network flow model and uses discrete variables to represent fixed penalties, costs and incentives on various options, batch cargo movements, limits on options, and IF-THEN logic on option constraints.

E16. The method as recited in any of paragraphs E-E15, wherein a time horizon is used to evaluate the identified potential options.

E17. The method as recited in any of paragraphs E-E16, wherein the time horizon is a single time period snapshot.

E18. The method as recited in any of paragraphs E-E17, wherein the time horizon is a multi-period time horizon.

E19. The method as recited in any of paragraphs E-E18, wherein the identified potential options include one or more of diversions, swaps, backhauls, ship outcharter, ship incharter, and co-loading of ships.

E20. The method as recited in any of paragraphs E-E19, wherein the identified potential options include limits on potential deals, including one or more of
maximum number of parties on one side of a deal,
maximum number of parties per deal,
maximum number of sets of parties dealing, and
disallowed deals.

E21. The method as recited in any of paragraphs E-E20, wherein identifying potential options includes a sensitivity analysis to a data set.

E22. The method as recited in any of paragraphs E-E21, wherein uncertainty in the plurality of inputs includes one or more of natural gas prices, shipping cost of service, fuel cost, shipping capacity on particular routes, the number, size and speed of ships traveling on a particular route, and market supply and demand scenarios.

E23. The method as recited in any of paragraphs E-E22, further comprising delivering LNG according to the identified potential options.

F. A method of delivering liquefied natural gas (LNG) using a long-term strategy for allocating an LNG supply that adheres to limitations of available shipping capacity, the method comprising:
modeling an LNG market using one or more optimization models, wherein the LNG market includes at least one buyer of LNG, at least one seller of LNG, and at least one means of transporting LNG;
accepting a plurality of inputs relevant to the LNG market, the plurality of inputs configured to be input into the one or more optimization models;
interfacing one or more solution algorithms with the one or more optimization models;
running the one or more optimization models using the interfaced one or more solution algorithms to identify potential options in the LNG market, wherein uncertainty is accounted for in the identified potential options;
outputting the identified potential options; and delivering LNG according to the identified potential options.

G. A computer program product having computer executable logic recorded on a tangible, machine-readable medium, comprising:
code for developing a long-term strategy for allocating a supply of liquefied natural gas (LNG) while adhering to limitations of available shipping capacity, the code for developing including
code for modeling an LNG market using one or more optimization models, wherein the LNG market includes at least one buyer of LNG, at least one seller of LNG, and at least one means of transporting LNG,
code for accepting a plurality of inputs relevant to the LNG market, the plurality of inputs configured to be input into the one or more optimization models,
code for interfacing one or more solution algorithms with the one or more optimization models, and
code for running the one or more optimization models using the interfaced one or more solution algorithms to identify potential options in the LNG market, wherein uncertainty is accounted for in the identified potential options; and
code for outputting the identified potential options.

H. A method of simulating shipping of liquefied natural gas (LNG), comprising:
modeling an LNG supply chain with a plurality of decision-making modules, wherein the plurality of decision-making modules are configured to capture behavior of various elements of the LNG supply chain;
entering, into a computer-based simulation system, data representing a current state of at least a portion of the LNG supply chain;
employing optimization techniques with the plurality of decision-making modules to prescribe operations decisions for each element of the LNG supply chain;
running a simulation of the LNG supply chain using the plurality of decision-making modules, the data, and the optimization techniques; and
outputting an optimal or near-optimal LNG shipping schedule.

H1. The method as recited in paragraph H, wherein the plurality of decision-making modules include a module representing operation of various ships and fleets, including determining ship speed, cost of service, fuel-mode operation, and ship maintenance.

H2. The method as recited in any of paragraphs H-H1, wherein the plurality of decision-making modules include a module representing port operations, including production, consumption and storage elements, scheduled and unscheduled maintenance, berth scheduling, and loading/unloading operations.

H3. The method as recited in any of paragraphs H-H2, wherein the plurality of decision-making modules include a module representing ship scheduling, including dealing with disruptions, price fluctuations and variation in market conditions such as appearance or disappearance of LNG sales or purchase opportunities, or appearance or disappearance of ship out-chartering and in-chartering opportunities.

H4. The method as recited in any of paragraphs H-H3, wherein the module representing ship scheduling includes an option to use algorithms based on one of linear or mixed-integer programming, constraint programming, approximate dynamic programming, robust optimization and stochastic programming.

H5. The method as recited in any of paragraphs H-H4, wherein the plurality of decision-making modules include a module representing pricing for each market.

H6. The method as recited in any of paragraphs H-H5, wherein the optimization techniques comprise at least one of
linear programming,
mixed-integer programming,
constraint programming,
dynamic programming, and
approximate dynamic programming.

H7. The method as recited in any of paragraphs H-H6, further comprising displaying, using a graphical user interface, time-dependent information relating to the LNG supply chain.

H8. The method as recited in any of paragraphs H-H7, further comprising using the graphical user interface to control inputs and scenarios relating to the LNG supply chain.

H9. The method as recited in any of paragraphs H-H8, wherein the data includes one or more of natural gas prices, shipping cost of service, fuel costs, travel and weather conditions, and shipping traffic.

H10. The method as recited in any of paragraphs H-H9, wherein the data includes one or more of availability of spot ships and contracts, unplanned maintenance, shipping disruptions, changes to a rate of natural gas production, types or grades of available LNG, and changes to rates of natural gas consumption.

H11. The method as recited in any of paragraphs H-H10, further comprising delivering LNG based on the outputted LNG shipping schedule.

H12. The method as recited in any of paragraphs H-H11, wherein an initial shipping schedule is used as a starting point for the simulation of the LNG shipping schedule.

H13. The method as recited in any of paragraphs H-H12, wherein the LNG supply chain includes at least one LNG customer that is bound by a long term contract.

H14. The method as recited in any of paragraphs H-H13, wherein the LNG supply chain includes at least one spot LNG buyer.

H15. The method as recited in any of paragraphs H-H14, wherein the LNG supply chain includes a fleet of ships, and wherein the fleet of ships includes at least one ship that is one of leased, owned, in-chartered, and available for transport of a spot LNG cargo.

H16. The method as recited in any of paragraphs H-H15, wherein the LNG shipping schedule is an LNG shipping schedule for at least one ship owned or leased by an LNG customer.

H17. The method as recited in any of paragraphs H-H16, wherein the optimization of the ship schedule includes optimizing optionality in the LNG supply chain.

H18. The method as recited in any of paragraphs H-H17, wherein the data include at least one of
production and delivery of multiple grades of LNG, and
ratability requirements for at least one contract.

H19. The method as recited in any of paragraphs H-H18, wherein the LNG supply chain includes a fleet of ships, and wherein the data include one or more of
a constraint that a ship in the fleet of ships is fully loaded at a liquefaction terminal in the LNG supply chain, and
a constraint that a ship in the fleet of ships is fully discharged at a regasification terminal in the LNG supply chain.

H20. The method as recited in any of paragraphs H-H19, wherein the LNG supply chain includes a fleet of ships, and wherein the data include one or more of
a constraint that a ship in the fleet of ships is only partially loaded at a liquefaction terminal in the LNG supply chain, and
a constraint that a ship in the fleet of ships is only partially unloaded at a regasification terminal in the LNG supply chain.

H21. The method as recited in any of paragraphs H-H20, wherein the data include a constraint that specifies an optimal heel amount upon discharge at a regasification terminal in the LNG supply chain.

H22. The method as recited in any of paragraphs H-H21, wherein the LNG operations decisions are optimized simultaneously with one of
LNG inventory levels at a LNG liquefaction terminal in the LNG supply chain, and
LNG inventory levels at a LNG regasification terminal in the LNG supply chain.

H23. The method as recited in any of paragraphs H-H22, wherein the LNG operations decisions are optimized simultaneously with one of
fuel selection for at least one voyage,
a ship speed for at least one voyage.
a maritime route for at least one voyage, and
berth assignment at a liquefaction or regasification terminal in the LNG supply chain.

H24. The method as recited in any of paragraphs H-H23, wherein a plurality of operating entities operate at a liquefaction terminal in the LNG supply chain.

H25. The method as recited in any of paragraphs H-H24, wherein the multiple operating entities share infrastructure.

H26. The method as recited in any of paragraphs H-H25, where the multiple operating entities operating at the liquefaction terminal are bound by different fiscal rules.

H27. The method as recited in any of paragraphs H-H26, wherein an objective of each decision-making module is one or more of minimizing costs, maximizing profitability, satisfying contractual obligations, maximizing performance robustness, and minimizing deviation from another shipping schedule.

H28. The method as recited in any of paragraphs H-H27, wherein the decision-making modules are configured to capture behavior over a time period ranging from 30 days to 800 days.

H29. The method as recited in any of paragraphs H-H28, wherein the LNG operations decisions are optimized simultaneously with one of
- a ship maintenance schedule, and
- an LNG liquefaction schedule.

H30. The method as recited in any of paragraphs H-H29, further comprising evaluating the LNG supply chain over one or more future scenarios.

I. A system for simulating shipping of liquefied natural gas (LNG), comprising:
- a plurality of decision-making modules that model an LNG supply chain, wherein the plurality of decision-making modules are configured to capture behavior of various elements of an LNG supply chain;
- an input device that enters, into a computer-based simulation system, data representing a current state of at least a portion of the LNG supply chain;
- a processor that
  - employs optimization techniques with the plurality of decision-making modules to prescribe LNG operations decisions for each element of the LNG supply chain, and
  - runs a simulation of an LNG shipping schedule using the plurality of decision-making modules, the data, and the optimization techniques; and
- an output device that outputs an LNG shipping schedule.

J. A method of delivering liquefied Natural Gas (LNG), comprising:
- modeling an LNG shipping schedule with a plurality of decision-making modules, wherein the plurality of decision-making modules are configured to capture behavior of various elements of an LNG supply chain;
- entering, into a computer-based simulation system, data representing a current state of at least a portion of the LNG supply chain;
- employing optimization techniques with the plurality of decision-making modules to prescribe operations decisions for each element of the LNG supply chain;
- running a simulation of an LNG shipping schedule using the plurality of decision-making modules, the data, and the optimization techniques;
- outputting the simulated LNG shipping schedule; and
- delivering LNG according to the LNG shipping schedule.

K. A computer program product having computer executable logic recorded on a tangible, machine-readable medium, comprising:
- code for modeling an LNG shipping schedule with a plurality of decision-making modules, wherein the plurality of decision-making modules are configured to capture behavior of various elements of an LNG supply chain;
- code for entering, into a computer-based simulation system, data representing a current state of at least a portion of the LNG supply chain;
- code for employing optimization techniques with the plurality of decision-making modules to prescribe operations decisions for each element of the LNG supply chain;
- code for running a simulation of an LNG shipping schedule using the plurality of decision-making modules, the data, and the optimization techniques; and
- code for outputting the simulated LNG shipping schedule.

L. A method of simulating shipping of liquefied natural gas (LNG), comprising:
- modeling an LNG shipping schedule with a plurality of decision-making modules, wherein the plurality of decision-making modules are configured to capture behavior of various elements of an LNG supply chain;
- entering, into a computer-based simulation system, data representing a current state of at least a portion of the LNG supply chain;
- employing optimization techniques with the plurality of decision-making modules to prescribe operations decisions for each element of the LNG supply chain;
- running a simulation of an LNG shipping schedule using the plurality of decision-making modules, the data, and the optimization techniques; and
- outputting a behavior of the LNG supply chain when controlled by the decision-making modules.

L1. The method as recited in paragraph L, wherein the behavior of the LNG supply chain is an average behavior of the LNG supply chain.

M. A method for generating a liquefied natural gas (LNG) supply chain design, comprising:
- modeling an LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility;
- accepting input data relevant to the modeled LNG supply chain, the input data configured to be input into the plurality of optimization models;
- interfacing one or more solution algorithms with the plurality of optimization models;
- running the plurality of optimization models using the interfaced one or more solution algorithms to create an optimized supply chain design; and
- outputting the optimized supply chain design;
- wherein uncertainty is accounted for in the input data, and wherein the size, number, and design of ships in the fleet of ships, the number of berths and storage capacity at each of the at least one LNG regasification terminals and LNG liquefaction terminals, and any other design decisions are treated as variables in the plurality of optimization models.

M1. The method as recited in paragraph M, wherein the one or more solution algorithms comprise one or more of commercial solvers, heuristics, and exact solution methods.

M2. The method as recited in any of paragraphs M-M1, wherein the plurality of optimization models are based on one or more of constraint programming, mathematical programming, dynamic programming, approximate dynamic programming, stochastic programming, and robust optimization.

M3. The method as recited in any of paragraphs M-M2, further comprising integrating a ship scheduling model with the supply chain design.

M4. The method as recited in any of paragraphs M-M3, further comprising integrating a shipping simulation model with the supply chain design.

M5. The method as recited in any of paragraphs M-M4, wherein the input data comprise data regarding one or more of planned production rates, ship design options, contractual requirements, fiscal terms, contract flexibility, ship routing data, price projections, and cost projections.

M6. The method as recited in any of paragraphs M-M5, wherein uncertainty in the input data comprise data regarding one or more of
- capital costs,
- operating costs,
- disruptions and delays for ships, berths and terminals,
- maintenance and repairs, and
- short-to-long term opportunities and options.

M7. The method as recited in any of paragraphs M-M6, wherein uncertainty is further accounted for by solving a subproblem and simulating a forward problem many times under different scenarios as part of a decomposition-based solution approach.

M8. The method as recited in any of paragraphs M-M7, further comprising developing a supply chain based on the outputted optimized supply chain design.

M9. The method as recited in any of paragraphs M-M8, further comprising delivering LNG based on the outputted optimized supply chain design.

M10. The method as recited in any of paragraphs M-M9, wherein the multiple customers in the LNG supply chain include at least one LNG customer that is bound by a long term contract.

M11. The method as recited in any of paragraphs M-M10, wherein the multiple customers in the LNG supply chain include at least one spot LNG buyer.

M12. The method as recited in any of paragraphs M-M11, wherein the fleet of ships includes a ship that is one of leased, owned, in-chartered, and available for transport of a spot LNG cargo.

M13. The method as recited in any of paragraphs M-M12, wherein the input data include at least one of
production and delivery of multiple grades of LNG, and
ratability requirements for at least one contract.

M14. The method as recited in any of paragraphs M-M13, wherein the input data include one or more of
a constraint that a ship in the fleet of ships is fully loaded at one of the one or more LNG liquefaction terminals, and
a constraint that a ship in the fleet of ships is fully discharged at one of the one or more LNG regasification terminals.

M15. The method as recited in any of paragraphs M-M14, wherein the input data include one or more of
a constraint that a ship in the fleet of ships is only partially loaded at one of the one or more LNG liquefaction terminals, and
a constraint that a ship in the fleet of ships is only partially unloaded at one of the one or more LNG regasification terminals.

M16. The method as recited in any of paragraphs M-M15, wherein the supply chain design is optimized simultaneously with one of
LNG inventory levels at one of the at least one LNG liquefaction terminals, and
LNG inventory levels at one of the at least one LNG regasification terminals.

M17. The method as recited in any of paragraphs M-M16, wherein the supply chain design is optimized simultaneously with one of
a maritime route for at least one voyage, and
berth assignment at one of the at least one LNG liquefaction or LNG regasification terminals.

M18. The method as recited in any of paragraphs M-M17, wherein a plurality of operating entities operate at one of the one or more LNG liquefaction terminals.

M19. The method as recited in any of paragraphs M-M18, wherein the multiple operating entities share infrastructure.

M20. The method as recited in any of paragraphs M-M19, where the multiple operating entities operating at the one of the one or more LNG liquefaction terminals are bound by different fiscal rules.

M21. The method as recited in any of paragraphs M-M20, wherein the input data comprise data regarding one or more of liquefaction terminals, regasification terminals, contractual obligations, spot market demand, shipping fleet, and customer requests, weather and maritime transportation, market and contract prices.

M22. The method as recited in any of paragraphs M-M21, wherein an objective of the optimization is one or more of minimizing costs, maximizing profitability, satisfying contractual obligations, maximizing performance robustness, exploiting optionality, and minimizing deviation from another schedule.

M25. The method as recited in any of paragraphs M-M24, wherein the optimized supply chain design is outputted to a display having a graphical user interface.

M26. The method as recited in any of paragraphs M-M25, wherein the plurality of optimization models are configured to perform optimization over a time period ranging from one to thirty years.

M27. The method as recited in any of paragraphs M-M26, wherein the supply chain design is optimized simultaneously with one of
a ship maintenance schedule, and
an LNG liquefaction schedule.

M28. The method as recited in any of paragraphs M-M27, wherein an initial ship schedule is used as a starting point for the supply chain design optimization.

M29. The method as recited in any of paragraphs M-M28, wherein performance of an optimized supply chain design is evaluated over one or more future scenarios.

N. A system for generating a liquefied natural gas (LNG) supply chain design, comprising:
using a plurality of optimization models to model an LNG supply chain, the modeled LNG supply chain including a fleet of ships, at least one LNG regasification terminal, at least one LNG liquefaction terminal, multiple customers having purchase contracts of varying terms, and at least LNG storage facility;
an input device that accepts input data relevant to the modeled LNG supply chain, the input data configured to be input into the plurality of optimization models;
a processor that
interfaces one or more solution algorithms with the plurality of optimization models, and
runs the plurality of optimization models using the interfaced one or more solution algorithms to create an optimized supply chain design; and
an output device that outputs the optimized supply chain design;
wherein uncertainty is accounted for in the input data, and wherein the size, number, and design of ships in the fleet of ships, the number of berths and storage capacity at each of the at least one LNG regasification terminals and LNG liquefaction terminals, and any other design decisions are treated as variables in the plurality of optimization models.

O. A method of delivering liquefied natural gas (LNG), comprising:
modeling an LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility;
accepting input data relevant to the modeled LNG supply chain, the input data configured to be input into the plurality of optimization models;
interfacing one or more solution algorithms with the plurality of optimization models;
running the plurality of optimization models using the interfaced one or more solution algorithms to create an optimized supply chain design;
outputting the optimized supply chain design; and delivering LNG according to the optimized supply chain design;

wherein uncertainty is accounted for in the input data, and wherein the size, number, and design of ships in the fleet of ships, the number of berths and storage capacity at each of the at least one LNG regasification terminals and LNG liquefaction terminals, and any other design decisions are treated as variables in the plurality of optimization models.

P. A computer program product having computer executable logic recorded on a tangible, machine-readable medium, comprising:

code for modeling an LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility;

code for accepting input data relevant to the modeled LNG supply chain, the input data configured to be input into the plurality of optimization models;

code for interfacing one or more solution algorithms with the plurality of optimization models;

code for running the plurality of optimization models using the interfaced one or more solution algorithms to create an optimized supply chain design; and code for outputting the optimized supply chain design;

wherein uncertainty is accounted for in the input data, and wherein the size, number, and design of ships in the fleet of ships, the number of berths and storage capacity at each of the at least one LNG regasification terminals and LNG liquefaction terminals, and any other design decisions are treated as variables in the plurality of optimization models.

Q. A computer-based common liquefied natural gas (LNG) supply chain optimization platform, comprising:

a computer-based supply chain design model configured to generate an LNG supply chain design;

a computer-based shipping simulation model configured to simulate shipping of LNG;

a computer-based ship scheduling model configured to generate an optimized ship schedule to deliver LNG from one or more LNG liquefaction terminals to one or more LNG regasification terminals using a fleet of ships; and a computer-based optionality planning model configured to develop a long-term strategy for allocating a supply of LNG while adhering to limitations of available shipping capacity;

wherein two or more of the supply chain design model, the shipping simulation model, the ship scheduling model, and the optionality planning model are used to value or validate an LNG management decision.

Q1. The computer-based common LNG supply chain optimization platform as recited in paragraph Q, wherein the LNG management decision comprises one of valuing short-term optionality, validating long-term options and opportunities, validating shipping schedules, and validating supply chain design profitability and operability.

Q2. The computer-based common LNG supply chain optimization platform as recited in any of paragraphs Q-Q1, wherein the short-term optionality is valuated for one of ship in-chartering, ship out-chartering, a diversion, and a backhaul opportunity.

Q3. The computer-based common LNG supply chain optimization platform as recited in any of paragraphs Q-Q2, wherein the short-term optionality is valuated from a market perspective.

Q4. The computer-based common LNG supply chain optimization platform as recited in any of paragraphs Q-Q3, wherein the short-term optionality is valuated from a perspective of one or more participants in the supply chain.

Q5. The computer-based common LNG supply chain optimization platform as recited in any of paragraphs Q-Q4, wherein a common data system is used with the supply chain design model, the shipping simulation model, the ship scheduling model, and the optionality planning model.

Q6. The computer-based common LNG supply chain optimization platform as recited in any of paragraphs Q-Q5, further comprising a graphical user interface designed so that each of the supply chain design model, the shipping simulation model, the ship scheduling model, and the optionality planning model have a common look and feel as displayed to a user.

Q7. The computer-based common LNG supply chain optimization platform as recited in any of paragraphs Q-Q6, wherein the supply chain design model generates an LNG supply chain design by:

modeling an LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility;

accepting input data relevant to the modeled LNG supply chain, the input data configured to be input into the plurality of optimization models;

interfacing one or more solution algorithms with the plurality of optimization models;

running the plurality of optimization models using the interfaced one or more solution algorithms to create an optimized supply chain design; and outputting the optimized supply chain design.

Q8. The computer-based common LNG supply chain optimization platform as recited in any of paragraphs Q-Q7, wherein the LNG shipping simulation simulates shipping of LNG by:

modeling an LNG supply chain with a plurality of decision-making modules, wherein the plurality of decision-making modules are configured to capture behavior of various elements of an LNG supply chain;

entering, into a computer-based simulation system, data representing a current state of at least a portion of the LNG supply chain;

employing optimization techniques with the plurality of decision-making modules to prescribe operations decisions for each element of the LNG supply chain;

running a simulation of an LNG shipping schedule using the plurality of decision-making modules, the data, and the optimization techniques; and outputting an LNG shipping schedule.

Q9. The computer-based common LNG supply chain optimization platform as recited in any of paragraphs Q-Q8, wherein the ship scheduling model generates an optimized ship schedule to deliver LNG from one or more LNG liquefaction terminals to one or more LNG regasification terminals using a fleet of ships by:

using a computer, modeling an LNG supply chain using a plurality of optimization models, the LNG supply chain including the one or more LNG liquefaction terminals, the one or more LNG regasification terminals, and the fleet of ships;

accepting a plurality of inputs relevant to the LNG supply chain, the plurality of inputs configured to be input into the plurality of optimization models;

interfacing one or more solution algorithms with the plurality of optimization models;

using a computer, running the plurality of optimization models using the interfaced one or more solution algorithms to create an optimized ship schedule, wherein uncertainty is accounted for in the optimized ship schedule; and outputting the optimized ship schedule.

Q10. The computer-based common LNG supply chain optimization platform as recited in any of paragraphs Q-Q9, wherein the optionality planning model develops a long-term strategy for allocating a supply of LNG while adhering to limitations of available shipping capacity by:

modeling an LNG market using one or more optimization models, wherein the LNG market includes at least one buyer of LNG, at least one seller of LNG, and at least one means of transporting LNG;

accepting a plurality of inputs relevant to the LNG market, the plurality of inputs configured to be input into the one or more optimization models;

interfacing one or more solution algorithms with the one or more optimization models;

running the one or more optimization models using the interfaced one or more solution algorithms to identify potential options in the LNG market, wherein uncertainty is accounted for in the identified potential options; and outputting the identified potential options.

R. A method of valuating and validating potential long-term options in a liquefied natural gas (LNG) market, comprising:

identifying potential long-term options in the LNG market;

generating an optimized ship schedule for each of the identified potential long-term options;

assigning a valuation to each of the optimized ship schedules;

comparing the valuations to determine which valuation is most advantageous; and outputting the most advantageous valuation.

R1. The method as recited in paragraph R wherein identifying potential long-term options in the LNG market comprises developing a long-term strategy for allocating a supply of LNG while adhering to limitations of available shipping capacity, including:

modeling the LNG market using one or more optimization models, wherein the LNG market includes at least one buyer of LNG, at least one seller of LNG, and at least one means of transporting LNG;

accepting a plurality of inputs relevant to the LNG market, the plurality of inputs configured to be input into the one or more optimization models;

interfacing one or more solution algorithms with the one or more optimization models;

running the one or more optimization models using the interfaced one or more solution algorithms to identify potential options in the LNG market, wherein uncertainty is accounted for in the identified potential options; and outputting the identified potential options.

R2. The method as recited in any of paragraphs R-R1, wherein generating the optimized ship schedule comprises generating an optimized ship schedule to deliver LNG from one or more LNG liquefaction terminals to one or more LNG regasification terminals using a fleet of ships, including:

modeling an LNG supply chain using a plurality of optimization models, the LNG supply chain including the one or more LNG liquefaction terminals, the one or more LNG regasification terminals, and the fleet of ships;

accepting a plurality of inputs relevant to the LNG supply chain, the plurality of inputs configured to be input into the plurality of optimization models;

interfacing one or more solution algorithms with the plurality of optimization models;

running the plurality of optimization models using the interfaced one or more solution algorithms to create an optimized ship schedule, wherein uncertainty is accounted for in the optimized ship schedule; and outputting the optimized ship schedule.

S. A method of validating a liquefied natural gas (LNG) supply chain design, comprising:

generating an LNG supply chain design; and using an LNG ship scheduling model to validate a feasibility of operations within the LNG supply chain design and to refine profitability estimates.

S1. The method as recited in paragraph S, wherein generating the LNG supply chain design comprises:

modeling the LNG supply chain using a plurality of optimization models, the modeled LNG supply chain including a fleet of ships, at least one LNG regasification terminal, at least one LNG liquefaction terminal, multiple customers having purchase contracts of varying terms, and at least LNG storage facility;

accepting input data relevant to the modeled LNG supply chain, the input data configured to be input into the plurality of optimization models;

interfacing one or more solution algorithms with the plurality of optimization models;

running the plurality of optimization models using the interfaced one or more solution algorithms to create an optimized supply chain design; and outputting the optimized supply chain design.

S2. The method as recited in any of paragraphs S-S1, wherein uncertainty is accounted for in the input data, and wherein the size, number, and design of ships in the fleet of ships, the number of berths and storage capacity at each of the at least one LNG regasification terminals and LNG liquefaction terminals, and any other design decisions are treated as variables in the plurality of optimization models.

S3. The method as recited in any of paragraphs S-S2, wherein using an LNG ship scheduling model comprises:

using a computer, modeling the LNG supply chain using a plurality of optimization models;

accepting a plurality of inputs relevant to the LNG supply chain, the plurality of inputs configured to be input into the plurality of optimization models;

interfacing one or more solution algorithms with the plurality of optimization models;

using a computer, running the plurality of optimization models using the interfaced one or more solution algorithms to create an optimized ship schedule, wherein uncertainty is accounted for in the optimized ship schedule; and outputting the optimized ship schedule.

S4. The method as recited in any of paragraphs S-S3, wherein the feasibility of operations is a best-case operational feasibility.

S5. The method as recited in any of paragraphs S-S4, further comprising using a shipping simulation model to evaluate outputs from the LNG ship scheduling model.

S6. The method as recited in any of paragraphs S-S5, wherein using the shipping simulation model comprises:

modeling the LNG shipping schedule with a plurality of decision-making modules, wherein the plurality of decision-making modules are configured to capture behavior of various elements of the LNG supply chain design;

entering, into a computer-based simulation system, data representing a current state of at least a portion of the LNG supply chain design;

employing optimization techniques with the plurality of decision-making modules to prescribe operations decisions for each element of the LNG supply chain;

running a simulation of an LNG shipping schedule using the plurality of decision-making modules, the data, and the optimization techniques; and outputting an LNG shipping schedule.

T. A method of validating a liquefied natural gas (LNG) supply chain design, comprising:

generating an LNG supply chain design; and using an LNG shipping simulation model to validate a feasibility of operations within the LNG supply chain design and to refine profitability estimates.

U. A method of valuating a short-term optionality in a liquefied natural gas (LNG) market, comprising:

obtaining a probability distribution of short-term LNG prices;

using the probability distribution of short-term LNG prices as an input to a ship scheduling model;

running the ship scheduling model to generate an optimized ship schedule; using outputs of the ship scheduling model to value short-term optionality scenarios; and outputting a valuation of the short-term optionality scenarios.

U1. The method as recited in paragraph U, wherein the ship scheduling model comprises:

a plurality of optimization models that model an LNG supply chain, the LNG supply chain including one or more LNG liquefaction terminals, one or more LNG regasification terminals, and a fleet of ships;

an input device that accepts a plurality of inputs relevant to the LNG supply chain, the plurality of inputs configured to be input into the plurality of optimization models;

one or more solution algorithms interfaced with the plurality of optimization models;

a processor that runs the plurality of optimization models using the interfaced one or more solution algorithms to create an optimized ship schedule, wherein uncertainty is accounted for in the optimized ship schedule; and an output device that outputs the optimized ship schedule.

V. A method of valuating a short-term optionality in a liquefied natural gas (LNG) market, comprising:

obtaining a probability distribution of short-term LNG prices;

using the probability distribution of short-term LNG prices as an input to a shipping simulation model that simulates shipping of LNG;

running the shipping simulation model to generate LNG operations decisions;

using outputs of the shipping simulation model to value short-term optionality scenarios; and outputting a valuation of the short-term optionality scenarios.

V1. The method as recited in paragraph V, wherein the shipping simulation model comprises:

modeling an LNG shipping schedule with a plurality of decision-making modules, wherein the plurality of decision-making modules are configured to capture behavior of various elements of an LNG supply chain;

entering, into a computer-based simulation system, data representing a current state of at least a portion of the LNG supply chain;

employing optimization techniques with the plurality of decision-making modules to prescribe LNG operations decisions for each element of the LNG supply chain;

running a simulation of an LNG shipping schedule using the plurality of decision-making modules, the data, and the optimization techniques; and outputting the LNG shipping schedule.

BIBLIOGRAPHY

R. Agarwal, O. Ergun, L. Houghtalen and O. O. Ozener (2009), "Collaboration in Cargo Transportation", In W. Chaovalitwongse, K. C. Furman and P. Pardalos (Eds.), *Optimization and Logistics Challenges in the Enterprise*, Springer, p. 373-409.

H. Andersson, M. Christiansen and K. Fagerholt (2010), "Transportation Planning and Inventory Management in the LNG Supply Chain", *Energy Systems*, v. 3, p. 427-439

F. Black and M Scholes (1973), "The Pricing of Options and Corporate Liabilities," *Journal of Political Economy*, v. 81, p. 637-654

M. Christiansen, K. Fagerholt and D. Ronen (2004), "Ship Routing and Scheduling: Status and Perspectives". *Transportation Science*, v. 38 n. 1, p. 1-18.

L. Clewlow and C. Strickland (2000), *Energy Derivatives, Pricing and Risk Management*, Lacima Group.

O. Ergun, G. Kyzu and M. Savelsbergh (2007), "Shipper Collaboration", *Computers & Operations Research*, v. 34, p. 1551-1560.

K. Fagerholt and B. Rygh (2002), "Design of a sea-borne system for fresh water transport—A simulation analysis", *Belgian Journal of Operations Research, Statistics and Computer Science*. v. 40 n. 3-4, p. 137-146.

B. J. Felix and C. Weber (2008), "Gas Storage Valuation: Comparison of Recombining Trees and Least Squares Monte-Carlo Simulation", Engineering Management Conference, IEMC Europe 2008, p. 1-4.

M. Fodstad, K. T. Uggen, F. Rømo, A.-G. Lium, G. Stremersch, S. Hecq (2008), "Profit Maximization in the LNG-Value Chain by Combining Market Prices and Ship Routing", Conference Proceedings, *APIEMS 2008—The 9th Asia Pacific Ind. Eng. & Management Systems Conference*

M. Fodstad, K. T. Uggen, F. Rømo, A.-G. Lium, G. Stremersch, S. Hecq (2011), "LNGScheduler: a rich model for coordinating vessel routing, inventories and trade in the liquefied natural gas supply chain", *Journal of Energy Markets*, v. 3, n. 4, Winter 2010/11, p. 31-64

S. A. Gabriel, S. Kiet and J. Zhuang (2005), "A Mixed Complementarity-Based Equilibrium Model of Natural Gas Markets", Operations Research v. 53(5) p. 799-818.

R. Grønhaug and M. Christiansen (2009), "Supply Chain Optimization for the Liquefied Natural Gas Business", In L. Bertazzi, J. van Nunen, & M. G. Speranza (Eds.), Innovation in distribution logistics, Springer, Lecture Notes in Economics and Mathematical Systems, Vol. 619, p. 195-218.

R. Grønhaug, M. Christiansen, G. Desaulniers, J. Desrosiers (2010), "A Branch-and-Price Method for a Liquefied Natural Gas Inventory Routing Problem", *Transportation Science*, v. 44 n. 3, p. 400-415.

V. Guigues, C. Sagastizabal, J. Zubelli (2010), "Robust management and pricing of LNG contracts with cancellation options", *Optimization Online*, December 2010.

E. E. Halvorsen-Weare and K. Fagerholt, (2010), "Routing and scheduling in a liquefied natural gas shipping problem with inventory and berth constraints", To appear in *Annals of Operations Research*, DOI 10.1007/s10479-010-0794-y
P. Hartley and K. B. Medlock III (2006), "The Baker Institute world gas trade model. In A. Jaffe, D. Victor & M. Hayes (Eds.), *Natural Gas and Geopolitics: From 1970 to 2040, Cambridge University Press*, p. 357-406.
J. G. Haubrich, P. Higgins, and J. Miller (2004), "Oil Prices: Backward to the Future?", Federal Reserve Bank of Cleveland, *Economic Commentary*, December 2004.
H. King (2004), "Marine Transportaion Model User's Manual", Rev. 3.2, Sandwell Engineering Inc.
G. Lai, F. Margot, N. Secomandi (2010), "An Approximate Dynamic Programming Approach to Benchmark Practice-Based Heuristics for Natural Gas Storage Valuation", *Operations Research*, v. 58, p. 564-582
G. Lai, M. X. Wang, S. Kekre, A. Scheller-Wolf, N. Secomandi (2011), "Valuation of Storage at a Liquefied Natural Gas Terminal", *Operations Research*, forthcoming.
The Lanner Group, (2011a), "Case Study: Lanner and Shell Develop ADGENT Simulation Tool", http://www.lanner.com, downloaded February 2011.
The Lanner Group (2011b), "Case Study: Improving Shipping Distribution at Exxon", http://www.lanner.com, downloaded February 2011.
I. Lustig, B. Dietrich, C. Johnson, and C. Dziekan, "The Analytics Journey", *Analytics*, November/December 2010, p. 11-18.
L. Muller, M. Souza and J. Zubelli (2010), "Evaluation of Optional Cancellation Contracts using Quantitative Finance Techniques", Technical Paper, IMPA, submitted for publication.
E. C. Özelkan, A. D'Ambrosio and G. S. Teng (2008), "Optimizing liquefied natural gas terminal design for effective supply-chain operations", *International Journal of Production Economics*. V. 111, p. 529-542.
G. Pattison (2003), "Maximizing LNG Supply Chain Efficiency with Simulation Modeling", *Offshore Technology Conference*, Houston, [The Lanner Group].
G, Pattison (2010), "GNL Chile—Managing a New LNG Value Chain", *Proceedings of the Operational Research Society Simulation Workshop* 2010.
D. Pilipovic (2007), *Energy Risk: Valuing and Managing Energy Derivatives*, Mc-Graw Hill.
J. G. Rakke, M. Ståalhane, C. R. Moe, M. Christiansen, H. Andersson, K. Fagerholt, I. Norstad, (2010), "A rolling horizon heuristic for creating a liquefied natural gas annual delivery program", To appear in *Transportation Research Part C*, doi:10.1016/j.trc.2010.09.006
R. Y. Rodriguez (2008), "Real option valuation of free destination in long-term liquefied natural gas supplies", *Energy Economics*, v 0.30, p. 1909-1932.
G. Rzevski and P. Skobelev (2004), "Magenta Multi-Agent Technology: Mageneta Platform Version 2" Whitepaper.
Saker Solutions (2004), "Simulation in the oil & gas sector", Whitepaper.
N. Stchedroff and R. Cheng (2003), "Modeling a Continuous Process with Discrete Simulation Techniques and Its Application to LNG Supply Chains", *Proceedings of the 2003 Winter Simulation Conference*, [Shell Information Technology International].
G. Stremersch, J. Michalek, S. Hecq (2008), "Decision support software tools for LNG supply chain management", Gastech
A. van de Broecke and D. Adams (2007), "Optimising the LNG Supply Chain", Petroleum Review, v. 61, n. 725, p. 30-32+48 [Honeywell].

The disclosed aspects, methodologies and techniques may be susceptible to various modifications, and alternative forms and have been shown only by way of example. The disclosed aspects, methodologies and techniques are not intended to be limited to the specifics of what is disclosed herein, but include all alternatives, modifications, and equivalents falling within the spirit and scope of the appended claims.

What is claimed is:

1. A method for shipping liquefied natural gas (LNG) comprising:
  developing a long-term strategy for allocating a supply of LNG, wherein the strategy identifies potential options in the LNG market while adhering to limitations of available shipping capacity, wherein identifying the potential options comprises:
    modeling an LNG market using one or more optimization models in a computer system, wherein the LNG market includes at least one buyer of LNG, at least one seller of LNG, an LNG terminal, and at least one ship for transporting LNG, wherein the one or more optimization models comprises a stochastic programming model, a stochastic dynamic program, a robust optimization model, a mixed integer linear programming model, a dynamic programming model, an approximate dynamic programming model, a constraint programing model, or a combination thereof, and wherein the one or more optimization models incorporate a network flow model and uses discrete variables to represent fixed penalties, costs and incentives on various options, batch cargo movements, limits on options, and IF-THEN logic on option constraints;
    inputting a plurality of inputs into the one or more optimization models, wherein uncertainty in the one or more inputs is represented as one or more of multiple scenarios, probability distribution functions, ranges of values, and a discrete set of values, wherein the uncertainty in the plurality of inputs includes one or more of shipping capacity on particular routes and the number, size, and speed of ships traveling on a particular route, and wherein the plurality of inputs comprise at least one of ship routes between all supply and destination terminals and types or grades of available LNG;
    interfacing one or more solution algorithms with the one or more optimization models in the computer system; and
    running in the computer system the one or more optimization models using the interfaced one or more solution algorithms to identify potential options in the LNG market, wherein uncertainty is accounted for in the identified potential options, and wherein the identified potential options include limits on potential deals, including one or more of maximum number of parties on one side of a deal, maximum number of parties per deal, maximum number of sets of parties dealing, and disallowed deals;
  outputting the identified potential options; and
  shipping LNG according to one or more of the identified potential options.

2. The method of claim 1, wherein the plurality of inputs comprise at least one of projects and parties to consider,
  percent ownership of each party in each project,
  a fraction of the supply committed at a location, projected production rates at each LNG terminal for each supplier, and local and regional gas supply and demand.

3. The method of claim 1, wherein the plurality of inputs comprise at least one of shipping capacity constraints, constraints of each project based on number, class, size, fuel type, and speed range of ships, whether ships are dedicated or pooled, and whether ships are owned, long-term chartered, spot, or short-term chartered.

4. The method of claim 1, wherein the plurality of inputs comprise at least one market for LNG ship outchartering.

5. The method of claim 1, wherein the plurality of inputs comprise at least one market for LNG ship inchartering.

6. The method of claim 1, wherein the plurality of inputs comprise at least one of contractual demand at each destination terminal for each consumer required from each particular supplier, known and assumed fiscal terms for each project's contract, sale price structure, flexibility of the contracts with regard to options such as the ability to incharter or outcharter ships, divert cargos, or buy or sell to spot markets, and time horizon.

7. The method of claim 1, wherein the plurality of inputs comprise at least one of cost of service estimates for each shipping route, and LNG price range projections at each market locale over a time horizon.

8. The method of claim 1, further comprising determining a next best alternative strategy available to at least one side of an LNG purchase negotiation.

9. The method of claim 1, further comprising analyzing flexibility and optionality in product routing.

10. The method of claim 1, wherein the one or more optimization models are run to determine improved or optimized profitability from a perspective of one or more parties in a transaction.

11. The method of claim 1, further comprising identifying sub-optimal potential options in the LNG market.

12. The method of claim 1, wherein the identified potential options are evaluated over a time horizon.

13. The method of claim 12, wherein the time horizon is a single time period snapshot.

14. The method of claim 13, wherein the time horizon is a multi-period time horizon.

15. The method of claim 1, wherein the identified potential options include one or more of diversions, swaps, backhauls, ship outcharter, ship incharter, and co-loading of ships.

16. The method of claim 1, wherein identifying potential options includes a sensitivity analysis to a data set.

17. The method of claim 1, wherein uncertainty in the plurality of inputs includes one or more of natural gas prices, shipping cost of service, fuel cost, and market supply and demand scenarios.

18. A computer program product having computer executable logic recorded on a tangible, non-transitory machine-readable medium, comprising:

code for developing a long-term strategy for allocating a supply of liquefied natural gas (LNG) by identifying potential options in the LNG market while adhering to limitations of available shipping capacity, wherein the code for identifying the potential options comprises:

code for modeling an LNG market using one or more optimization models, wherein the LNG market includes at least one buyer of LNG, at least one seller of LNG, an LNG terminal, and at least one means of transporting LNG comprising one or more ships, wherein the one or more optimization models is one of a stochastic programming model, a stochastic dynamic program, and a robust optimization model, and wherein the one or more optimization models incorporate a network flow model and uses discrete variables to represent fixed penalties, costs and incentives on various options, batch cargo movements, limits on options, and IF-THEN logic on option constraints;

code for accepting a plurality of inputs relevant to the LNG market, wherein the plurality of inputs are configured to be input into the one or more optimization models, wherein uncertainty in the one or more inputs is represented as one or more of multiple scenarios, probability distribution functions, ranges of values, and a discrete set of values, and wherein the uncertainty in the plurality of inputs includes one or more of shipping capacity on particular routes and the number, size, and speed of ships traveling on a particular route, and wherein the plurality of inputs comprise at least one of ship routes between all supply and destination terminals and types or grades of available LNG;

code for interfacing one or more solution algorithms with the one or more optimization models;

code for running the one or more optimization models using the interfaced one or more solution algorithms to identify potential options in the LNG market, wherein uncertainty is accounted for in the identified potential options, and wherein the identified potential options include limits on potential deals, including one or more of maximum number of parties on one side of a deal, maximum number of parties per deal, maximum number of sets of parties dealing, and disallowed deals; and code for outputting the identified potential options.

* * * * *